(12) United States Patent
Ian

(10) Patent No.: US 7,812,838 B1
(45) Date of Patent: Oct. 12, 2010

(54) TYPED DATA GRAPH VISUALIZATION SYSTEM IN THREE DIMENSIONS

(75) Inventor: Rana Ian, 10760 Hortense St., Apt. 6, North Hollywood, CA (US) 91602

(73) Assignee: Rana Ian, North Hollywood, CA (US)

( * ) Notice: Subject to any disclaimer, the term of this patent is extended or adjusted under 35 U.S.C. 154(b) by 0 days.

(21) Appl. No.: 12/686,331

(22) Filed: Jan. 12, 2010

(51) Int. Cl.
*G06T 11/20* (2006.01)
*G06T 15/00* (2006.01)
*G09G 5/00* (2006.01)

(52) U.S. Cl. .......................... 345/440; 345/419; 345/629

(58) Field of Classification Search .................. 345/440, 345/629, 419, 420
See application file for complete search history.

(56) References Cited

U.S. PATENT DOCUMENTS

| | | | |
|---|---|---|---|
| 6,137,499 A * | 10/2000 | Tesler | 345/440 |
| 2005/0179684 A1 * | 8/2005 | Wallace | 345/419 |
| 2008/0059896 A1 | 3/2008 | Anderson | |
| 2008/0150963 A1 * | 6/2008 | Stambaugh | 345/629 |

* cited by examiner

*Primary Examiner*—Ryan R Yang
(74) *Attorney, Agent, or Firm*—David Lewis

(57) ABSTRACT

A visualization system presents inter-connected three-dimensional models representing components of a data graph to a user on a display. A visualization graph is created from the association of a user-specified data graph, which may not include graphical information, to three-dimensional models through a type graph. Arrangement of three-dimensional models into discrete units is determined from local relations between components of the data graph.

7 Claims, 56 Drawing Sheets

FOOD VISUALIZATION GRAPH

COMPUTER DEVICE

DATA BLOCK

VISUAL BLOCK

VISUALIZATION BLOCK

PURPOSE OF METHOD

NODE

EDGE

MINIMUM GRAPH

GRAPH

TYPE NODE

TYPE EDGE

MINIMUM TYPE GRAPH

FOOD TYPE GRAPH (PART 1)

FOOD TYPE GRAPH (PART 2)

FOOD TYPE GRAPH (PART 3)

ASTRONOMICAL TYPE GRAPH (PART 1)

ASTRONOMICAL TYPE GRAPH (PART 2)

DATA NODE

DATA EDGE

MINIMUM DATA GRAPH

1-TO-MANY RELATION BETWEEN
A TYPE NODE AND DATA NODES

1-TO-MANY RELATION BETWEEN
A STAR TYPE NODE AND STAR DATA NODES

1-TO-MANY RELATION BETWEEN
A TYPE EDGE AND DATA EDGES

1-TO-MANY RELATION BETWEEN
A LUMINOSITY-STAR TYPE EDGE
AND LUMINOSITY-STAR DATA EDGES

FOOD DATA GRAPH

ASTRONOMICAL DATA GRAPH

MAP NODE

MAP EDGE

MINIMUM MAP GRAPH

FOOD MAP GRAPH (PART 1)

FOOD MAP GRAPH (PART 2)

FOOD MAP GRAPH (PART 3)

ASTRONOMICAL MAP GRAPH (PART 1)

ASTRONOMICAL MAP GRAPH (PART 2)

TYPE-TO-MAP GRAPH ELEMENT ASSOCIATIONS

FOOD TYPE GRAPH TO FOOD MAP GRAPH ASSOCIATIONS (PART 1)

FOOD TYPE GRAPH TO FOOD MAP GRAPH ASSOCIATIONS (PART 2)

ASTRONOMICAL TYPE GRAPH TO ASTRONOMICAL MAP GRAPH ASSOCIATIONS (PART 1)

ASTRONOMICAL TYPE GRAPH TO ASTRONOMICAL MAP GRAPH ASSOCIATIONS (PART 2)

VISUAL STATE NODE

VISUAL NODE

VISUAL STATE EDGE

VISUAL EDGE

VISUALIZATION NODE

VISUALIZATION EDGE

MINIMUM VISUALIZATION GRAPH

1-TO-MANY RELATION BETWEEN
A MAP NODE AND VISUALIZATION NODES

1-TO-MANY RELATION BETWEEN
A STAR MAP NODE AND STAR VISUALIZATION NODES

1-TO-MANY RELATION BETWEEN
A MAP EDGE AND VISUALIZATION EDGES

1-TO-MANY RELATION BETWEEN
A LUMINOSITY-STAR MAP EDGE AND
LUMINOSITY-STAR VISUALIZATION EDGES

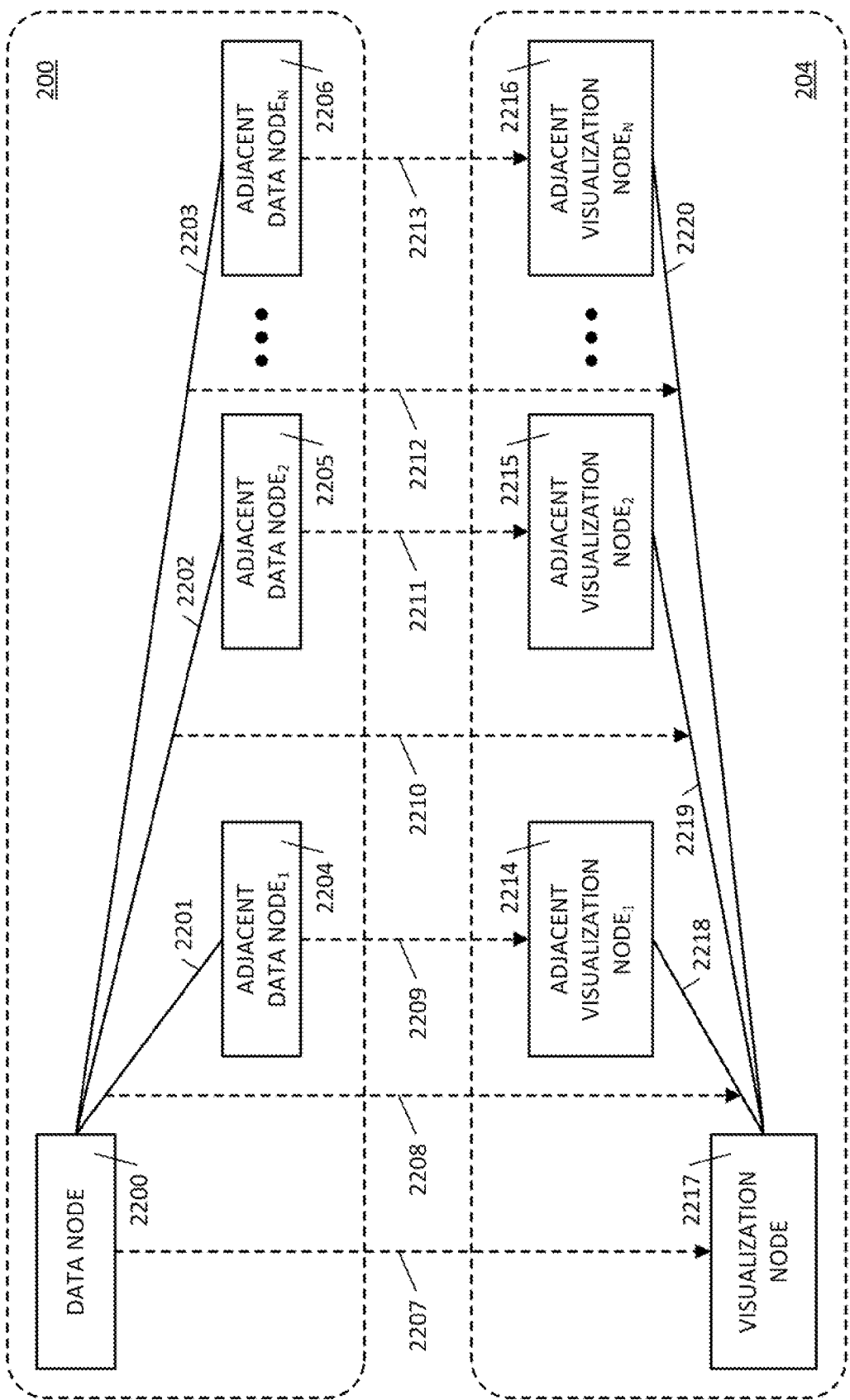
FIG. 22 DATA-TO-VISUALIZATION GRAPH ELEMENT ASSOCIATIONS

DATA NODE TO VISUALIZATION NODE ASSOCIATIONS IN RELATION TO A TYPE NODE TO MAP NODE ASSOCIATION

DATA EDGE TO VISUALIZATION EDGE ASSOCIATIONS
IN RELATION TO A TYPE EDGE TO MAP EDGE ASSOCIATION

METHOD OF VISUALIZATION NODE CONSTRUCTION

METHOD OF VISUALIZATION EDGE CONSTRUCTION

FOOD DATA GRAPH TO FOOD VISUALIZATION GRAPH ASSOCIATION (PART 1)

FOOD DATA GRAPH TO FOOD VISUALIZATION GRAPH ASSOCIATION (PART 2)

FOOD DATA GRAPH TO FOOD VISUALIZATION GRAPH ASSOCIATION (PART 3)

FOOD DATA GRAPH TO FOOD VISUALIZATION GRAPH ASSOCIATION (PART 4)

FOOD DATA GRAPH TO FOOD VISUALIZATION GRAPH ASSOCIATION (PART 5)

FOOD DATA GRAPH TO FOOD VISUALIZATION GRAPH ASSOCIATION (PART 6)

FOOD DATA GRAPH TO FOOD VISUALIZATION GRAPH ASSOCIATION (PART 7)

ASTRONOMICAL DATA GRAPH TO
ASTRONOMICAL VISUALIZATION GRAPH ASSOCIATION (PART 1)

ASTRONOMICAL DATA GRAPH TO
ASTRONOMICAL VISUALIZATION GRAPH ASSOCIATION (PART 2)

ASTRONOMICAL DATA GRAPH TO
ASTRONOMICAL VISUALIZATION GRAPH ASSOCIATION (PART 3)

ASTRONOMICAL DATA GRAPH TO
ASTRONOMICAL VISUALIZATION GRAPH ASSOCIATION (PART 4)

ASTRONOMICAL DATA GRAPH TO
ASTRONOMICAL VISUALIZATION GRAPH ASSOCIATION (PART 5)

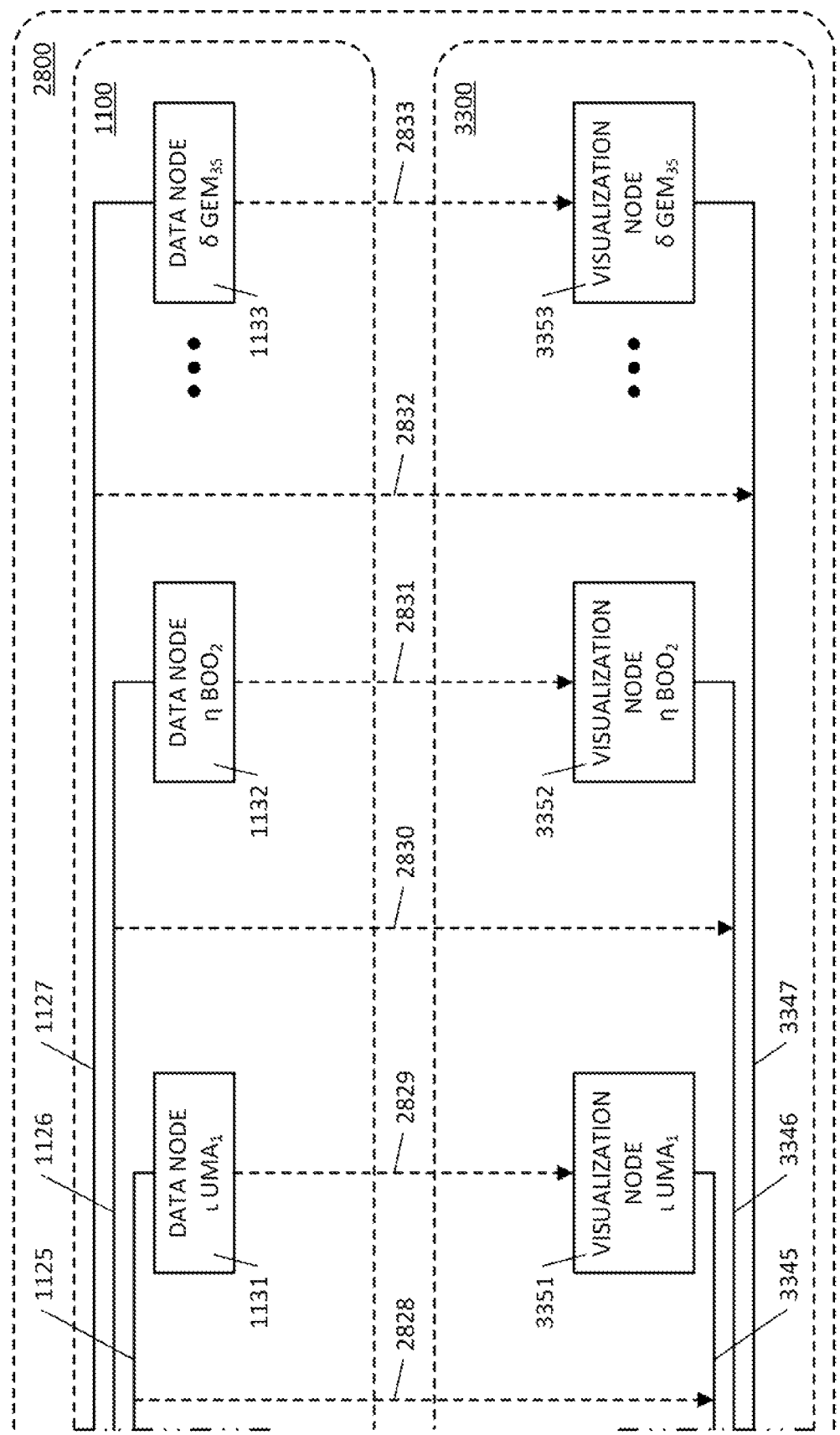
FIG. 28F ASTRONOMICAL DATA GRAPH TO ASTRONOMICAL VISUALIZATION GRAPH ASSOCIATION (PART 6)

VISUAL STATE
ARRANGEMENT

VISUALIZATION
ARRANGEMENT

VISUAL ARRANGEMENT

RELATION OF A VISUALIZATION ARRANGEMENT
TO ADJACENT VISUALIZATION NODES

LINE ARRANGEMENT OF PEAR VISUALIZATIONS

CIRCLE ARRANGEMENT OF PEAR VISUALIZATIONS

TETRAHEDRON ARRANGEMENT OF PEAR VISUALIZATIONS

LINE ARRANGEMENT OF STAR VISUALIZATIONS

RECTANGLE ARRANGEMENT OF STAR VISUALIZATIONS

CUBE ARRANGEMENT OF STAR VISUALIZATIONS

FOOD VISUALIZATION GRAPH

ASTRONOMICAL VISUALIZATION GRAPH

METHOD OF IMPLEMENTING A
VISUALIZATION GRAPH (PART 1)

METHOD OF IMPLEMENTING A
VISUALIZATION GRAPH (PART 2)

METHOD OF IMPLEMENTING A
VISUALIZATION GRAPH (PART 3)

VISUALIZATION SYSTEM

TYPED DATA GRAPH VISUALIZATION SYSTEM IN THREE DIMENSIONS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND OF THE INVENTION

This application pertains to visualizing data on a computer wherein an artificial workspace is created and presented to a user in such a way that it appears as a volumetric spatial region on a computer display. The subject matter discussed in the background section should not be assumed to be prior art merely as a result of its mention in the background section. Similarly, points mentioned in the background section or associated with the subject matter of the background section should not be assumed to have been previously recognized in the prior art. The subject matter in the background section merely represents different approaches, which in and of themselves may also be inventions.

Semiconductor manufacturers have historically produced separate chips for central processors (CPUs) and three-dimensional graphics processor units (GPUs) to independently develop, optimize and perform operations in each domain. Recent increases in the transistor count of chips are leading to a merger of the CPU and GPU into a single chip for increased performance. Software stacks have historically mirrored the physical separation of the CPU and GPU. With an upcoming physical merger of the CPU and GPU into a single chip, non-graphical software stacks and graphical software stacks may also be merged.

Computer information systems often categorize information into types and bestow descriptive properties to a type. The descriptive properties may themselves include at least a type, which in turn may include further properties. A data type, its description and it's relation to other data types forms a web of associations commonly understood in the computer-related art as a graph, and specifically, a type graph. A type graph forms an essential foundation for object-oriented programming languages such as Smalltalk, C++, Java, and C#. A type system containing type graphs is also an integral part of the instruction execution environments which run codes written in these programming languages.

Computer data types may be made to represent anything and it is this flexibility to represent anything that makes computer data types popular in computers today. One example of a type graph is a food type graph which may include at least types "Food", "Vegetable", "Fruit", "Pumpkin", "Eggplant", "Cucumber", "Orange", "Pear", and "Banana". Each type may contain descriptive properties. For example, the "Fruit" type may contain descriptive properties including "Oranges", "Pears", and "Bananas" which associate the Fruit type to the Orange, Pear and Banana types. When a computer device loads an instance of a data type into memory, such as the information of an Orange type named "Valencia", the information may be known as a data node. When a computer loads multiple instances from a type graph into memory, such as an instance of a Fruit type, an Orange type named "Valencia", a Pear type named "Callery", and a Banana type named "Cavandish", the information may be known as an object graph or data graph.

The design of a data node based on a type node may be referred to as an "object", "data node", or "typed data node". The term "data node" is chosen for use in the specification. It is to be understood that all references to a "data node" are synonymous with the terms "object" and "typed data node". Accordingly, the design of a data graph based on a type graph may be referred to as an "object graph", "data graph", or "typed data graph". The term "data graph" is chosen for use in the specification. It is to be understood that all references to a "data graph" are synonymous with the terms "object graph" and "typed data graph".

The volume and complexity of data graphs produced world-wide has rapidly increased over the past twenty years. With the increased use of graphs has come a definite need for better visualization. Historically, visualizing data graphs has been predominantly in two dimensions. When a data graph contains few relations and 10's of data nodes it's relatively easy to track in two dimensions. As the number of relations grows into the hundreds or thousands, and as the number of data nodes grows into the hundreds or thousands, it becomes increasingly difficult to clearly track each node and each relation in two dimensions. As data graph scale and complexity increase, width and height of a two-dimensional rendering may be increased. But at a certain point computer displays run out of space.

Adding a third dimension is a logical and concise way to display more information. Humans are accustomed to visualizing every-day objects such as trees, rivers and birds in three dimensions. Yet data graphs may not contain graphical information; therefore, there is a clear need in the art for systems and methods that visualize any data graph of any size or complexity in three dimensions.

BRIEF SUMMARY OF THE INVENTION

This application pertains to a computer device implemented visualization system presenting a three-dimensional view of a data graph to a user on a display. The visualization system (1) improves the comprehension of complex data graphs; (2) enables large data graphs to be displayed in a compact form; (3) enables any data graph designed from a type graph to be visualized in three dimensions; and (4) enables a data graph which doesn't contain graphical information to be visualized in three dimensions. The three-dimensional visualization includes at least three-dimensional models geometrically arranged into discrete units. Each three-dimensional model presented is associated to a component of the data graph. Discrete units of three-dimensional model arrangement are determined by the local relations components of the data graph have with one another. In one embodiment, a visualization graph is created by combining a user-specified data graph with three-dimensional models and three-dimensional arrangements associated to a type graph.

Any of the above embodiments may be used alone or together with one another in any combination. Inventions encompassed within this specification may also include embodiments that are only partially mentioned or alluded to or are not mentioned or alluded to at all in this brief summary or in the abstract.

BRIEF DESCRIPTION OF THE SEVERAL VIEWS OF THE DRAWING

In the following drawings like reference numbers are used to refer to like elements. Although the following figures depict various examples of the invention, the invention is not limited to the examples depicted in the figures.

FIG. 22 is a block diagram of example associations between elements of a data graph and elements of a visualization graph.

FIGS. 28(A)-28(F) is a block diagram illustrating example associations between a practical astronomical data graph and practical food astronomical graph.

DETAILED DESCRIPTION OF THE INVENTION

Figure 1:
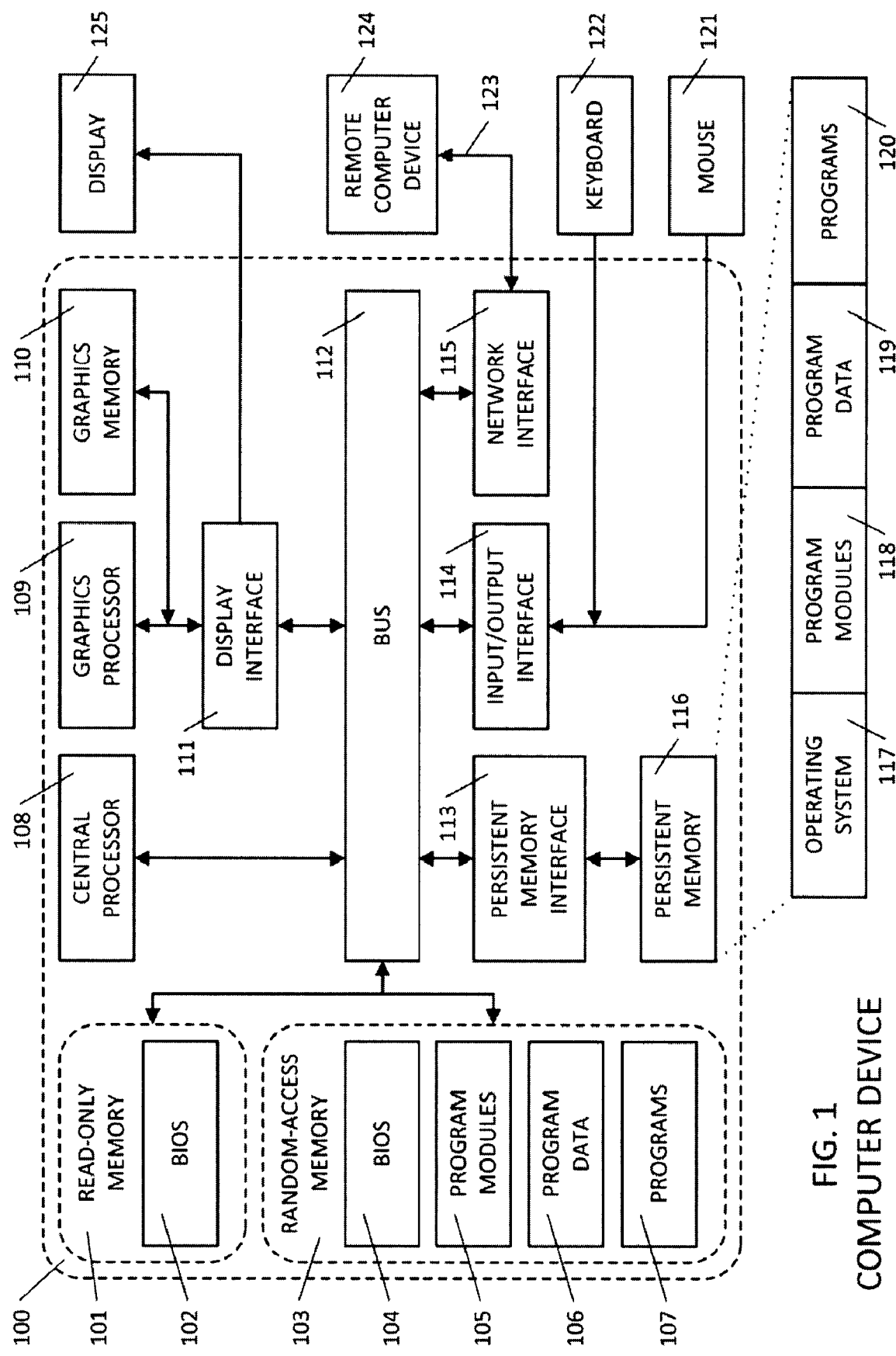
FIG. 1 is a block diagram of an example computer device on which the invention may be implemented.

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies. Terms "3D" and "three-dimensional" are synonyms used interchangeably within the written specification and drawings. Drawings use the term "3D" to conserve space while the written specification uses the term "three-dimensional" for clarity and explicitness.

The embodiments described herein offer methods enabling a three-dimensional visualization from a data graph which may be large, complex and contain no graphical information. To allow the visualization of a large, complex, non-graphical data graph in three dimensions, the visualization system introduces two critical technologies: (1) associating three-dimensional models and three dimensional arrangements to a type graph for use by a data graph; and (2) determining the placement of a three-dimensional arrangement based on relations between components of a data graph which are associated to the three-dimensional models being arranged.

For the first technology being introduced, the visualization system associates three-dimensional models and three-dimensional arrangements to type nodes and/or type edges, which are components of a type graph. Three-dimensional models and three-dimensional arrangements may be specified by a user within map nodes and map edges, which are components of a map graph. Each map node and map edge is associated to a type node and type edge. The facility of an instruction execution environment is used to determine the type graph of the user-specified data graph. Using the data graph's type graph, the visualization system is able to associate particular data nodes and data edges, which are components of a data graph, through the type graph and map graph to particular three-dimensional models. Copies of three-dimensional models are associated to each data node and data edge of the data graph. Three-dimensional models are copied from the map graph and association of three-dimensional model copies to each data node and data edge occurs within a visualization graph.

For the second technology being introduced, it is important to distinguish the arrangement of any particular collection of three-dimensional models from a method determining how to arrange three-dimensional models based on the content of a data graph. The invention offers a new method for a processor unit to determine how to arrange three-dimensional models based on the content of a data graph. Specifically, three-dimensional models within visualization nodes, which are components of a visualization graph, are arranged on a display into three-dimensional geometries based on associated data nodes that have an adjacent relation to a shared data node and based on associated data nodes which have an equivalent type node.

The utility of the invention becomes clear when we observe that: (1) in the state of the art, type graphs do not include any graphical information; (2) data graphs may not include any graphical information; and (3) construction of complex three-dimensional visualizations from any data graph is enabled by associating three-dimensional graphical information to a type graph and by designing a unit of arrangement based on the content of a data graph which is associated to that type graph.

FIG. 1 illustrates example computer device 100 on which the invention may be implemented. The computer device has read-only memory 101 which stores a basic input/output system (BIOS) 102 that may be loaded when the computer is powered on. The computer device uses a central processor unit (CPU) 108 (which may include one or more processors) to run instructions on data. Communication between CPU 108 and other components of computer device 100 is facilitated by bus 112. Bus 112 transmits data between CPU 108, random-access memory 103, display interface 111, persistent memory interface 113, input/output interface 114, and a network interface 115. Display interface 115 communicates with graphics processor 109, graphics memory 110, and display 125. Network interface 115 enables communication with remote computer device 124 through network 123. Input/output interface 114 communicates with peripheral devices such as keyboard 122 and mouse 121. Persistent memory interface 113 communicates with persistent memory 116 which may include at least operating system 117, program modules 118, program data 119, and programs 120. Random-access memory 103 may also include at least operating system 104, program modules 105, program data 106, and programs 107.

Figure 2A:
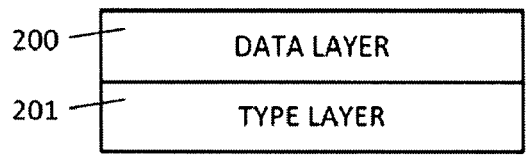
FIG. 2(A) is a block diagram of an example data block including a data layer and map layer.
Figure 2B:
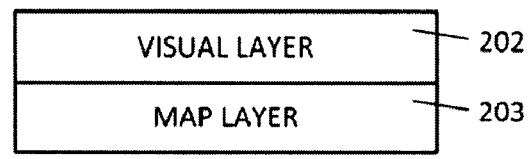
FIG. 2(B) is a block diagram of an example visual block including a visual layer and map layer.
Figure 2C:
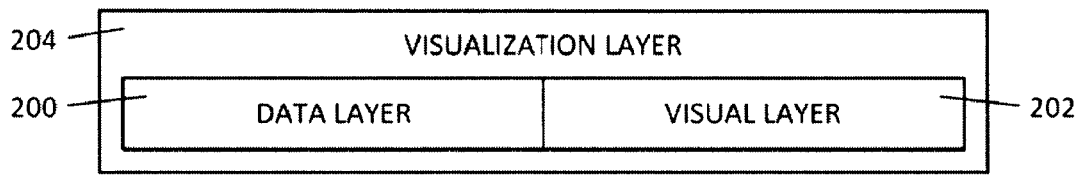
FIG. 2(C) is a block diagram of an example visualization block including a data layer and visual layer.
Figure 2D:
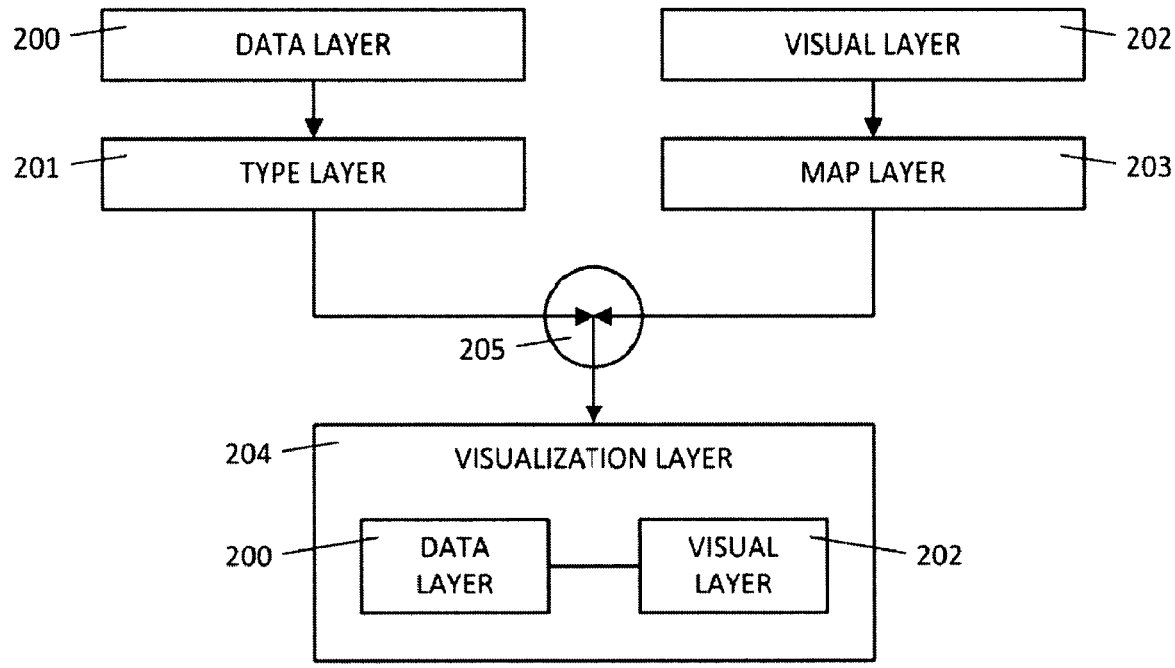
FIG. 2(D) is a flow diagram of an example illustrating the purpose of the method from a broad perspective.

FIGS. 2(A)-2(D) is a broad overview of the components and method for constructing a typed data graph visualization system in three dimensions. FIGS. 2(A)-2(C) illustrate example components used in the method, and most importantly, FIG. 2(D) shows an example flow diagram illustrating the purpose of the components and method.

Figure 10:
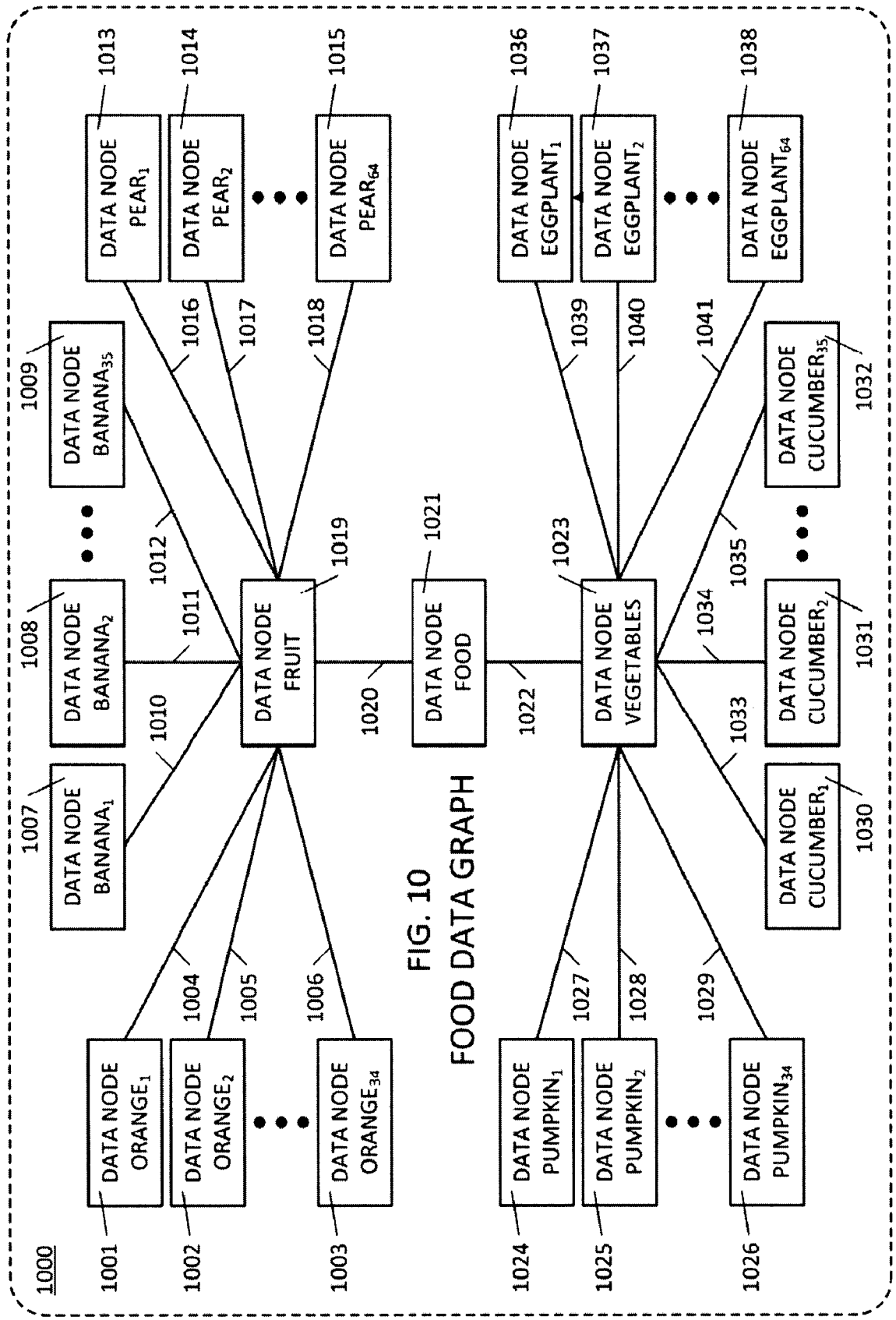
FIG. 10 is a block diagram of an example food data graph designed on a food type graph.

FIG. 2(A) illustrates an example data block whose main purpose is to provide data to be visualized. The example data block may include at least data layer 200 and type layer 201 which may be specified by a user and loaded into random-access memory 103. The purpose of data layer 200 is to provide a representation of a particular concept or phenomena that may later be visualized. For example, data layer 200 may represent foods, fruits and vegetables such as oranges, pears, bananas, pumpkins, eggplants and cucumbers as illustrated in FIG. 10. Another example of what may be represented in data layer 200 is astronomical categories, luminosities, temperatures, and stars illustrated in FIG. 11. Data layer 200 may include at least minimum data graph 708 comprised of at least two data nodes 709 and 711 connected by data edge 710. A data graph and components of a data graph are described in greater detail for FIGS. 7(A)-7(C).

Type layer 201 has two purposes. One purpose of type layer 201 is to provide a bridge, in combination with map layer 203, between data layer 200 and visual layer 202 so that data can be visualized as three-dimensional models. The second purpose of type layer 201 is to provide architectural "blueprints" on how to design the components of data layer 200. One practical example of type layer 201's architectural "blueprint" role to data layer 200 are the type nodes for foods, fruits and vegetables such as oranges, pears, bananas, pumpkins, eggplants and cucumbers illustrated in FIGS. 5(A)-5(C). Another practical example of an architectural "blueprint" role for components of type layer 201 are type nodes of astronomical categories, luminosities, temperatures, and stars illustrated in FIGS. 6(A)-6(B). Type layer 201 may include at least minimum type graph 408 comprised of at least two type nodes 409 and 411 connected by type edge 410. A type graph and components of a type graph are described in greater detail for FIGS. 4(A)-4(C).

FIG. 2(B) illustrates an example visual block whose main purpose is to provide three-dimensional models and three-dimensional arrangements which may be used to represent components of data layer 200. The illustrated visual block includes at least visual layer 202 and map layer 203, both of which may be specified by a user and loaded into random-access memory 103.

The purpose of visual layer 202 is to provide three-dimensional models and three-dimensional arrangements which may be associated to components of data layer 200. The three-dimensional models may be presented on display 125 after being copied and associated to particular components of data layer 202. The pears illustrated in FIGS. 30(A)-30(C) are one example of what may be visualized from the three-dimensional models and three-dimensional arrangements in visual layer 202. Another example of what may be visualized from visual layer 202 is three-dimensional models and three-dimensional arrangements of stars illustrated in FIGS. 31(A)-31(C). Visual layer 202 may include at least two visual nodes of 1805, a visual edge 1814, and two visual arrangements of 2916. Visual node 1805 may include at least visual state node 1800 which includes at least three-dimensional model 1802. Visual edge 1814 may include at least visual state edge 1810 which includes at least three-dimensional model 1812. Visual arrangement 2916 may include at least visual state arrangement 2912 which includes at least three-dimensional geometry 2913. The components of visual layer 202 are described in greater detail for FIGS. 18(A)-18(D) and FIGS. 29(A)-29(B).

Map layer 203 has two purposes. One purpose of map layer 203 is to provide a bridge, in combination with type layer 201, between visual layer 202 and data layer 200 so that data may be visualized as three-dimensional models. The second purpose of map layer 203 is to provide the architectural "blueprints" describing how to design components of visualization layer 204. The components of visualization layer 204 are particular bindings between data representations and visual representations. Components of map layer 203 describe how the binding of visualization layer 204 components may occur. One example of the architectural "blueprint" role of map layer 203 components are map nodes of foods, fruits and vegetables such as oranges, pears, bananas, pumpkins, eggplants and cucumbers illustrated in FIGS. 13(A)-13(C). Another example of an architectural "blueprint" role of map layer 203 components are map nodes of astronomical categories, luminosities, temperatures, and stars illustrated in FIGS. 14(A)-14(B). Map layer 203 may include at least minimum map graph 1211 which includes at least two map nodes 1212 and 1214 connected by map edge 1213. A map graph and components of a map graph are described in greater detail for FIGS. 12(A)-12(C).

FIG. 2(C) illustrates example visualization layer 204 whose main purpose is to visualize a concept or phenomena by associating components of data layer 200 with components of visual layer 202. One practical example of visualization layer 204 is FIG. 32 which visualizes foods, fruits and vegetables such as oranges, pears, bananas, pumpkins, eggplants and cucumbers. Another practical example of visualization layer 204 is FIG. 33 which visualizes astronomical categories, luminosities, temperatures, and stars.

From a broad perspective, visualization layer 204 may include at least data layer 200 and visual layer 202. In practice, a unified form distinct from data layer 200 and visual layer 202 is implemented in the preferred embodiment. The unified form of visualization layer 204 includes at least minimum visualization graph 1912 which includes at least two visualization nodes 1913 and 1916 connected by visualization edge 1915. A visualization graph and components of a visualization graph are described in greater detail for FIGS. 19(A)-19(C).

Visualization layer 204 is distinct from data layer 200 in that components of data layer 200 may not include any particular graphical information. Conversely, components of visualization layer 204 include graphical information associated to each component of data layer 200 within visualization layer 204. Visualization layer 204 is also distinct from visual layer 202 in that the three-dimensional models from visual layer 202 are without relation to any particular component of data layer 200. Conversely, particular three-dimensional models within visualization layer 204 are associated to particular components of data layer 200.

The similarity between "visual" and "visualization" terminology is intentional and distinguishes potential representation from actual representation. Visual node 1202 in FIG. 12(A), for example, is a component of visual layer 202 that includes three-dimensional model information with no association to a data node. Visual node 1202 has the potential to be associated to a data node and is termed "visual" to distinguish that an association to a data node has not yet occurred. Conversely, visualization node 1900, a component of visualization layer 204, represents data node 1901 with the three-dimensional model within visual node 1903. The term "visualization" indicates graphical information has been associated to data.

FIG. 2(D) illustrates a flow diagram of an example method combining data layer 200 with three-dimensional models and three-dimensional arrangements from visual layer 202 in visualization layer 204. FIG. 2(D), which is a general overview, begins by a user specifying a data graph (data layer 200) and an optional map graph (map layer 203). The map graph, which may be a partial graph or complete graph, includes three-dimensional models and three-dimensional arrangements (visual layer 202). A type graph (type layer 201) may be determined from the data graph using features of an instruction execution environment and CPU 108. After the data graph's type graph is determined, a complete map graph, which mirrors the type graph, is constructed using the type graph and any user-specified map graph. In the case of a user specifying a partial map graph or no map graph, missing values of a map graph are filled with default values during construction of a complete map graph. In the preferred embodiment, even though a user may specify a complete map graph, it is desirable to construct a second complete map graph which may include additional implementation details not mentioned herein.

Having constructed a map graph which mirrors the type graph, we are able to implement a crucial step of associating a data graph to three-dimensional models and three-dimensional arrangements in step 205. Step 205 includes at least associating minimum data graph 708 through minimum type graph 408 and minimum map graph 1211 to three-dimensional models and three-dimensional arrangements located within minimum map graph 1211. The result of step 205 is at least minimum visualization graph 1912 which may be presented on display 125. The method of constructing a visualization node and visualization edge is described in greater detail for FIGS. 25-26 respectively. A detailed discussion of step 205 is described in greater detail for FIGS. 34(A)-34(C).

To summarize the method in FIG. 2(D), two practical examples are offered. The first practical example is a method visualizing food. Food data graph 1000 (FIG. 10) which represents food, an example of data layer 200, is designed from "blueprint" food type graph 500 (FIGS. 5(A)-5(C)), an example of type layer 201. Food map graph 1300 (FIGS. 13(A)-13(C)), an example of map layer 203, mirrors food type graph 500 and includes copies of three-dimensional models and three-dimensional arrangements which represent visual layer 202. Food map graph 1300 and food type graph 500 form a bridge between food data graph 1000 and the three-dimensional models and three-dimensional arrangements in food map graph 1300. Food data graph 1000 is combined with copies of three-dimensional models and three-dimensional arrangements from food map graph 1300 to produce food visualization graph 3200 (FIG. 32) in step 205. Food visualization graph 3200 may be presented on display 125.

The second practical example summarizing the steps illustrated in FIG. 2(D) is visualization of astronomical phenomena. Astronomical data graph 1100 (FIG. 11) which represents astronomical phenomena, an example of data layer 200, is designed from "blueprint" astronomical type graph 600 (FIGS. 6(A)-6(C)), an example of type layer 201. Astronomical map graph 1400 (FIGS. 14(A)-14(C)), an example map layer 203, mirrors astronomical type graph 600 and includes copies of three-dimensional models and three-dimensional arrangements from visual layer 202. Astronomical map graph 1400 and astronomical type graph 600 form a bridge between astronomical data graph 1100 and three-dimensional models and three-dimensional arrangements in astronomical map graph 1400. Astronomical data graph 1100 is combined with copies of three-dimensional models and three-dimensional arrangements in astronomical map graph 1400 to produce astronomical visualization graph 3300 (FIG. 33) in step 205. Astronomical visualization graph 3300 may be presented on display 125.

To begin a detailed discussion of components of the method the concept of a graph is discussed. In the computer-related art, a graph is considered a collection of nodes and a collection of edges wherein each edge is a connection between a pair of nodes. A graph may be considered "directed" when the edges are traversed from only one of the two nodes connecting an edge. A graph may be considered "undirected" when the edges may be traversed from either node connecting the edge. Graphs may model various concepts or phenomena. For example, a road map with cities and streets may be a graph where cities are nodes and streets are edges. Depending on the concept or phenomena being modeled, each node may include additional information beyond edges and each edge may include additional information beyond a pair of nodes. In the example of a road map, the additional node information may be a city name and the additional edge information may be the road length in kilometers between two city nodes. The act of following an edge from one node to another is considered traversing. When a graph includes at least two edges connected to an identical pair of nodes the edges are considered parallel and lead to a traversal cycle, or graph cycle, in which a node that has previously been traversed is re-encountered by traversing a novel edge. A graph cycle may be avoided by prohibiting parallel edges.

Figure 3A:
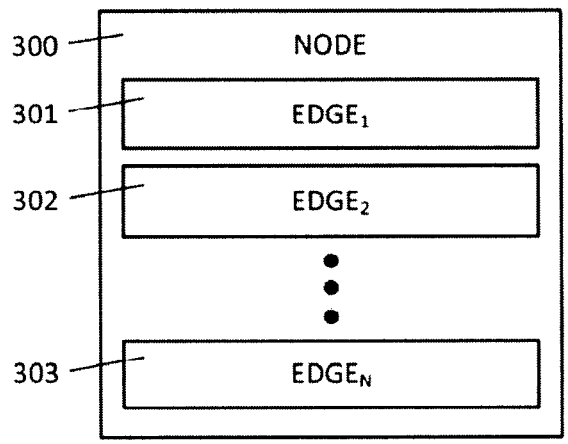
FIG. 3(A) is a block diagram of an example node which may be included in a graph.
Figure 3B:
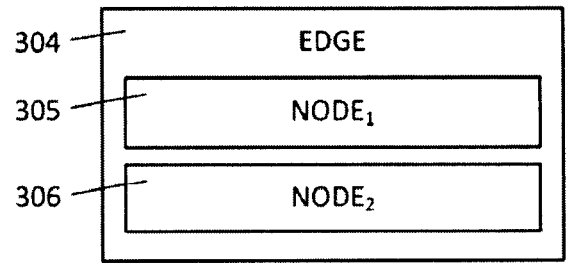
FIG. 3(B) is a block diagram of an example edge which may be included in a graph.
Figure 3C:
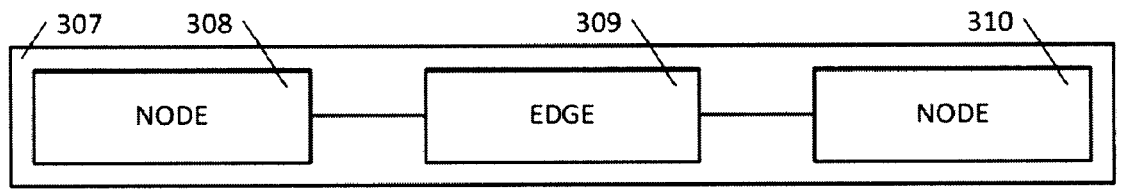
FIG. 3(C) is a block diagram of an example minimum graph which includes two nodes connected by an edge.
Figure 3D:
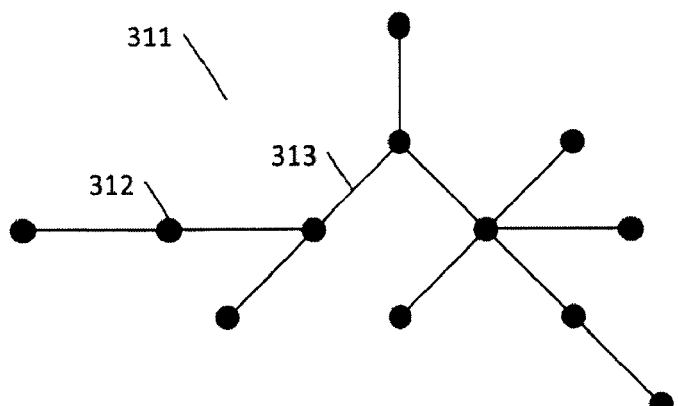
FIG. 3(D) is a pictorial diagram that illustrates an example graph with twelve nodes and eleven edges.

FIG. 3(A) illustrates example node 300 which is a graph node without additional information. Node 300 may include at least an indefinite number of edges represented by 301, 302, and 303. FIG. 3(B) illustrates example graph edge 304 which is a graph edge without additional information. Edge 304 may include at least two nodes 305 and 306. FIG. 3(C) illustrates example minimum graph 307 that may include at least two nodes 308 and 310 connected by edge 309. Nodes and edges of a graph do not inherently have graphical information such as size, arrangement, or color. FIG. 3(D) illustrates an example of larger graph, 311, with twelve nodes and eleven edges where each node is represented by a circle 312 and each edge is represented by a line 313. Notice that size, placement, and color of each node and edge in graph 311 are purely at the discretion of the artist.

Figure 4A:
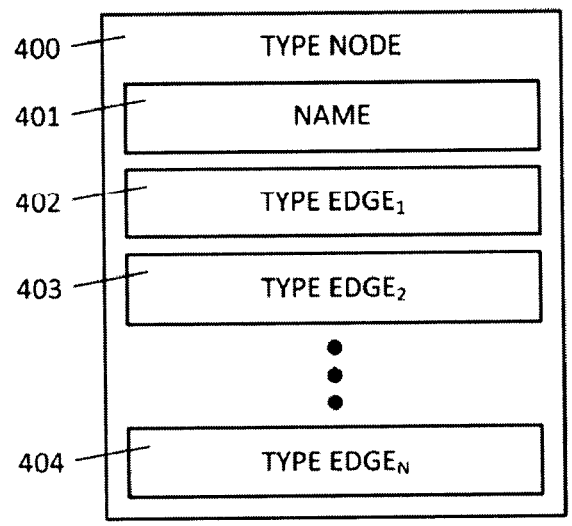
FIG. 4(A) is a block diagram of an example type node which may be included in a type graph.
Figure 4B:
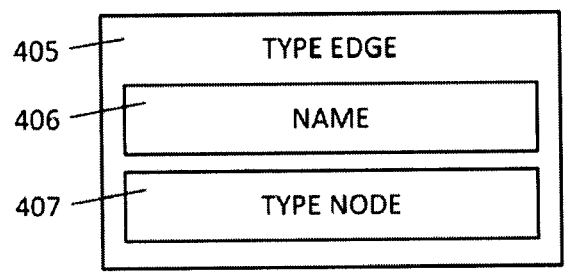
FIG. 4(B) is a block diagram of an example type edge which may be included in a type graph.

Adding information to a graph node or graph edge allows us to model meaningful concepts or phenomena as the city-street graph example shows. Type node 400 and type edge 405 in FIGS. 4(A) and 4(B) are example components of a type graph that are designed to flexibly model a concept or phenomena by adding name 401 and name 206 respectively. In the computer-related art, a type node may include operations that may be performed by CPU 108 on at least one or more type nodes. Type node operations are fundamental in the art but not a main focus of the invention.

In the preferred embodiment of the invention, a significant purpose of a type graph is to provide the architectural "blue prints" of a data graph. The architectural "blue print" purpose of a type graph may be explained by way of example. Type node 506 represents the concept of a pear in random-access memory 103 while data nodes 1013, 1014 and 1015, in random-access memory 103, represents 64 particular pears which may be growing on a tree. Type node 506 may be thought of as a general description of a whole class of objects while data nodes 1013, 1014 and 1015 may be thought of as particular objects of a class.

In the invention, another significant purpose of a type graph is for the type graph to play the role of a bridge, with the support of a map graph, between a data graph and three-dimensional models and three-dimensional arrangements. The type graph helps determine which three-dimensional model may represent which data node and data edge. Since both the data graph and type graph do not inherently include any graphical information, the ability to determine how graphical information, such as a three-dimensional model and three-dimensional arrangement, may be associated to a data graph is at the heart of the invention's utility.

Generally, the design of the invention is to associate a three-dimensional model with a type node, wherein the three-dimensional model resides within a map node associated to the type node, and data nodes designed from the type node are each associated to a copy of the three-dimensional model. An example of a type node's bridge role between a three-dimensional model and data nodes is illustrated in map node 1304 (FIG. 13(A)). Map node 1304 is associated to Pear type node 506 (FIG. 5(A)). Map node 1304 may include visual node 1305 which includes three-dimensional model 1802 within visual state node 1800 within one of the visual node 1305 states 1806, 1807, 1808, and 1809. Three-dimensional model 1802 may be copied and each copy associated to Pear data nodes 1013, 1014 and 1015, which are designed from Pear type node 506, using CPU 108. The method of associating data nodes to graphical information is described in greater detail for FIG. 25.

A three-dimensional arrangement may also be associated with a type node, wherein the three-dimensional arrangement resides within a map node associated to the type node. CPU 108 may use the three-dimensional arrangement to arrange three-dimensional models associated to data nodes. An example of a type node's bridge role between a three-dimensional arrangement and data nodes is illustrated in map node 1304. Map node 1304 is associated to Pear type node 506 and may include visual arrangement 1306 which includes three-dimensional geometry 2901 within visual state arrangement 2900 within state 2904 of visual arrangement 1306. Three-dimensional geometry 2901 may be used to arrange copies of three-dimensional model 1802 which represent Pear data nodes 1013, 1014 and 1015 using CPU 108 and/or GPU 109.

Type edges are treated similarly to type nodes, the general design of the invention is to associate a three-dimensional model with a type edge, wherein the three-dimensional model resides within an associated map edge, and data edges designed from the type edge are each associated to a copy of the three-dimensional model. An example of a type edge's bridge role between a three-dimensional model and data edges is illustrated in map edge 1319. Map edge 1319 is associated to type edge 515 and may include visual edge 1814 which includes three-dimensional model 1812 within visual state edge 1810 within state 1815 of visual edge 1814. Three-dimensional model 1812 may be copied and associated to data edges 1016, 1017, and 1018, which are designed from type edge 515, using CPU 108. The method of associating data edges to graphical information is described in greater detail for FIG. 26.

FIG. 4(A) illustrates example type node 400 which is a graph node that may be loaded into random-access memory 103. Type node 400 may include at least name 401 and an indefinite number of type edges represented by 402, 403, and 404.

FIG. 4(B) illustrates example type edge 405 which is a graph edge that may be loaded into random-access memory 103. Type edge 405 may include at least name 406 and type node 407. The second node of a type edge is the outer type node which defines the type edge. For example, the second node for type edges 402, 403 and 404 is type node 400.

Figure 4C:
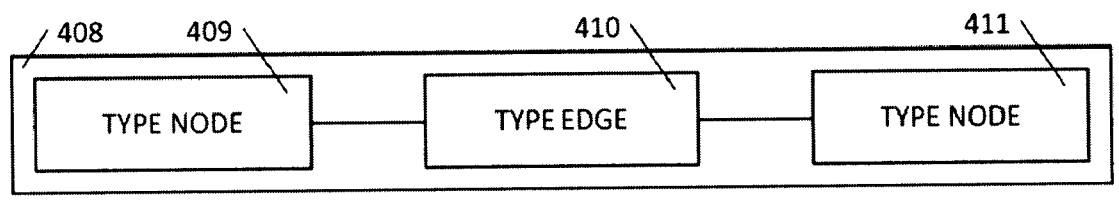
FIG. 4(C) is a block diagram of an example minimum type graph which includes two type nodes connected by a type edge.

FIG. 4(C) illustrates example minimum type graph 408 that may be loaded into random-access memory 103. Minimum type graph 408 may include at least two type nodes 409 and 411 connected by type edge 410. The example type edge embodiment is also referred to as a "property" in the computer-related art. In this specification, to delineate a clear relationship between type edges, data edges, map edges, and visualizations edges, the term "property" is avoided and the term "type edge" is used.

Figure 5A:
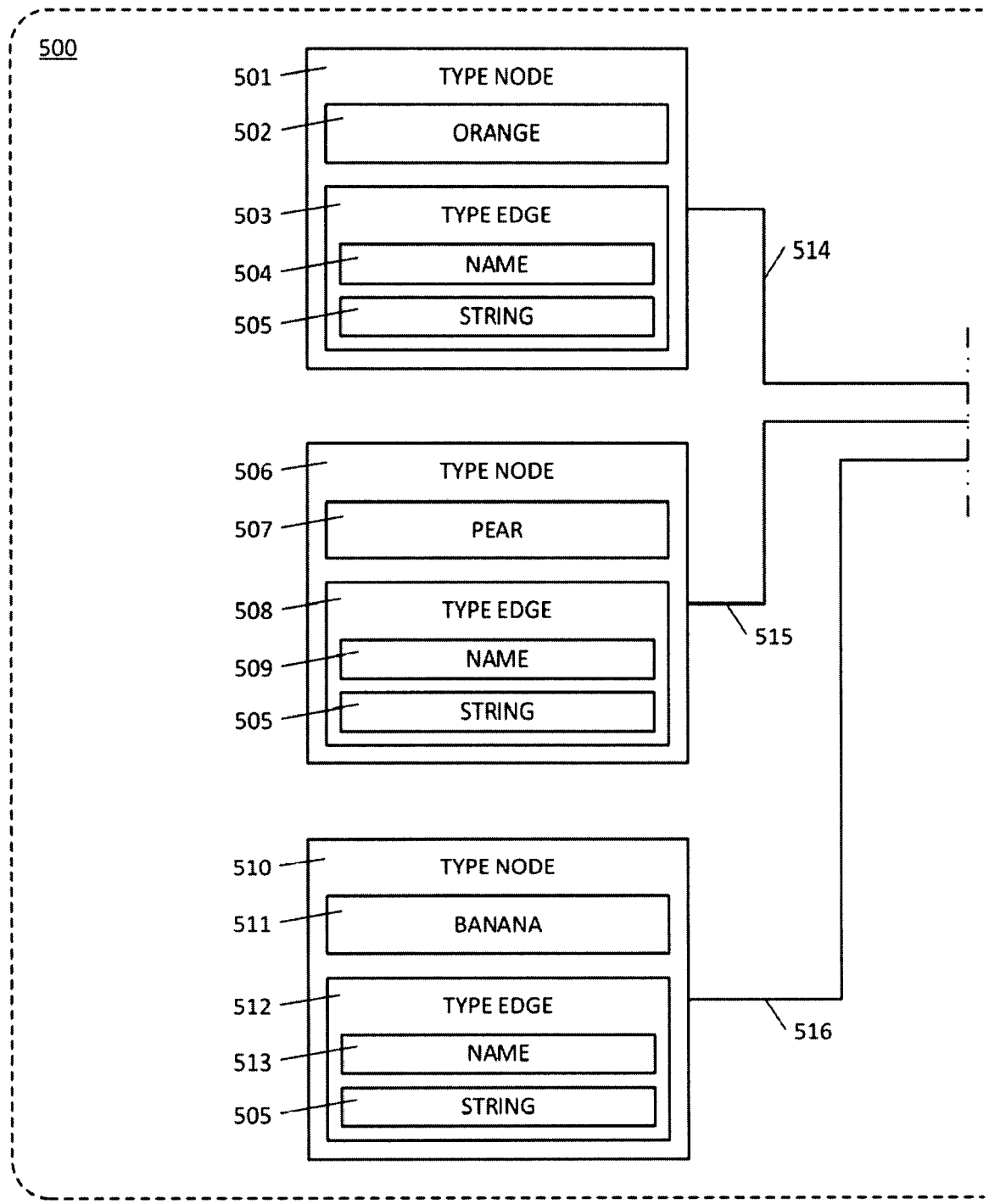
FIGS. 5(A)-5(C) is a block diagram illustrating an example of a practical type graph of foods such as fruits and vegetables.
Figure 5B:
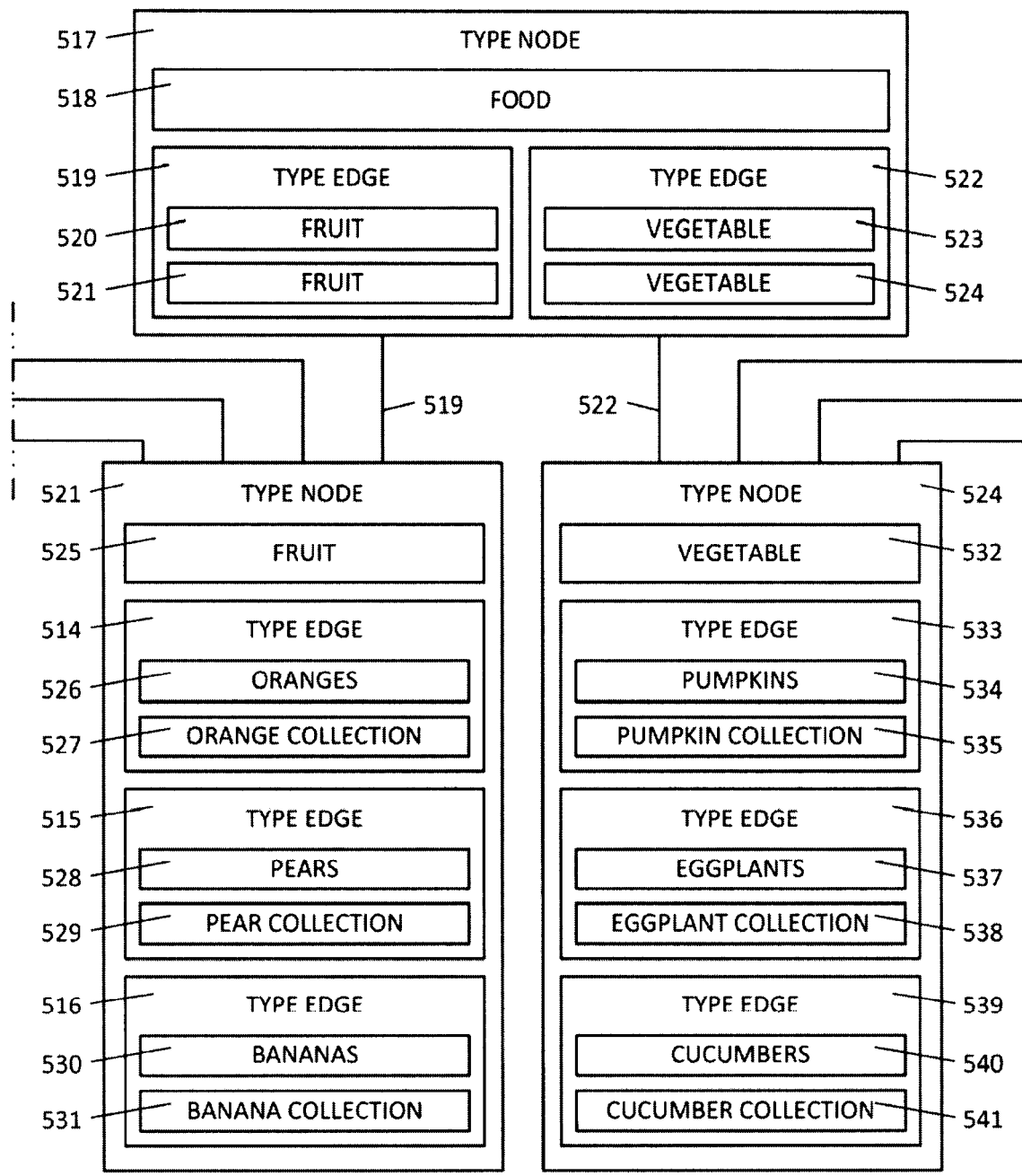

FIGS. 5(A)-5(B) illustrates example food type graph 500, an example of type layer 201, which is the "blue print" for food data graph 1000 that represents foods, fruits, and vegetables such as oranges, pears, bananas, pumpkins, eggplants and cucumbers. Food type graph 500 is the first of two practical type graph examples which may be loaded into random-access memory 103.

FIG. 5(A) illustrates example "Orange" type node 501, "Pear" type node 506, and "Banana" type node 510. Type node 501 is named "Orange" 502 and may include at least type edge 503. Type edge 503 is named "Name" 504 and is associated to type node 501 and type node "String" 505. Type node "String" 505 represents a sequence of human-language characters such as those found in the English language and is used to spell out the name of type edge 503. Type node 506 is named "Pear" 507 and may include at least type edge 508. Type edge 508 is named "Name" 509 and is associated to type node 506 and type node "String" 505. Type node 510 is named "Banana" 511 and may include at least type edge 512. Type edge 512 is named "Name" 513 and is associated to type node 510 and to type node "String" 505.

FIG. 5(B) illustrates example "Food" type node 517, "Fruit" type node 521, and "Vegetable" type node 524. Type node 517 is named "Food" 518 and may include at least type edges 519 and 522. Type edge 519 is named "Fruit" 520 and is associated to type node 517 and to type node "Fruit" 521. Type edge 522 is named "Vegetable" 523 and is associated to type node 517 and type node "Vegetable" 524. Type node 521 is named "Fruit" 525 and may include at least type edges 514, 515, and 516. Type edge 514 is named "Oranges" 526 and is associated to type node 521 and type node "OrangeCollection" 527. "OrangeCollection" type node 527 is the architectural "blue print" for a data node which may be associated to zero or more Orange data nodes. Type edge 515 is named "Pears" 528 and is associated to type node 521 and type node "PearCollection" 529. "PearCollection" type node 529 is the architectural "blue print" for a data node which may be associated to zero or more Pear data nodes. Type edge 516 is named "Bananas" 530 and is associated to type node 521 and type node "BananaCollection" 531. "BananaCollection" type node 531 is the architectural "blue print" for a data node which may be associated to zero or more Banana data nodes. Type node 524 is named "Vegetable" 532 and may include at least type edges 533, 536, and 539. Type edge 533 is named "Pumpkins" 534 and is associated to type node 524 and type node "PumpkinCollection" 535. "PumpkinCollection" type node 535 is the architectural "blue print" for a data node which may be associated to zero or more Pumpkin data nodes. Type edge 536 is named "Eggplants" 537 and is associated to type node 524 and type node "EggplantCollection" 538. "EggplantCollection" type node 538 is the architectural "blue print" for a data node which may be associated to zero or more Eggplant data nodes. Type edge 539 is named "Cucumbers" 540 and is associated to type node 524 and type node "CucumberCollection" 541. "CucumberCollection" type node 541 is the architectural "blue print" for a data node which may be associated to zero or more Cucumber data nodes.

Figure 5C:
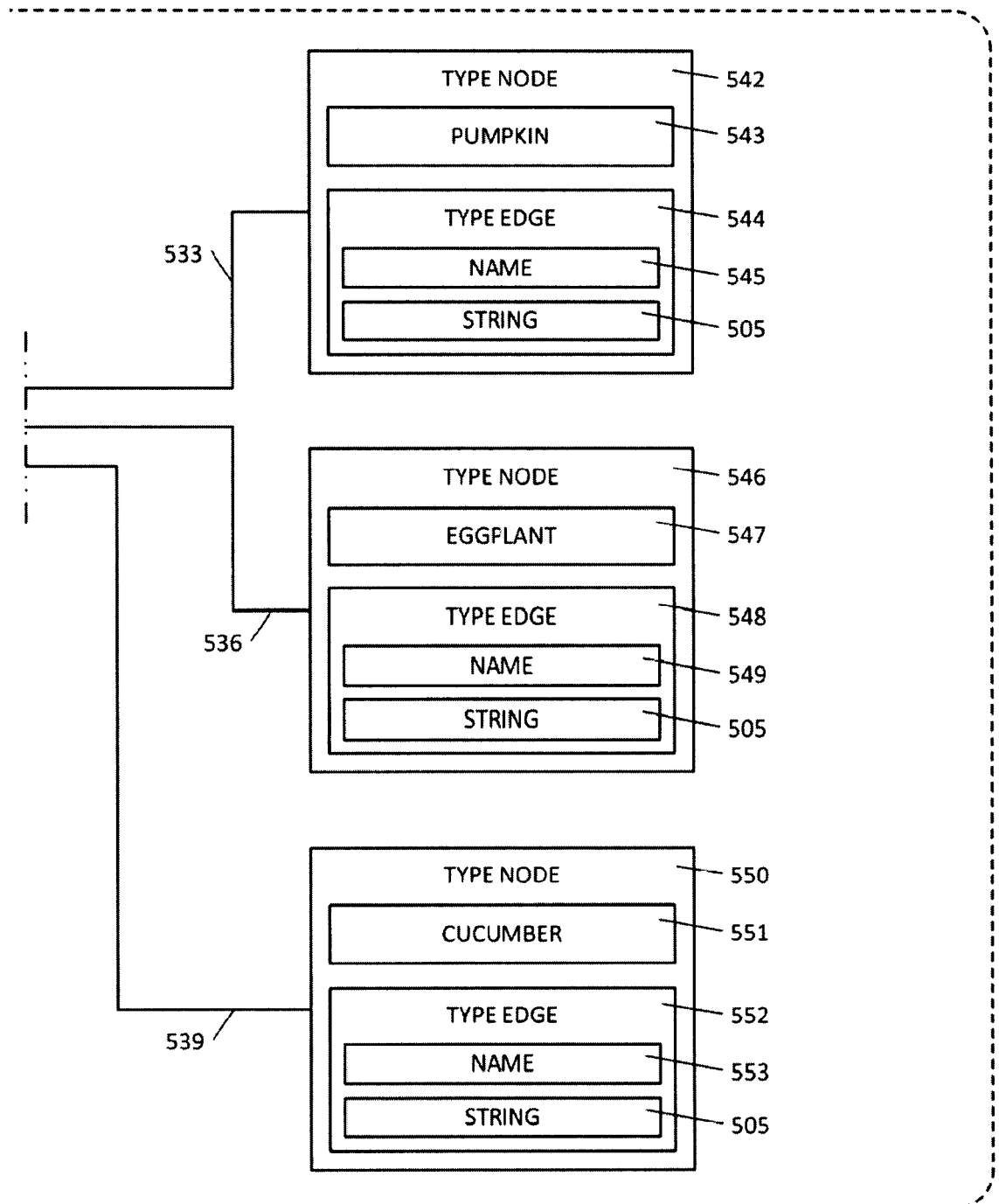

FIG. 5(C) illustrates example "Pumpkin" type node 542, "Eggplant" type node 546, and "Cucumber" type node 550. Type node 542 is named "Pumpkin" 543 and may include at least type edge 544. Type edge 544 is named "Name" 545 and is associated to type node 542 and type node "String" 505. Type node 546 is named "Eggplant" 547 and may include at least type edge 548. Type edge 548 is named "Name" 549 and is associated with type node 546 and type node "String" 505. Type node 550 is named "Cucumber" 551 and may include at least type edge 552. Type edge 552 is named "Name" 553 and is associated to type node 550 and type node "String" 505.

Figure 6A:
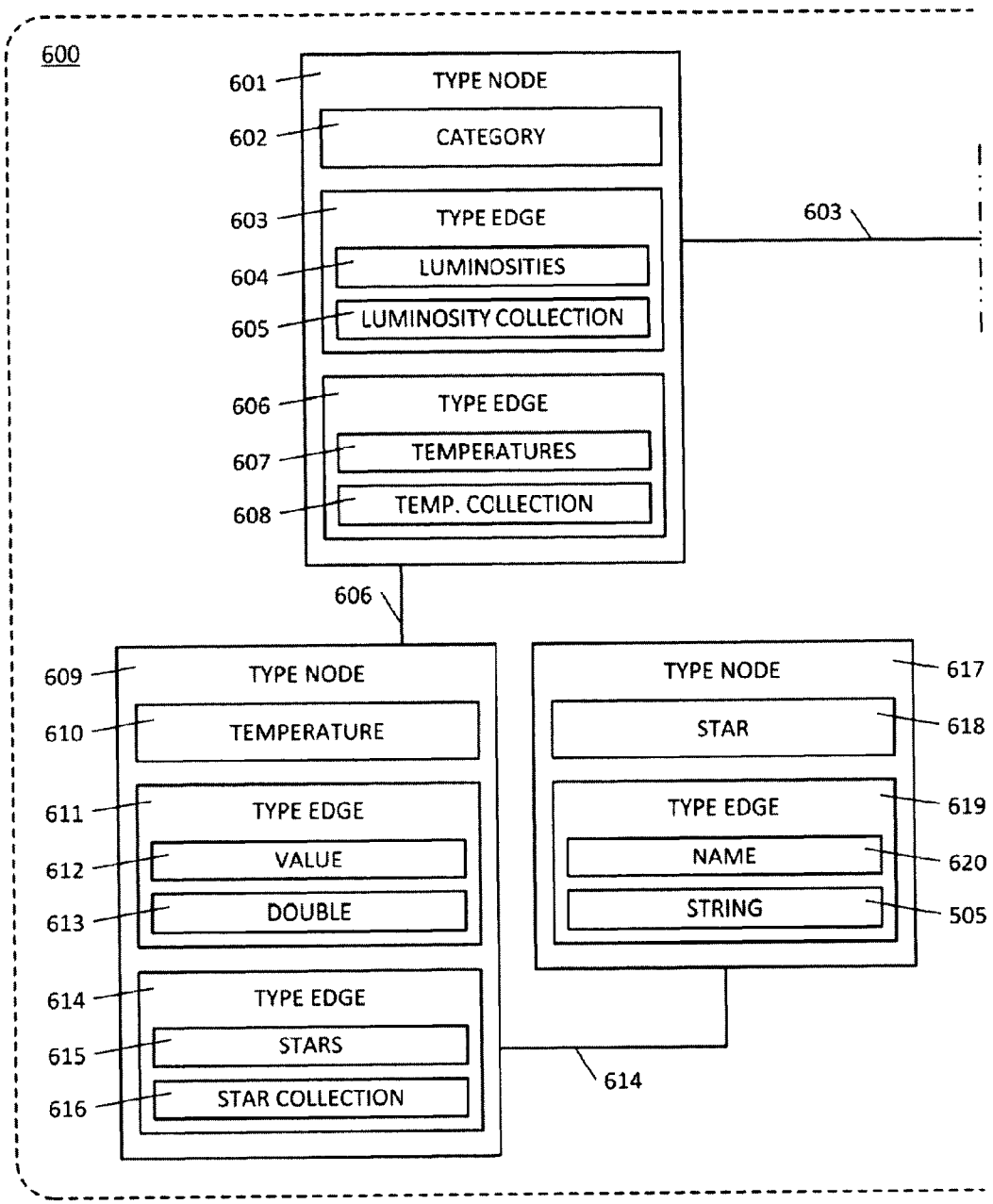
FIGS. 6(A)-6(B) is a block diagram illustrating an example of a practical type graph of astronomical phenomena such as temperatures and luminosities of stars.
Figure 6B:
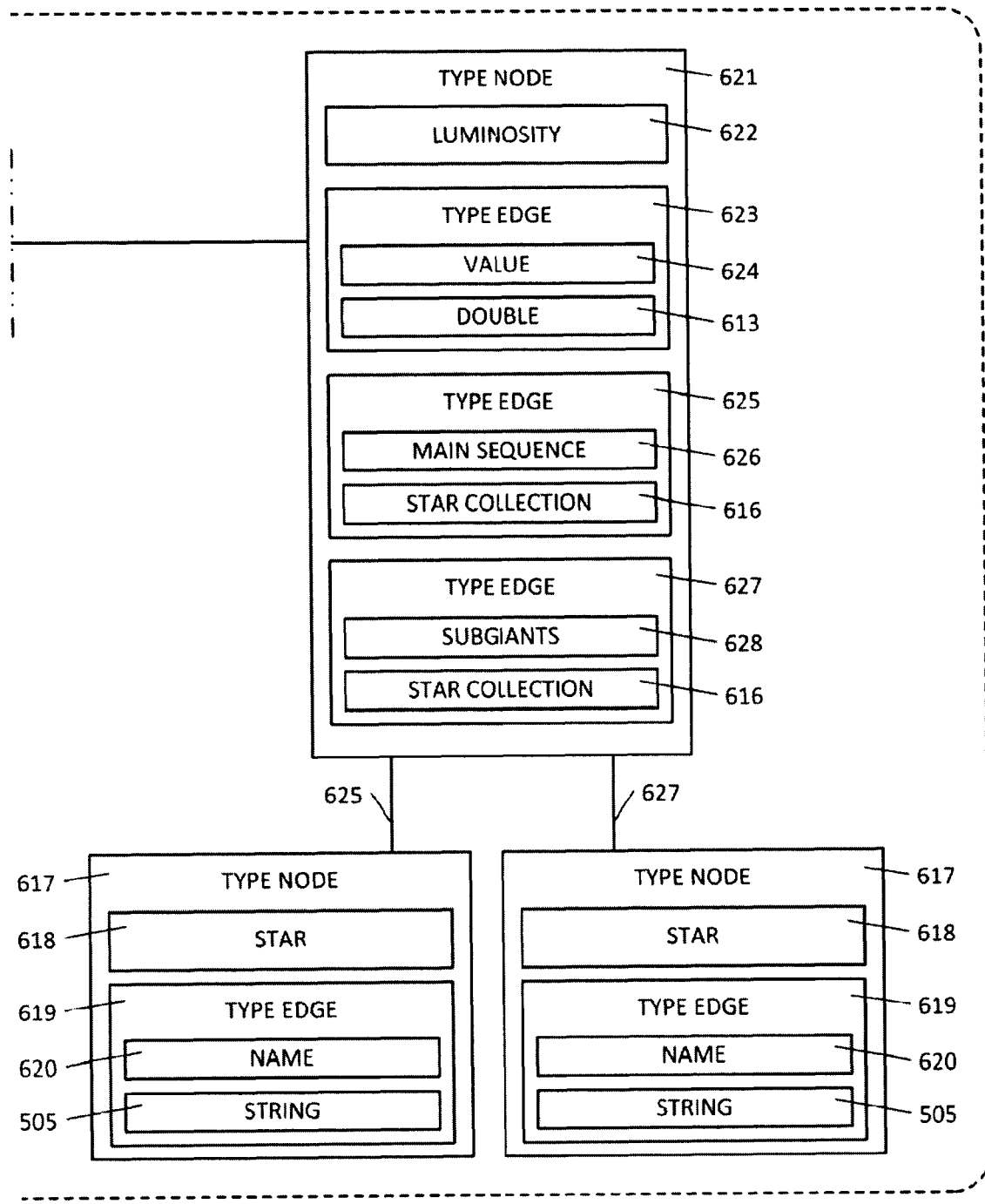

FIGS. 6(A)-6(B) illustrates example astronomical type graph 600, an example type layer 201, which is the "blue print" for astronomical data graph 1100 that represents astronomical bodies organized by category, luminosity and temperature. Astronomical type graph 600 is the second of two practical type graph examples which may be loaded into random-access memory 103. Astronomical type graph 600 provides a phenomenon more complex to visualize than food type graph 500 by illustrating the non-physical concept of luminosity and less readily visualized concept of temperature. While temperature is based on the kinetic energy of physical atoms, temperature is not as easily visualized as a pear or banana.

FIG. 6(A) illustrates example "Category" type node 601, "Temperature" type node 609, and Star type node 617. Type node 601 is named "Category" 602 and may include at least type edges 603 and 606. Type edge 603 is named "Luminosities" 604 and is associated with type node 601 and type node "LuminosityCollection" 605. "LuminosityCollection" type node 605 is the architectural "blue print" for a data node which may be associated with zero or more Luminosity data nodes. Type edge 606 is named "Temperatures" 607 and is associated with type node 601 and type node "Temp.Collection" 608. "Temp.Collection" type node 608 is the architectural "blue print" for a data node which may be associated with zero or more Temperature data nodes. Type node 609 is named "Temperature" 610 and may include at least type edges 611 and 614. Type edge 611 is named "Value" 612 and is associated with type node 609 and type node "Double" 613. "Double" type node 613 may be a 64-bit floating point number. Type edge 614 is named "Stars" 615 and is associated with type node 609 and type node "StarCollection" 616. Type node 617 is named "Star" 618 and may include at least type edge 619. Type edge 619 is named "Name" 620 and is associated with type node 617 and type node "String" 505.

FIG. 6(B) illustrates example "Luminosity" type node 621 and "Star" type node 617. Notice that it is possible for a type graph to include multiple occurrences of an identical type node 617. Type node 621 is named "Luminosity" 622 and may include at least type edges 623, 625, and 627. "Luminosity" type node 621 is the "blue print" of a data node which represents the amount of energy an astrophysical body radiates per unit of time. Type edge 623 is named "Value" 624 and is associated with type node 621 and type node "Double" 613. Type edge 625 is named "MainSequence" 626 and is associated with type node 621 and type node "StarCollection" 616. "StarCollection" type node 616 is the architectural "blue print" for a data node which may be associated to zero or more Star data nodes. The term "MainSequence" refers to a region of the Hertzsprung-Russell diagram where a newly born star may be plotted based on spectral class and mass. The Hertzsprung-Russell diagram is a well known scientific diagram in the field of astrophysics and is not shown in the specification. Type edge 627 is named "SubGiants" 628 and is associated with type node 621 and type node "StarCollection" 616. The term "SubGiants" refers to a classification of stars on the Hertzsprung-Russell diagram which have the same spectral class as main sequence stars and are slightly brighter than main sequence stars, but not as bright as giant stars.

Figure 7A:
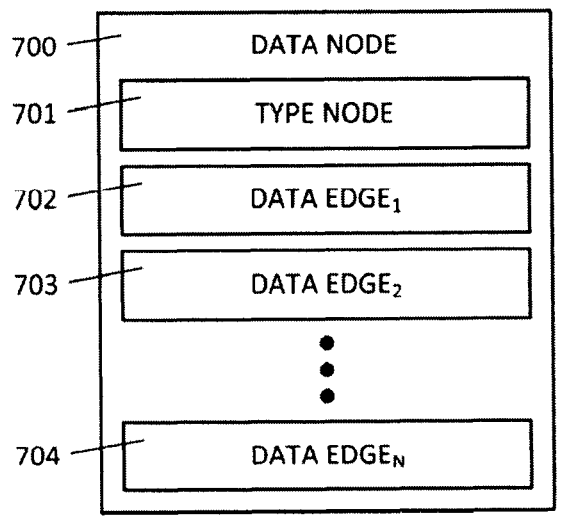
FIG. 7(A) is a block diagram of an example data node which may be included in a data graph.

FIG. 7(A) illustrates example data node 700, an example component of data layer 200, which is a graph node that may be loaded into random-access memory 103. Data node 700 may include at least type node 701 and an indefinite number of data edges represented by 702, 703, and 704. Data Node 700 is designed on the architectural "blue print" of type node 701. For example, if type node 701 is equivalent to type node 400, then data edges 702, 703, and 704 would be designed on type edges 402, 403, and 404 respectively.

Figure 7B:
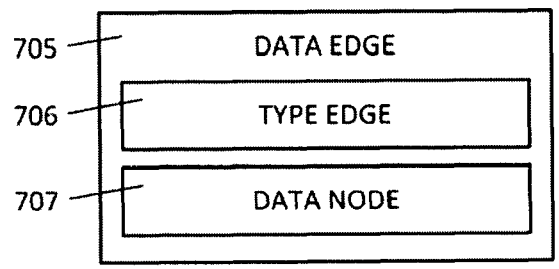
FIG. 7(B) is a block diagram of an example data edge which may be included in a data graph.

FIG. 7(B) illustrates example data edge 705, an example component of data layer 200, which is a graph edge that may be loaded into random-access memory 103. Data edge 705 may include at least type edge 706 and data node 707. The second node for a data edge is the outer data node which defines the data edge. For example, the second data node for data edges 702, 703 and 704 is data node 700.

Figure 7C:
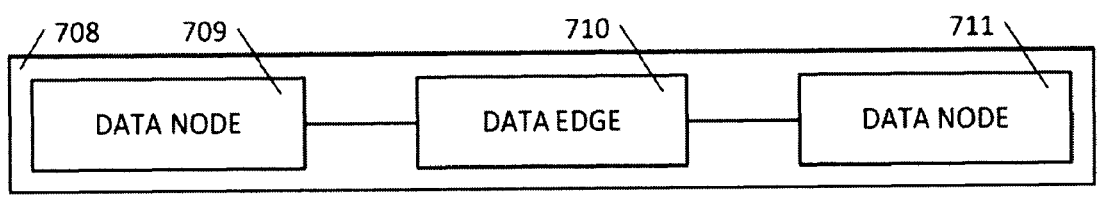
FIG. 7(C) is a block diagram of an example minimum data graph which includes two data nodes connected by a data edge.

FIG. 7(C) illustrates example minimum data graph 708 which may be loaded into random-access memory 103. Minimum data graph 708 includes at least two data nodes 709 and 711 connected by data edge 710.

Figure 8A:
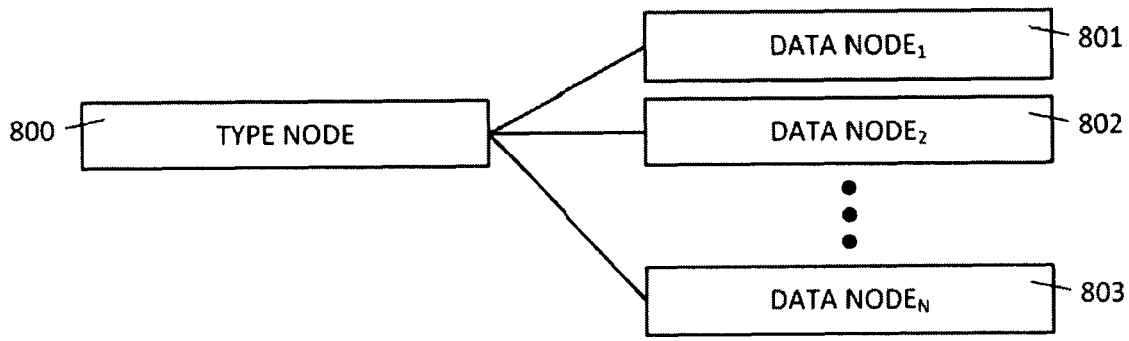
FIG. 8(A) is a block diagram of an example 1-to-many relation between a type node and data nodes.
Figure 8B:
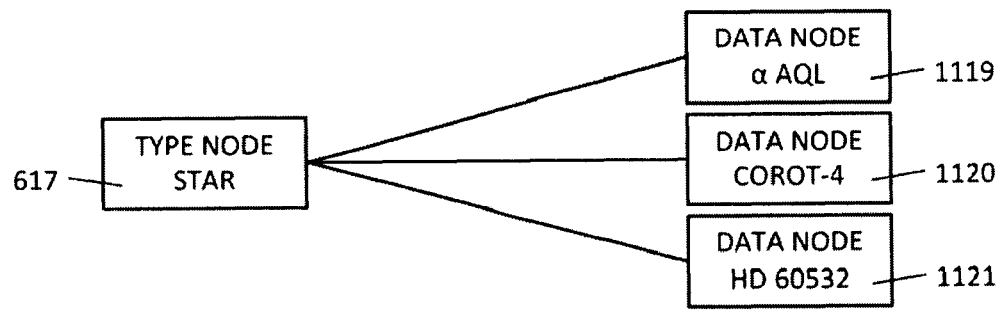
FIG. 8(B) is a block diagram of an example 1-to-many relation between a star type node and star data nodes.

A type node which forms the "blue print" for particular data nodes has a 1-to-many relationship to those data nodes as an architectural blueprint of a house may be related to many houses built from the blueprint. FIG. 8(A) illustrates an example 1-to-many relation between type node 800 and an indefinite number of data nodes represented by 801, 802, and 803. FIG. 8(B) illustrates a practical example of a 1-to-many relation between Star type node 617 and Star data nodes "α AQL" 1116, "COROT-4" 1117 and "HD 60532" 1118. 617, 1116, 1117, and 1118 may each be loaded into random-access memory 103.

Figure 9A:
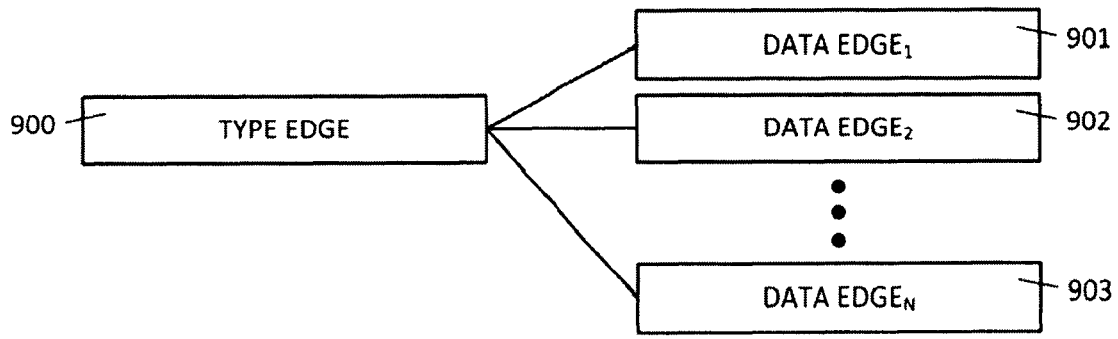
FIG. 9(A) is a block diagram of an example 1-to-many relation between a type edge and data edges.
Figure 9B:
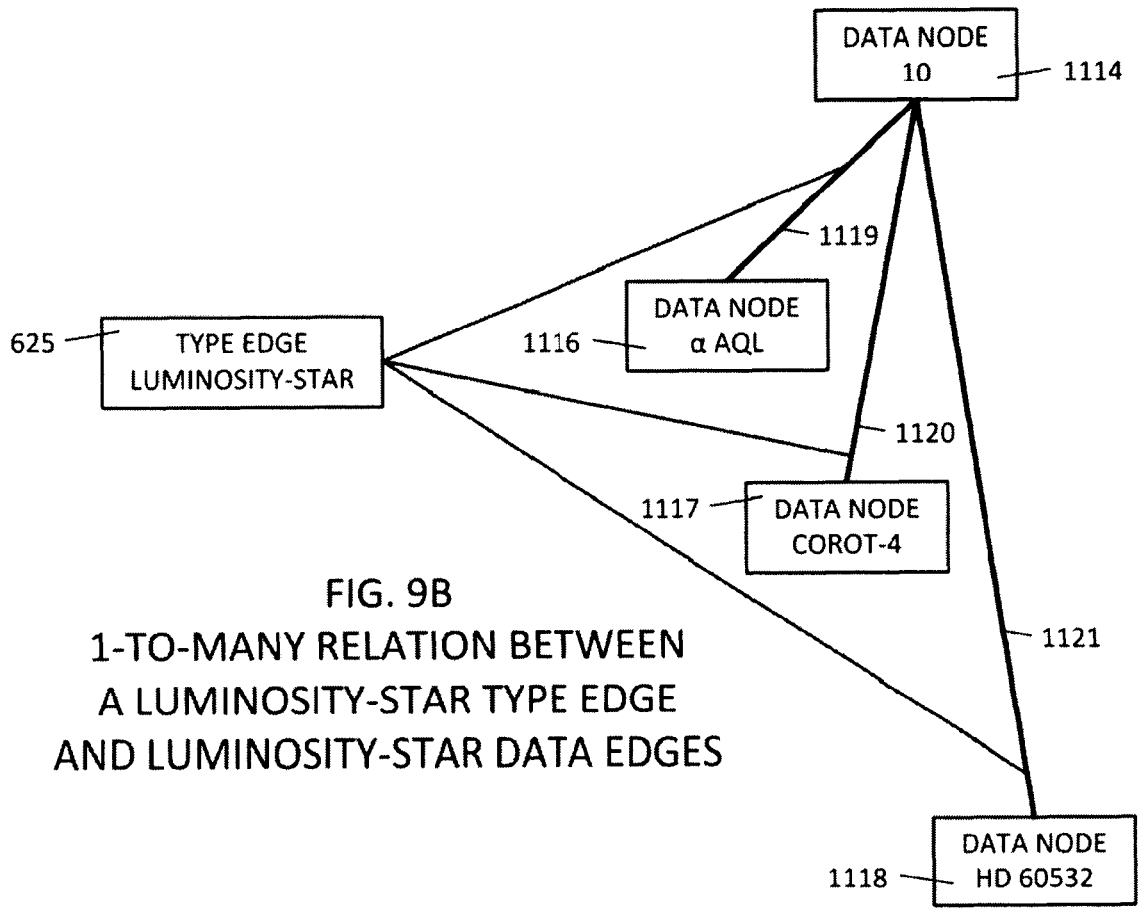
FIG. 9(B) is a block diagram of an example 1-to-many relation between a Luminosity-Star type edge and Luminosity-Star data edges.

A type edge which forms the "blue print" for particular data edges has a 1-to-many relationship to those data edges as an architectural blueprint of a house may be related to many houses built from the blueprint. FIG. 9(A) illustrates an example 1-to-many relation between type edge 900 and an indefinite number of data edges represented by 901, 902, and 903. FIG. 9(B) illustrates an example of a 1-to-many relation between Luminosity-Star type edge 625 and at least Luminosity-Star data edges 1119, 1120 and 1121. 625, 1119, 1120, and 1121 may each be loaded into random-access memory 103. Luminosity data node 1114 and Star data nodes 1116, 1117 and 1118 are illustrated to identify Luminosity-Star data edges 1119, 1120 and 1118.

FIG. 10 illustrates example food data graph 1000, an example of data layer 200, which is designed from food type graph 500 and represents foods, fruits, and vegetables such as oranges, pears, bananas, pumpkins, eggplants and cucumbers. Each data node and data edge within food data graph 1000 is designed from a particular type node or type edge in food type graph 500. Food data graph 1000 is the first of two practical data graph examples which may be loaded into random-access memory 103.

At the center of FIG. 10, food data node 1021 may include at least data edges 1020 and 1022 and is designed from Food type node 517. Data edge 1020 is designed from "Fruit" type edge 519. Data edge 1022 is designed from "Vegetable" type edge 522. Fruit data node 1019 is designed from Fruit type node 521 and may include at least data edges 1004, 1005, 1006, 1010, 1011, 1012, 1016, 1017, and 1018. Vegetable data node 1023 is designed from Vegetable type node 524 and may include at least data edges 1027, 1028, 1029, 1033, 1034, 1035, 1039, 1040, and 1041.

Notice that a data node designed from a collection type node named with a "Collection" suffix, such as OrangeCollection 527, may be treated as an OrangeCollection data node or as multiple orange data nodes such as 1001, 1002, and 1003. In the preferred embodiment, a collection data node may act as a pass-through data node which is traversed only to access internal elements.

Data edges 1004, 1005, and 1006 are designed from "Oranges" type edge 514. Orange data nodes 1001, 1002, and 1003 are designed from Orange type node 501 and represent 34 oranges illustrated by numeral subscripts in each respective node and the ellipses preceding data node 1003. Data edges 1010, 1011, and 1012 are designed from "Bananas" type edge 516. Banana data nodes 1007, 1008, and 1009 are designed from Banana type node 510 and represent 35 bananas illustrated by numeral subscripts in each respective node and the ellipses preceding data node 1009. Data edges 1016, 1017, and 1018 are designed from "Pears" type edge 515. Pear data nodes 1013, 1014, and 1015 are designed from Pear type node 506 and represent 64 pears illustrated by numeral subscripts in each respective node and the ellipses preceding data node 1015.

Data edges 1027, 1028, and 1029 are designed from "Pumpkins" type edge 533. Pumpkin data nodes 1024, 1025, and 1026 are designed from Pumpkin type node 542 and represent 34 pumpkins illustrated by numeral subscripts in each respective node and the ellipses preceding data node 1026. Data edges 1033, 1034, and 1035 are designed from "Cucumbers" type edge 539. Cucumber data nodes 1030, 1031, and 1032 are designed from Cucumber type node 550 and represent 35 cucumbers illustrated by numeral subscripts in each respective node and the ellipses preceding data node 1032. Data edges 1039, 1040, and 1041 are designed from "Eggplants" type edge 536. Eggplant data nodes 1036, 1037, and 1038 are designed from Eggplant type node 546 and represent 64 eggplants illustrated by numeral subscripts in each respective node and the ellipses preceding data node 1038.

Figure 11:
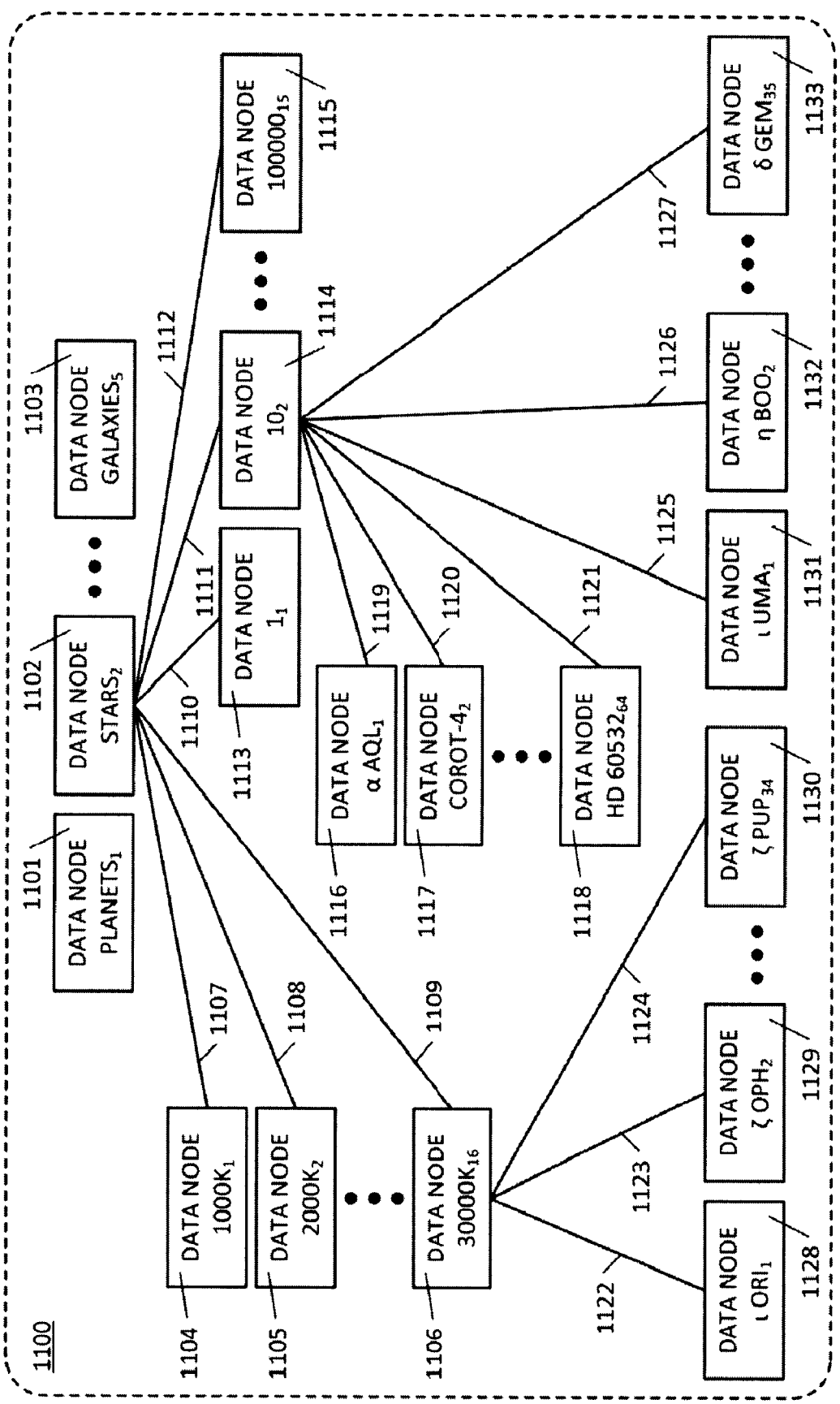
FIG. 11 is a block diagram of an example astronomical data graph designed on an astronomical type graph.

FIG. 11 illustrates example astronomical data graph 1100, an example of data layer 200, which is designed from astronomical type graph 600 and represents astronomical bodies organized by category, luminosity and temperature. Each data node and data edge within astronomical data graph 1100 is designed from a type node or type edge in astronomical type graph 600. Astronomical data graph 1100 is the second of two practical data graph examples which may be loaded into random-access memory 103.

Category data nodes 1101, 1102 and 1103 are designed from Category type node 601 and represent 5 categories illustrated by numeral subscripts in each respective node and the ellipses preceding data node 1103. Category data nodes represent different astronomical phenomena such as planets, stars and galaxies.

"Stars" data node 1102 may include at least data edges 1107, 1108, 1109, 1110, 1111, and 1112. Data edges 1107, 1108, and 1109 are designed from "Temperatures" type edge 606. Temperature data nodes 1104, 1105 and 1106 are designed from Temperature type node 609 and represent 16 temperatures illustrated by numeral subscripts in each respective node and the ellipses preceding data node 1106. Temperature data nodes represent a number in degrees Kelvin and group astronomical phenomena by temperature.

Temperature "30000K" data node 1106 may include at least data edges 1122, 1123, and 1124. Data edges 1122, 1123, and 1124 are designed from "Stars" type edge 614. Star data nodes 1128, 1129, and 1130 are designed from Star type node 617 and represent 34 stars illustrated by numeral subscripts in each respective node and the ellipses preceding data node 1130. Star data nodes 1128, 1129 and 1130 represent stars with surface temperatures of 30,000K due to their associations to Temperature data node 1106 via respective data edges 1122, 1123, and 1124.

Data edges 1110, 1111, and 1112 are designed from "Luminosities" type edge 603. Luminosity data nodes 1113, 1114, and 1115 are designed from Luminosity type node 621 and represent 15 luminosities illustrated by numeral subscripts in each respective node and the ellipses preceding data node 1115. Luminosity data nodes represent energy measured in solar luminosities e.g., the amount of energy radiated by the Earth's sun, which is approximately $3.846 \times 10^{26}$ watts.

Luminosity "10" data node 1114 may include at least data edges 1119, 1120, 1121, 1125, 1126, and 1127. Data edges 1119, 1120, and 1121 are designed from "MainSequence" type edge 625. Star data nodes 1116, 1117, and 1118 are designed from Star type node 617 and represent 64 stars illustrated by numeral subscripts in each respective node and the ellipses preceding data node 1118. Since Star data nodes 1116, 1117, and 1118 are associated to Luminosity data node "10" 1114 through data edges 1119, 1120, and 1121 which are designed on type edge "MainSequence" 625, Star data nodes 1116, 1117, and 1118 represent stars with 10 solar luminosities on the main sequence of the astronomical Hertzsprung-Russell diagram (not shown).

Data edges 1125, 1126, and 1127 are designed from "SubGiants" type edge 627. Star data nodes 1131, 1132, and 1133 are designed from Star type node 617 and represent 35 stars illustrated by numeral subscripts in each respective node and the ellipses preceding data node 1133. Since Star data nodes 1131, 1132, and 1133 are associated to Luminosity data node "10" 1114 through data edges 1125, 1126, and 1127 which are designed on type edge "SubGiants" 627, Star data nodes 1131, 1132, and 1133 represent stars with 10 solar luminosities classified as sub-giants on the astronomical Hertzsprung-Russell diagram (not shown).

Figure 12A:
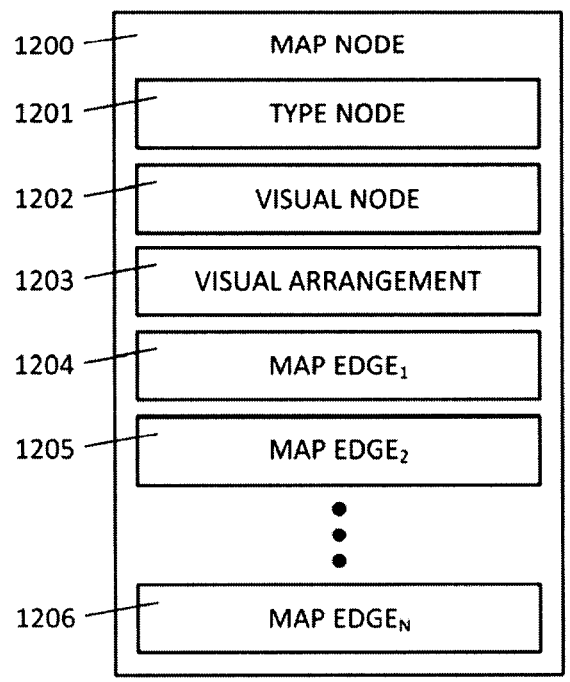
FIG. 12(A) is a block diagram of an example map node which may be included in a map graph.
Figure 12B:
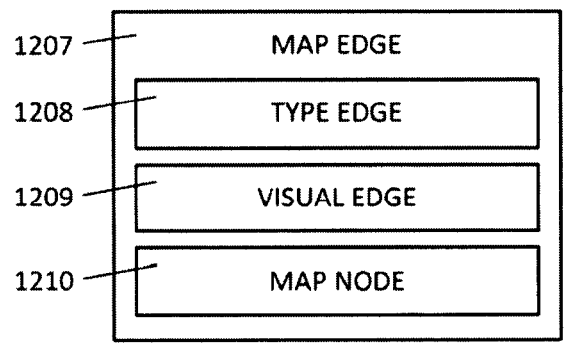
FIG. 12(B) is a block diagram of an example map edge which may be included in a map graph.

FIGS. 12A-12B illustrates example map node 1200 and map edge 1207, components of map layer 203, whose main purposes are to encapsulate graphical information, and to provide the "blue prints" for visualization nodes and visualization edges which visualize a particular concept or phenomenon.

FIG. 12(A) illustrates example map node 1200, an example component of map layer 203, which is a graph node that may be loaded into random-access memory 103. Map node 1200 may include at least type node 1201, visual node 1202, visual arrangement 1203, and an indefinite number of map edges represented by 1204, 1205, and 1206. Map node 1200 is a "blue print" for visualization node 1900 (FIG. 19(A)) by enabling the concept or phenomenon represented by data nodes designed from type node 1201 to be associated visual node 1202 and visual arrangement 1203. During visualization node construction, described in greater detail for FIG. 25, each data node designed on type node 1201 is associated to a copy of the graphical information in visual node 1202 and associated to a copy of the graphical information in visual arrangements 1203.

FIG. 12(B) illustrates example map edge 1207, an example component of map layer 203, which is a graph edge that may be loaded into random-access memory 103. Map edge 1207 may include at least type edge 1208, visual edge 1209, and map node 1210. The second node for a map edge is the outer map node which defines the map edge. For example, the second node for map edges 1204, 1205 and 1206 is map node 1200. Map edge 1207 is a "blue print" for visualization edge 1907 (FIG. 19(B)) by enabling the concept or phenomenon represented by data edges designed from type edge 1208 to be associated to visual edge 1209. During visualization edge construction, described in greater detail for FIG. 26, each data edge designed from type edge 1208 is associated to a copy of the graphical information in visual edge 1209.

Figure 12C:
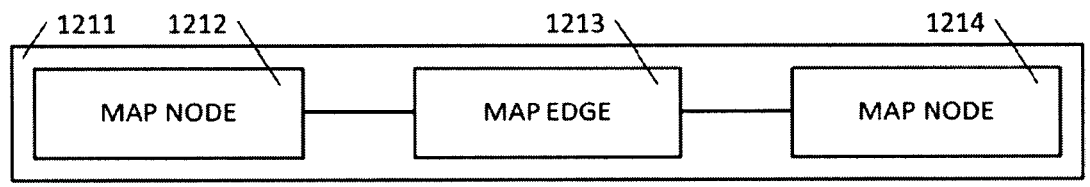
FIG. 12(C) is a block diagram of an example minimum map graph which includes two map nodes connected by a map edge.

FIG. 12(C) illustrates example minimum map graph 1211 which may be loaded into random-access memory 103. Minimum map graph 1211 may include at least two map nodes 1212 and 1214 connected by map edge 1213.

Figure 13A:
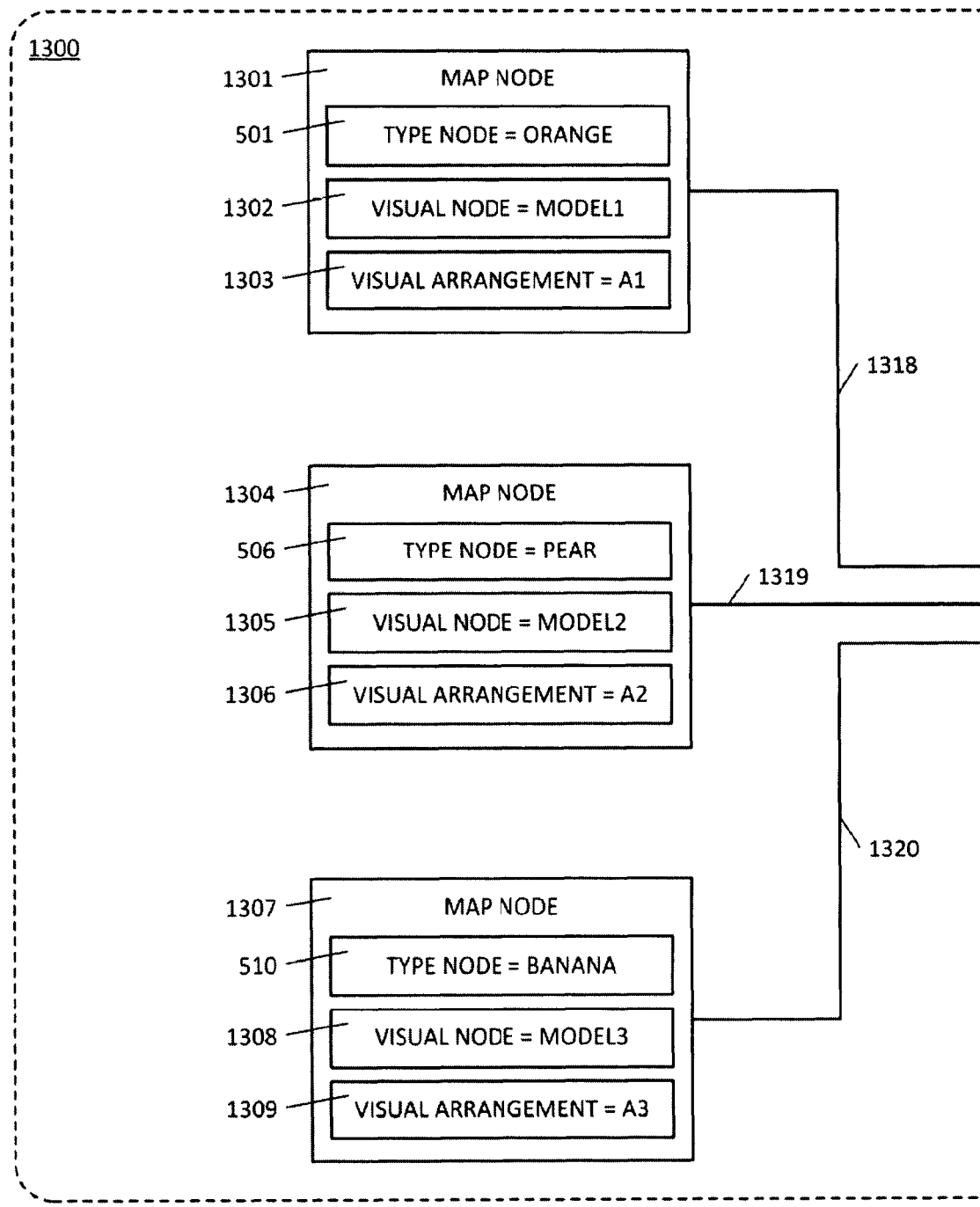
FIGS. 13(A)-13(C) is a block diagram illustrating a practical map graph example of foods. The diagram includes visual node definitions and visual arrangement definitions and is related to a food type graph.
Figure 13B:
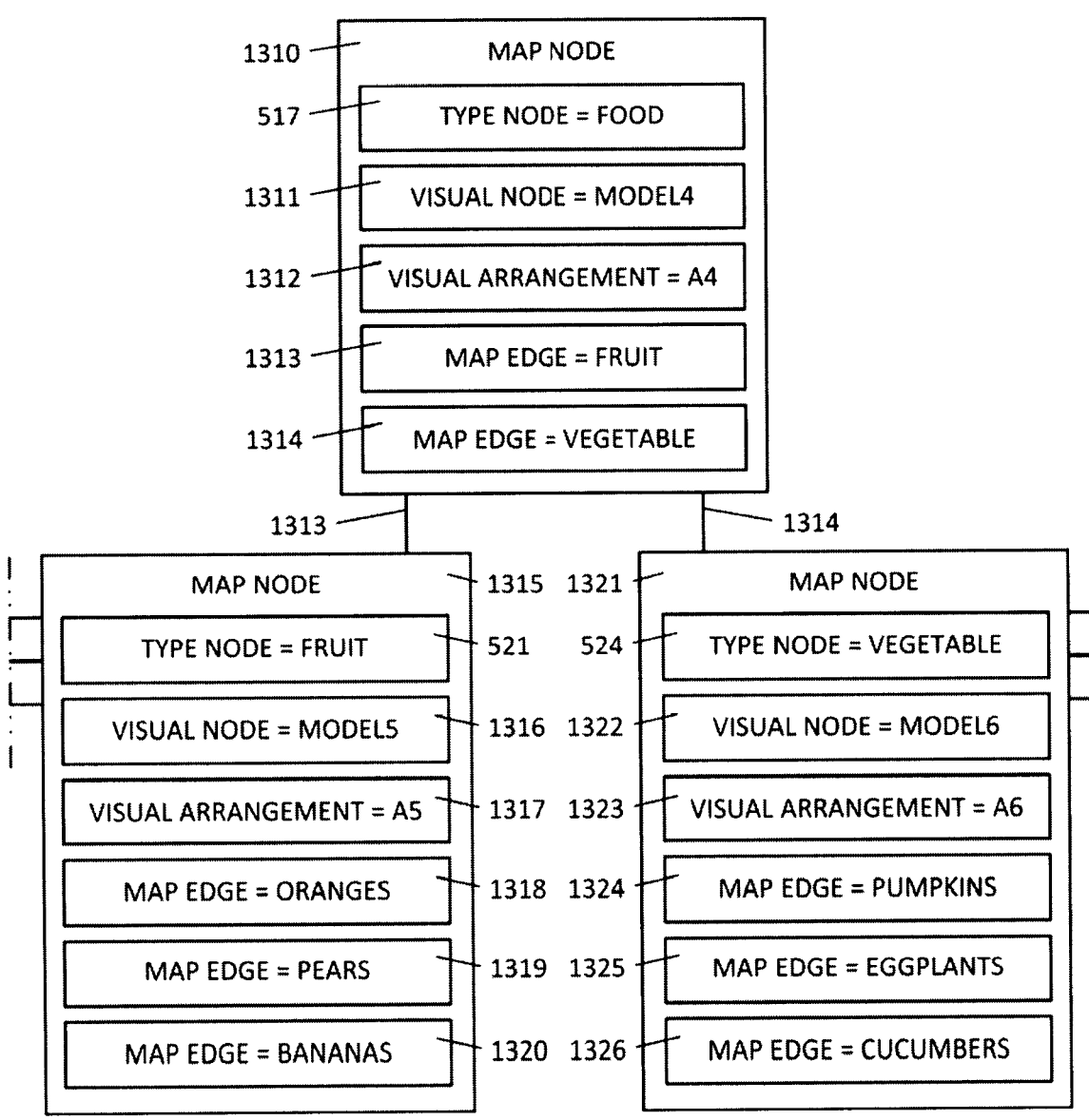
Figure 13C:
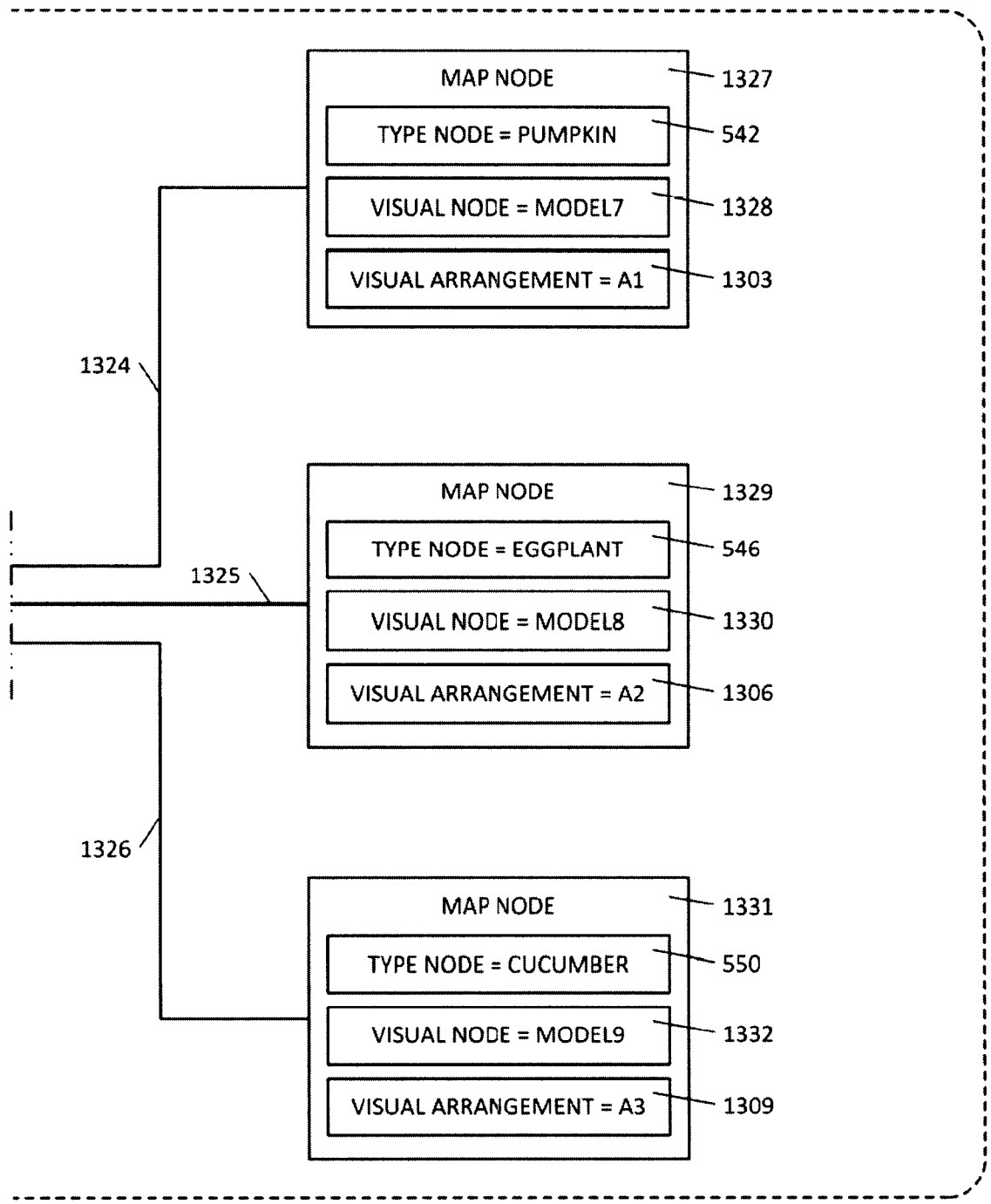

FIGS. 13(A)-13(C) illustrates example food map graph 1300, an example of map layer 203, which is the "blue print" to food visualization graph 3200 (FIG. 32) that visualizes foods, fruits, and vegetables such as oranges, pears, bananas, pumpkins, eggplants and cucumbers. Food map graph 1300 is the first of two practical map graph examples which may be loaded into random-access memory 103.

FIG. 13(A) illustrates example "Orange" map node 1301, "Pear" map node 1304, and "Banana" map node 1307. Each map node enables association between at least one data node of an associated type node to at least one three-dimensional model and at least one three-dimensional arrangement. Map node 1301 may include at least "Orange" type node 501, visual node 1302, and visual arrangement 1303. Map node 1301 represents a mapping point between at least one Orange data node in food data graph 1000 and visual node 1302 and visual arrangement 1303. Visual node 1302 represents graphical information including three-dimensional models which, when copied, may be used to visualize a particular Orange data node. Visual arrangement 1303 represents the arrangement of at least one three-dimensional model which is associated to an Orange data node. Map edge 1318 illustrates an association between "Orange" map node 1301 and "Fruit" map node 1315.

Map node 1304 may include at least "Pear" type node 506, visual node 1305, and visual arrangement 1306. Map node 1304 represents a mapping point between at least one Pear data node in food data graph 1000 and visual node 1305 and visual arrangement 1306. Visual node 1305 represents graphical information including three-dimensional models which, when copied, may be used to visualize a particular Pear data node. Visual arrangement 1306 represents the arrangement of at least one three-dimensional model which is associated to a Pear data node. Map edge 1319 illustrates an association between "Pear" map node 1304 and "Fruit" map node 1315.

Map node 1307 may include at least "Banana" type node 510, visual node 1308, and visual arrangement 1309. Map node 1307 represents a mapping point between at least one Banana data node in food data graph 1000 and visual node 1308 and visual arrangement 1309. Visual node 1308 represents graphical information including three-dimensional models which, when copied, may be used to visualize a particular Banana data node. Visual arrangement 1309 represents the arrangement of at least one three-dimensional model which is associated to a Banana data node. Map edge 1320 illustrates an association between "Banana" map node 1307 and "Fruit" map node 1315.

FIG. 13(B) illustrates example "Food" map node 1310, "Fruit" map node 1315, and "Vegetable" map node 1321. Map node 1310 may include at least "Food" type node 517, visual node 1311, visual arrangement 1312, and map edges 1313 and 1314. Map node 1310 represents a mapping point between at least one Food data node in food data graph 1000 and visual node 1311 and visual arrangement 1312. Visual node 1311 represents graphical information including three-dimensional models which, when copied, may be used to visualize a particular Food data node. Visual arrangement 1312 represents the arrangement of at least one three-dimensional model which is associated to a Food data node. Map edge 1313 illustrates an association between "Food" map node 1310 and "Fruit" map node 1315. Map edge 1314 illustrates an association between "Food" map node 1310 and "Vegetable" map node 1321.

Map node 1315 may include at least "Fruit" type node 521, visual node 1316, visual arrangement 1317, and map edges 1318, 1319, and 1320. Map node 1315 represents a mapping point between at least one Fruit data node in food data graph 1000 and visual node 1316 and visual arrangement 1317. Visual node 1316 represents graphical information including three-dimensional models which, when copied, may be used to visualize a particular Fruit data node. Visual arrangement 1317 represents the arrangement of at least one three-dimensional model which is associated to a Fruit data node. Map edge 1318 illustrates an association between "Fruit" map node 1315 and "Orange" map node 1301. Map edge 1319 illustrates an association between "Fruit" map node 1315 and "Pear" map node 1304. Map edge 1320 illustrates an association between "Fruit" map node 1315 and "Banana" map node 1307.

Map node 1321 may include at least "Vegetable" type node 524, visual node 1322, visual arrangement 1323, and map edges 1324, 1325, and 1326. Map node 1321 represents a mapping point between at least one Vegetable data node in food data graph 1000 and visual node 1322 and visual arrangement 1323. Visual node 1322 represents graphical information including three-dimensional models which, when copied, may be used to visualize a particular Vegetable data node. Visual arrangement 1323 represents the arrangement of at least one three-dimensional model which is associated to a Vegetable data node. Map edge 1324 illustrates an association between "Vegetable" map node 1321 and "Pumpkin" map node 1327. Map edge 1325 illustrates an association between "Vegetable" map node 1321 and "Eggplant" map node 1329. Map edge 1326 illustrates an association between "Vegetable" map node 1321 and "Cucumber" map node 1331.

FIG. 13(C) illustrates example "Pumpkin" map node 1327, "Eggplant" map node 1329, and "Cucumber" map node 1331. Map node 1327 may include at least "Pumpkin" type node 542, visual node 1328, and visual arrangement 1303. Notice that visual arrangement 1303 is identical to the arrangement used by "Orange" map node 1301. Map node 1327 represents a mapping point between at least one Pumpkin data node in food data graph 1000 and visual node 1328 and visual arrangement 1303. Visual node 1328 represents graphical information including three-dimensional models which, when copied, may be used to visualize a particular Pumpkin data node. Visual arrangement 1303 represents the arrangement of at least one three-dimensional model which is associated to a Pumpkin data node. Map edge 1324 illustrates an association between "Vegetable" map node 1321 and "Pumpkin" map node 1327.

Map node 1329 may include at least "Eggplant" type node 546, visual node 1330, and visual arrangement 1306. Notice that visual arrangement 1306 is identical to the arrangement used by "Pear" map node 1304. Map node 1329 represents a mapping point between at least one Eggplant data node in food data graph 1000 and visual node 1330 and visual arrangement 1306. Visual node 1330 represents graphical information including three-dimensional models which, when copied, may be used to visualize a particular Eggplant data node. Visual arrangement 1306 represents the arrangement of at least one three-dimensional model which is associated to an Eggplant data node. Map edge 1325 illustrates an association between "Vegetable" map node 1321 and "Eggplant" map node 1329.

Map node 1331 may include at least "Cucumber" type node 550, visual node 1332, and visual arrangement 1309. Notice that visual arrangement 1309 is identical to the arrangement used by "Banana" map node 1307. Map node 1331 represents a mapping point between at least one Cucumber data node in food data graph 1000 and visual node 1332 and visual arrangement 1309. Visual node 1331 represents graphical information including three-dimensional models which, when copied, may be used to visualize a particular Cucumber data node. Visual arrangement 1309 represents the arrangement of at least one three-dimensional model which is associated to a Cucumber data node. Map edge 1326 illustrates an association between "Vegetable" map node 1321 and "Cucumber" map node 1331.

Figure 14A:
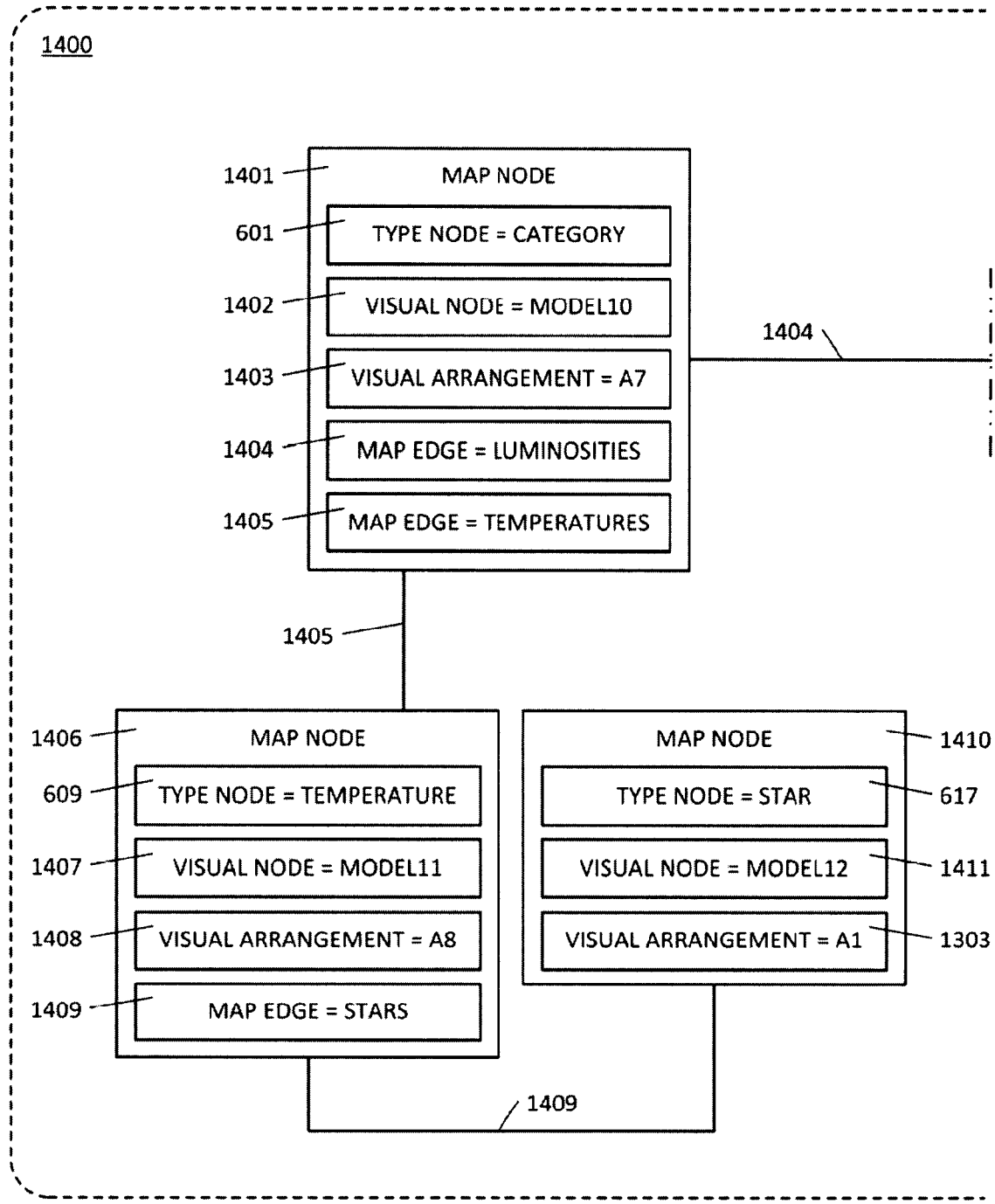
FIGS. 14(A)-14(B) is a block diagram illustrating a practical map graph example of astronomical phenomena. The diagram includes visual node definitions and visual arrangement definitions and is related to an astronomical type graph.
Figure 14B:
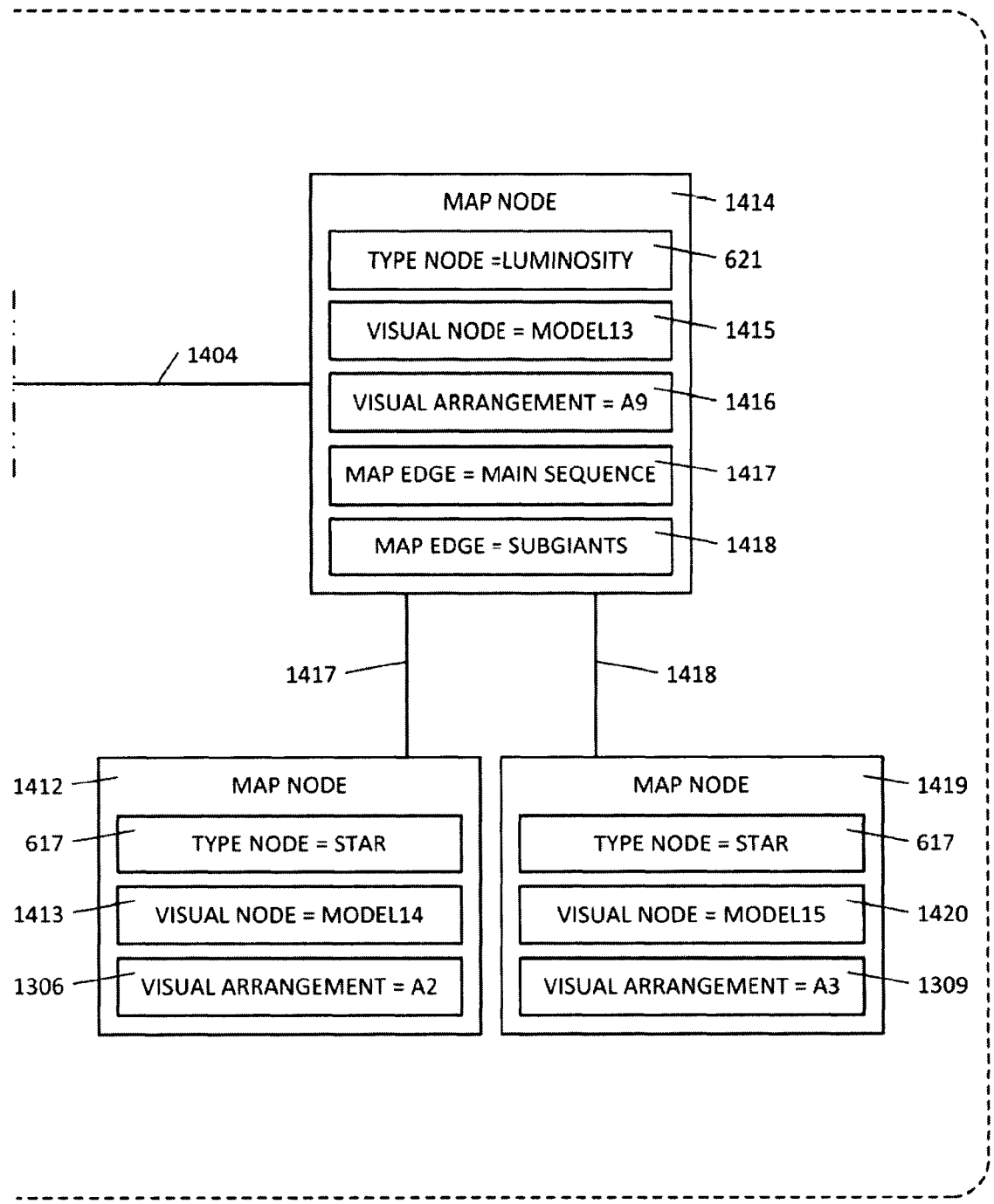

FIGS. 14(A)-14(B) illustrates example astronomical map graph 1400, an example of map layer 203, which is the "blue print" to astronomical visualization graph 3300 (FIG. 33) that visualizes astronomical bodies organized by category, luminosity and temperature. Astronomical map graph 1400 is the second of two practical map graph examples which may be loaded into random-access memory 103.

FIG. 14(A) illustrates example "Category" map node 1401, "Temperature" map node 1406, and "Star" map node 1410. Map node 1401 may include at least "Category" type node 601, visual node 1402, visual arrangement 1403, and map edges 1404 and 1405. Map node 1401 represents a mapping point between at least one Category data node in astronomical data graph 1100 and visual node 1402 and visual arrangement 1403. Visual node 1402 represents graphical information including three-dimensional models which, when copied, may be used to visualize a particular Category data node. Visual arrangement 1403 represents the arrangement of at least one three-dimensional model which is associated to a Category data node. Map edge 1404 illustrates an association between "Category" map node 1401 and "Luminosity" map node 1414. Map edge 1405 illustrates an association between "Category" map node 1401 and "Temperature" map node 1406.

Map node 1406 may include at least "Temperature" type node 609, visual node 1407, visual arrangement 1408, and map edge 1409. Map node 1406 represents a mapping point between at least one Temperature data node in astronomical data graph 1100 and visual node 1407 and visual arrangement 1408. Visual node 1407 represents graphical information including three-dimensional models which, when copied, may be used to visualize a particular Temperature data node. Visual arrangement 1408 represents the arrangement of at least one three-dimensional model which is associated to a Temperature data node. Map edge 1409 illustrates an association between "Temperature" map node 1406 and "Star" map node 1410.

Map node 1410 may include at least "Star" type node 617, visual node 1411, and visual arrangement 1303. Map node 1410 represents a mapping point between at least one Star data node in astronomical data graph 1100 and visual node 1411 and visual arrangement 1303. Visual node 1411 represents graphical information including three-dimensional models which, when copied, may be used to visualize a particular Star data node. Visual arrangement 1303 represents the arrangement of at least one three-dimensional model which is associated to a Star data node.

FIG. 14(B) illustrates example "Luminosity" map node 1414, "Star" map node 1412, and "Star" map node 1419. Notice that it is possible for a map graph to include multiple map nodes with an identical type node but different visual nodes and visual arrangements. For example, map nodes 1410, 1412 and 1419 are associated to "Star" type node 617 with different visual nodes and different visual arrangements.

Map node 1414 may include at least "Luminosity" type node 621, visual node 1415, visual arrangement 1416, and map edges 1417 and 1418. Map node 1414 represents a mapping point between at least one Luminosity data node in astronomical data graph 1100 and visual node 1415 and visual arrangement 1416. Visual node 1415 represents graphical information including three-dimensional models which, when copied, may be used to visualize a particular Luminosity data node. Visual arrangement 1416 represents the arrangement of at least one three-dimensional model which is associated to a Luminosity data node. Map edge 1417 illustrates an association between "Luminosity" map node 1414 and "Star" map node 1412. Map edge 1418 illustrates an association between "Luminosity" map node 1414 and "Star" map node 1419.

Map node 1412 may include at least "Star" type node 617, visual node 1413, and visual arrangement 1306. Map node 1412 represents a mapping point between at least one Star data node in astronomical data graph 1100 and visual node 1413 and visual arrangement 1306. Visual node 1413 represents graphical information including three-dimensional models which, when copied, may be used to visualize a particular Star data node. Visual arrangement 1306 represents the arrangement of at least one three-dimensional model which is associated to a Star data node.

Map node 1419 may include at least "Star" type node 617, visual node 1420, and visual arrangement 1309. Map node 1419 represents a mapping point between at least one Star data node in astronomical data graph 1100 and visual node 1420 and visual arrangement 1511. Visual node 1420 represents graphical information including three-dimensional models which, when copied, may be used to visualize a particular Star data node. Visual arrangement 1411 represents the arrangement of at least one three-dimensional model which is associated to a Star data node.

Figure 15:
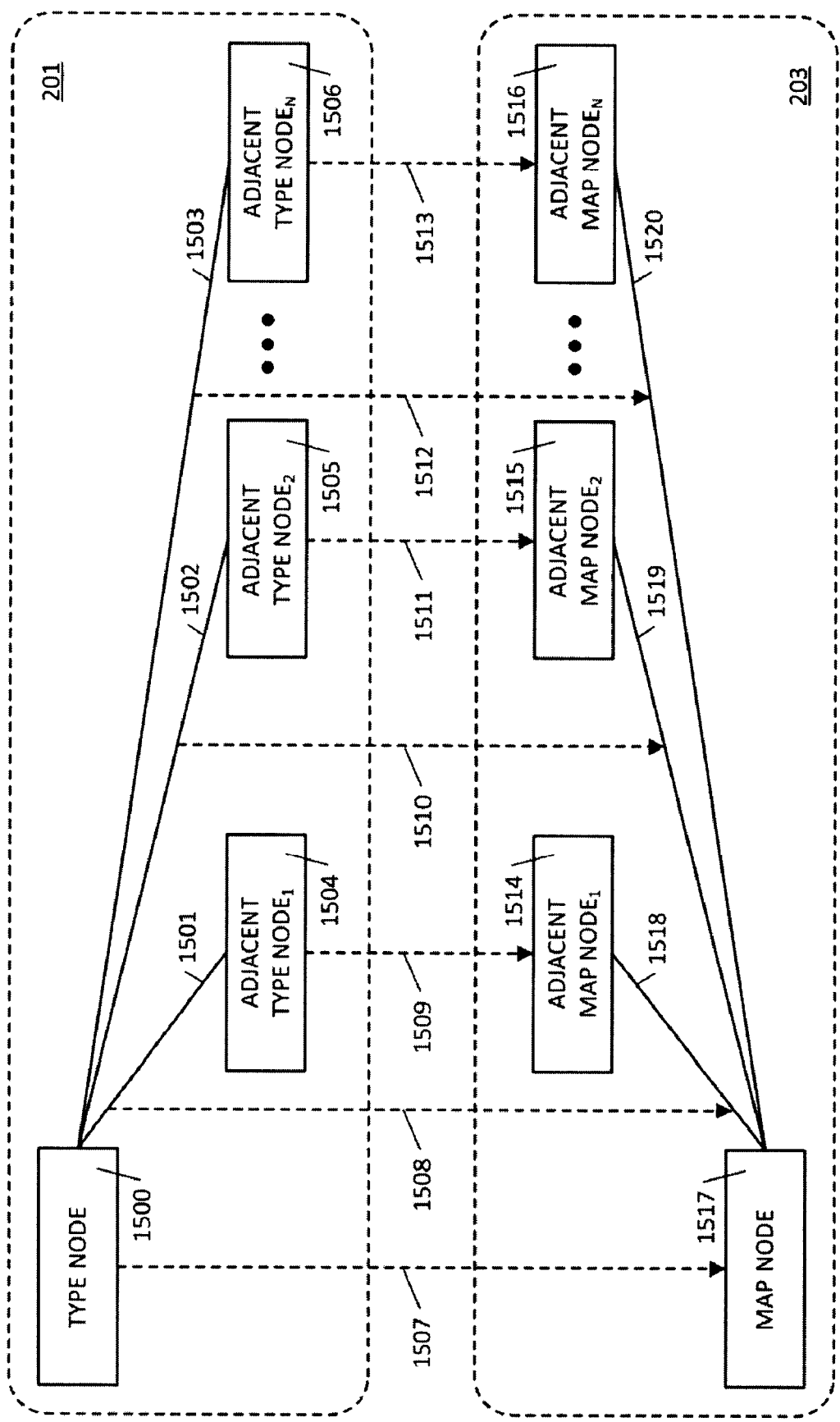
FIG. 15 is a block diagram of example associations between elements of a type graph and elements of a map graph.

A critical part of the invention's ability to visualize a data graph is based on the ability to associate a data graph to three-dimensional models and three-dimensional arrangements through a type graph and map graph. The bridge role of a type graph and map graph is enabled by a 1-to-1 relation between the type graph and map graph. FIG. 15 illustrates an example 1-to-1 relation of type nodes to map nodes and a 1-to 1 relation of type edges to map edges. The 1-to-1 relation of type nodes to map nodes and type edges to map edges illustrates a detailed view of an association between type layer 201 and map layer 203 at point 205. The association in step 205 between type layer 201 and map layer 203 is crucial to producing visualization of data layer 200 in visualization layer 204. Nodes which are at the end of a single edge are referred to as "adjacent" to the originating node. The term "originating" and "end" are used to illustrate relative node relationships in the graph and diagram only. No directionality in the graph is implied or excluded.

Type node 1500 is associated 1507 to map node 1517. Adjacent type nodes 1504, 1505, and 1506 are respectively associated 1509, 1511, and 1513 to adjacent map nodes 1514, 1515, and 1516. Map edges 1501, 1502, and 1503 are respectively associated 1508, 1510, and 1512 to map edges 1518, 1519, and 1520.

Figure 16A:
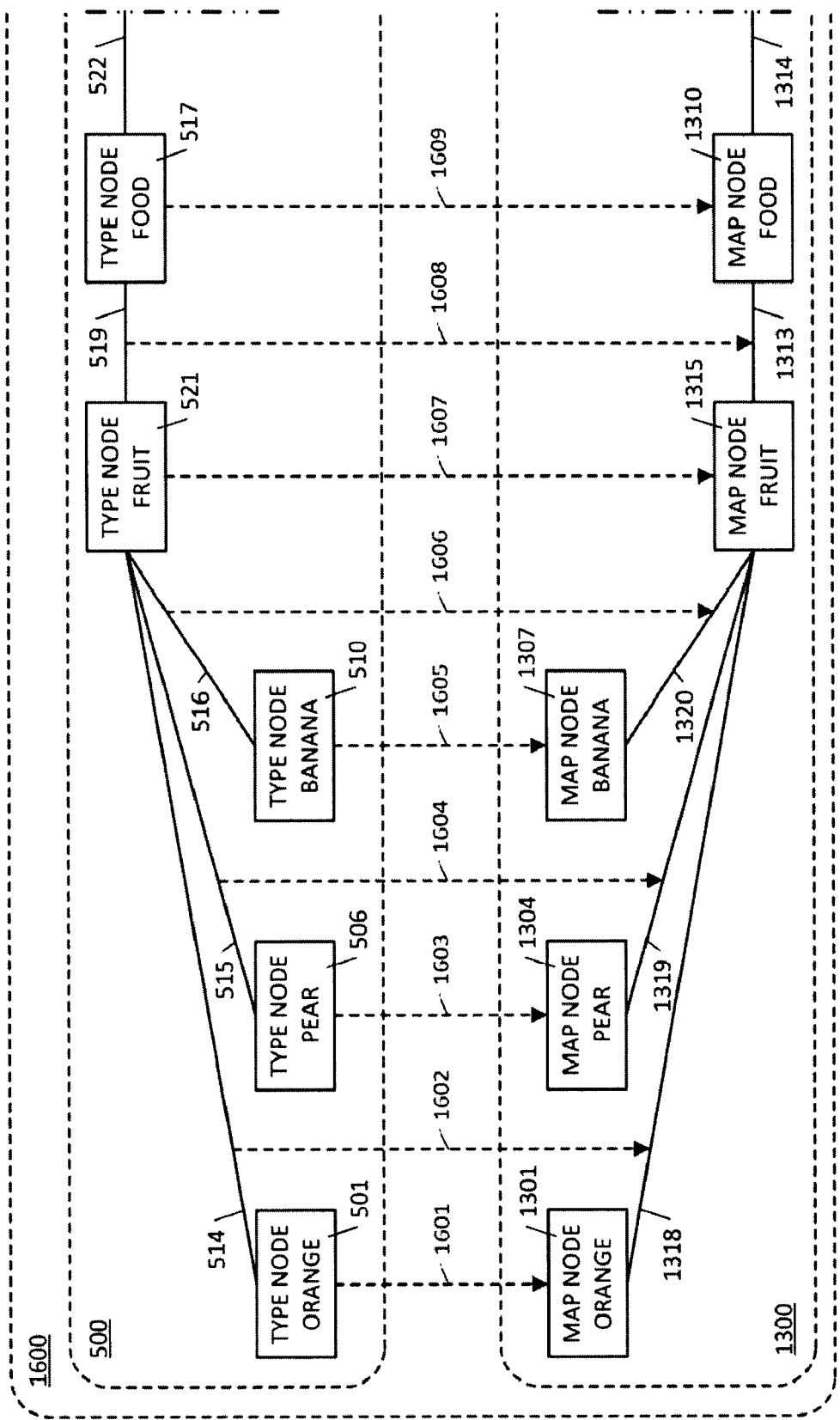
FIGS. 16(A)-16(B) is a block diagram illustrating an example of practical associations between a food type graph and a food map graph.
Figure 16B:
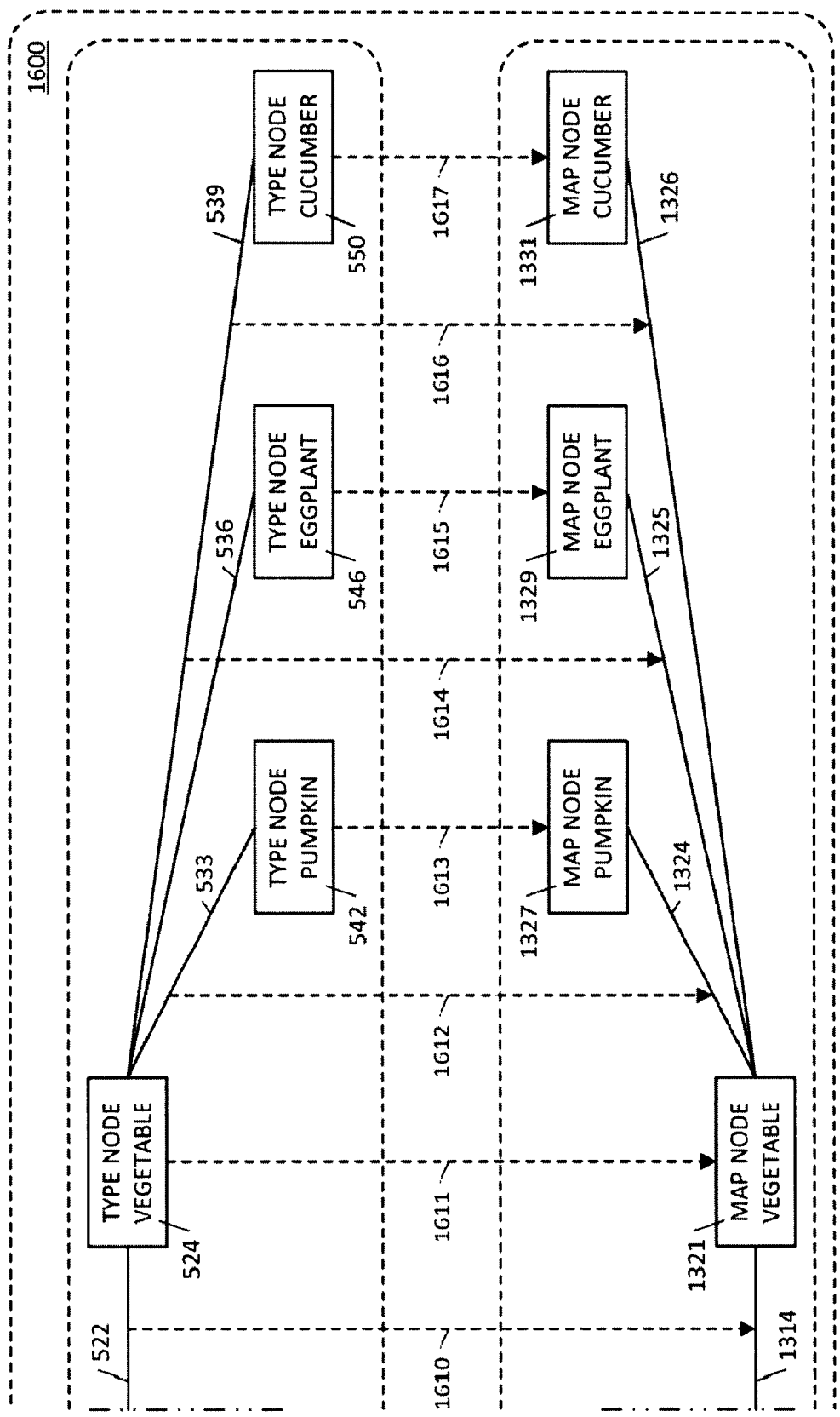

FIGS. 16(A)-16(B) illustrates example association 1600 as a 1-to-1 relation between food type graph 500 and food map graph 1300. Association 1600 illustrates the first of two practical type graph-to-map graph associations which may be performed by CPU 108.

FIG. 16(A) illustrates type nodes 501, 506, 510, 521 and 517 respectively associated 1601, 1603, 1605, 1607, and 1609 to map nodes 1301, 1304, 1307, 1315, and 1310. Type edges 514, 515, 516, and 519 are respectively associated 1602, 1604, 1606, and 1608 to map edges 1318, 1319, 1320, and 1313.

FIG. 16(B) illustrates type nodes 524, 542, 546, and 550 respectively associated 1611, 1613, 1615, and 1617 to map nodes 1321, 1327, 1329, and 1331. Map edges 522, 533, 536, and 539 are respectively associated 1610, 1612, 1614, and 1616 to map edges 1314, 1324, 1325, and 1326.

Figure 17A:
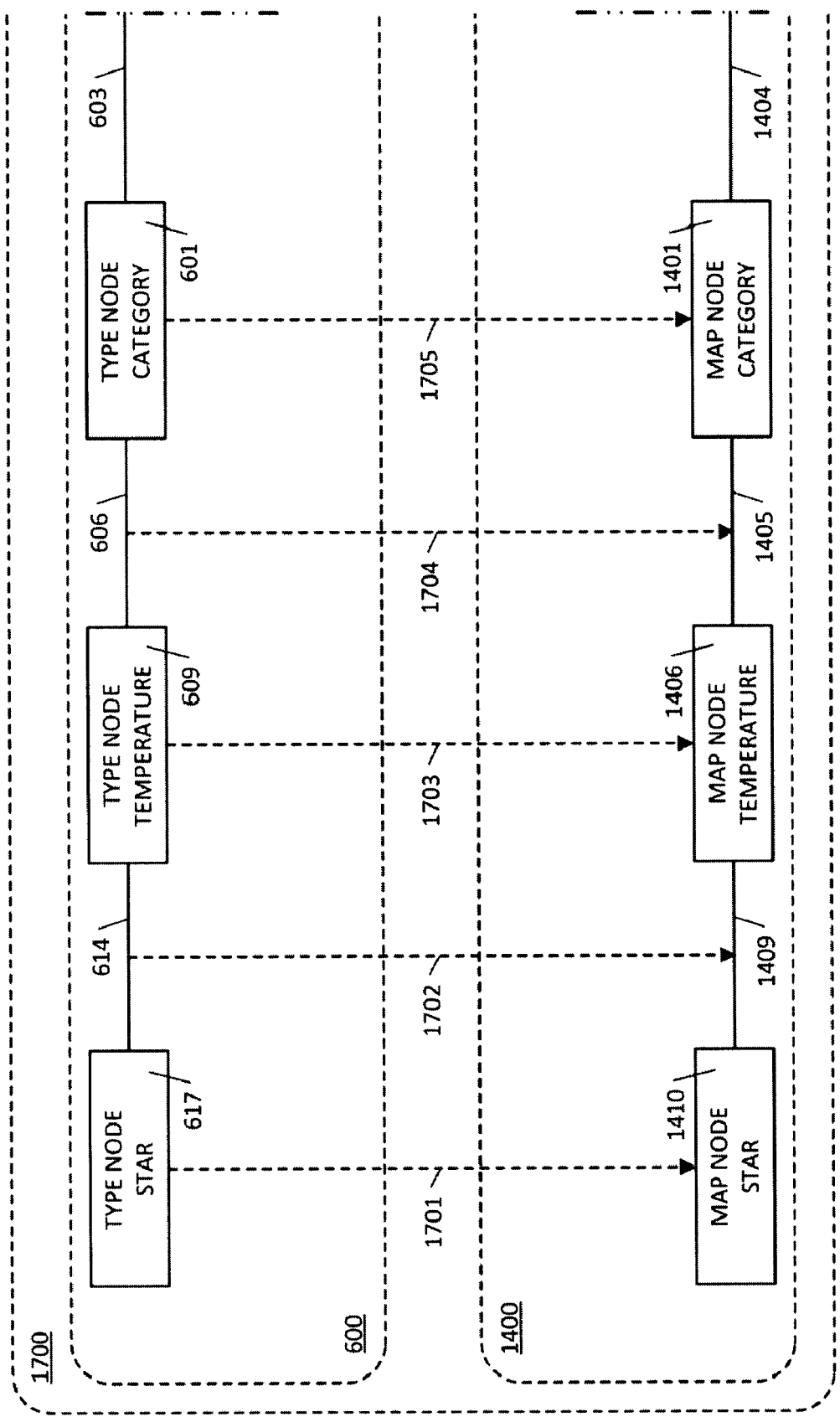
FIGS. 17(A)-17(B) is a block diagram illustrating an example of practical associations between an astronomical type graph and an astronomical map graph.
Figure 17B:
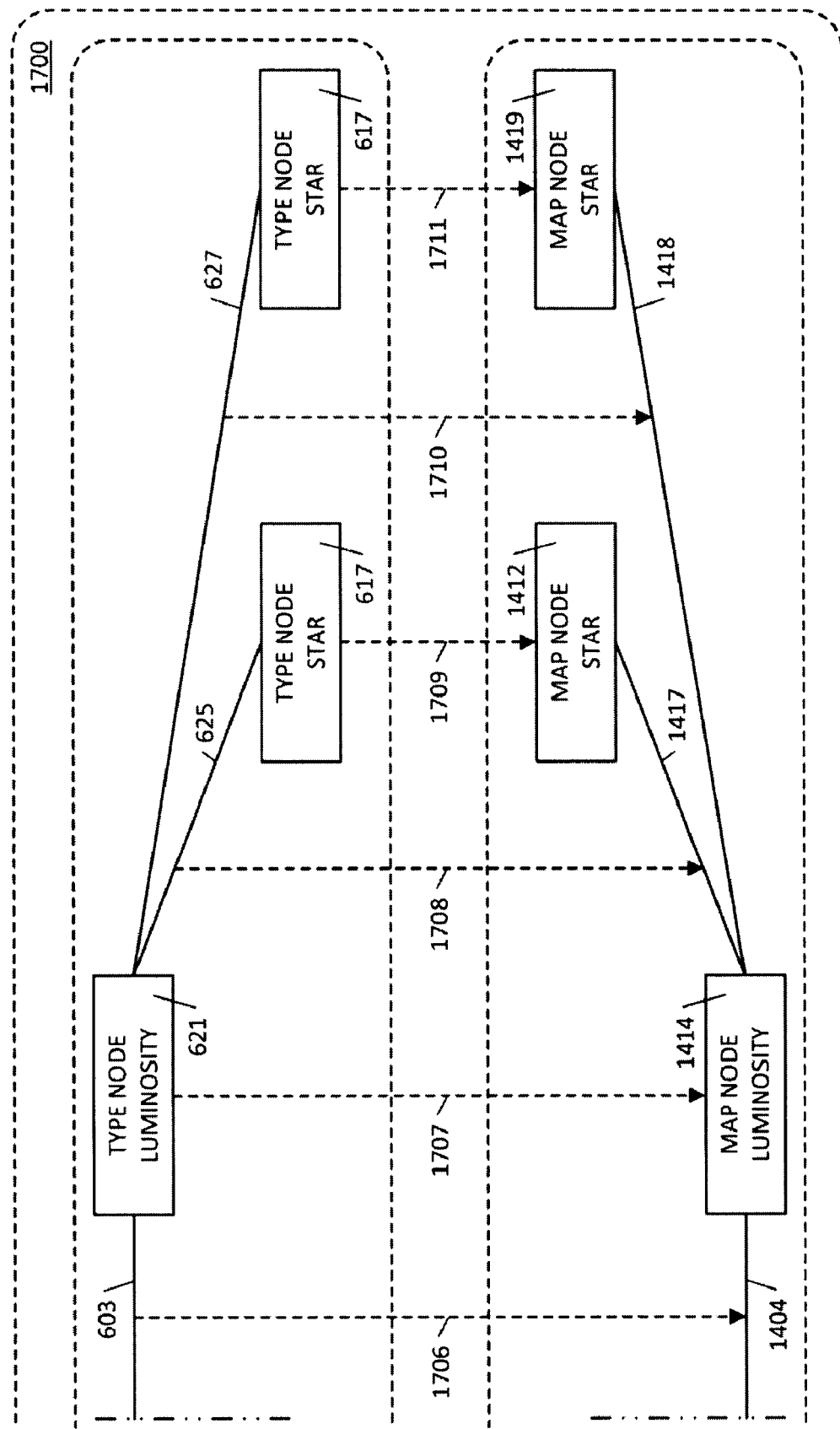

FIGS. 17(A)-17(B) illustrates example association 1700 as a 1-to-1 relation between astronomical type graph 600 and astronomical map graph 1400. Association 1700 illustrates the second of two practical type graph-to-map graph associations which may be performed by CPU 108.

FIG. 17(A) illustrates type nodes 617, 609, and 601 respectively associated 1701, 1703, and 1705 to map nodes 1410,

1406, 1401. Type edges 614 and 606 are respectively associated 1702 and 1704 to map edges 1409 and 1405.

FIG. 17(B) illustrates type nodes 621, 617, and another 617 respectively associated 1707, 1709, and 1711 to map nodes 1414, 1412, and 1419. Type edges 603, 625, and 627 are respectively associated 1706, 1708, and 1710 to map edges 1404, 1417, and 1418.

Figure 18A:
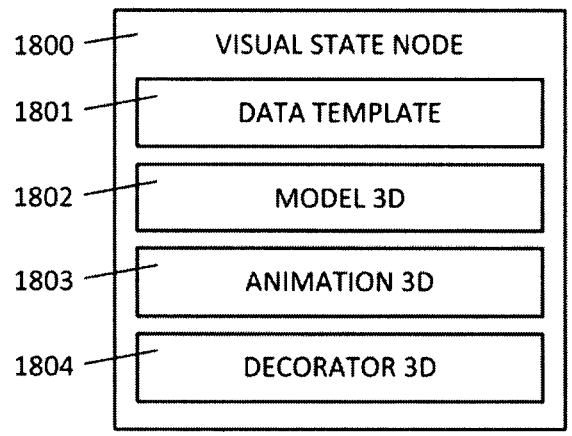
FIG. 18(A) is a block diagram illustrating an example visual state node which includes a three-dimensional model and may be a component of a visual node.

FIG. 18(A) illustrates example visual state node 1800, a component of visual layer 202, whose main purpose is to define three-dimensional graphical information which may represent a data node after association step 205. Visual state node 1800 represents a single visual state in which a data node may occupy at any particular time.

Visual state node 1800 may include at least data template 1801, three-dimensional model 1802, three-dimensional animation 1803, and three-dimensional decorator 1804. 1801, 1802, 1803 and 1804 may be loaded into random-access memory 103. 1802, 1803 and 1804 may also be loaded into graphics memory 110. Data template 1801 includes user-defined instructions on how to modify or replace three-dimensional model 1802 based on the information in an associated data node. Three-dimensional model 1802 illustrates a visual model which may represent a data node. Three-dimensional animation 1803 illustrates animation information which may be performed with three-dimensional model 1802. Three-dimensional decorator 1804 illustrates additional visual model information which may adorn three-dimensional model 1802. An example decorator may be a three-dimensional model of a picture frame that surrounds three-dimensional model 1802.

Figure 18B:
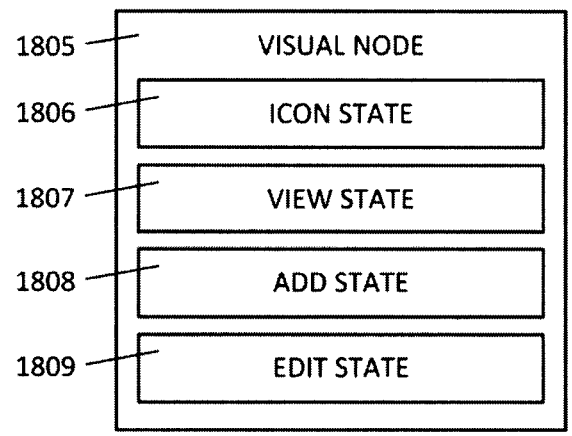
FIG. 18(B) is a block diagram illustrating an example visual node which includes multiple visual state nodes and may be a component of a map node.

FIG. 18(B) illustrates example visual node 1805, a component of visual layer 202 which may be loaded into random-access memory 103, and includes at least multiple visual state nodes that may represent a data node at various points in time. While the preferred embodiment may include at least multiple visual state nodes within a visual node, it is to be understood that another embodiment may include different visual state nodes or a different number of visual state nodes without disrupting the design and function of the method.

Visual node 1805 may include at least "Icon" state 1806, "View" state 1807, "Add" state 1808, and "Edit" state 1809. 1806, 1807, 1808 and 1809 are each an example visual state node. "Icon" state 1806 may define a small, non-editable, iconic three-dimensional model 1802 which represents an associated data node. "View" state 1807 may define a large, non-editable three-dimensional model 1802 which represents an associated data node. "Add" state 1808 may define a large, editable three-dimensional model 1802 which represents a new instance of an associated data node. "Edit" state 1809 may define a large, editable three-dimensional model 1802 which represents an existing instance of an associated data node.

A significant reason for providing multiple visual states for a single data node may be explained by the scenario of a user who wishes to view the same data node as a small three-dimensional model while browsing multiple data nodes but wish to have an expanded, detailed three-dimensional model while editing or inspecting the associated data node. Different visual state nodes 1806, 1807, 1808, and 1809 within visual node 1805 enable a user to view multiple three-dimensional model representations of a single data node at different times.

Figure 18C:
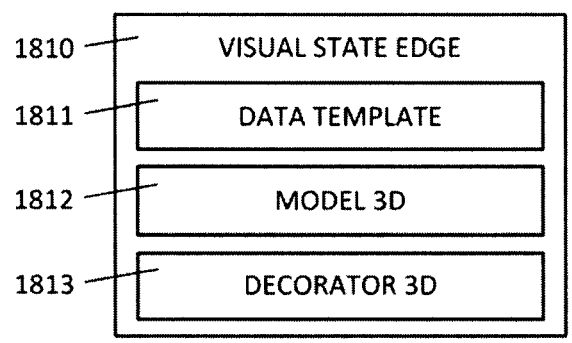
FIG. 18(C) is a block diagram illustrating an example visual state edge which includes a three-dimensional model and may be a component of a visual edge.

FIG. 18(C) illustrates example visual state edge 1810, a component of visual layer 202, whose main purpose is to define graphical information which may represent a data edge after association step 205. Visual state edge 1810 represents a single visual state in which a data edge may occupy at any particular time.

Visual state edge 1810 may include at least data template 1811, three-dimensional model 1812, and three-dimensional decorator 1813. 1811, 1812, and 1813 may be loaded into random-access memory 103. 1812 and 1813 may also be loaded into graphics memory 110. Data template 1811 includes information on how to modify three-dimensional model 1812 based on the information in an associated data edge. Three-dimensional model 1812 illustrates a visual model which may represent a data edge. Three-dimensional decorator 1813 illustrates additional visual model information which may adorn three-dimensional model 1812.

Figure 18D:
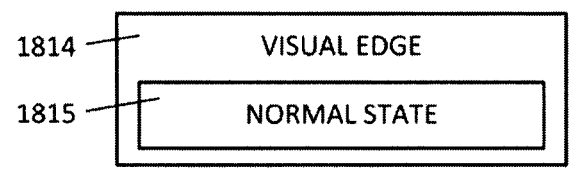
FIG. 18(D) is a block diagram illustrating an example visual edge which includes a visual state edge and may be a component of a map edge.

FIG. 18(D) illustrates example visual edge 1814, a component of visual layer 202 which may be loaded into random-access memory 103, and may include at least a single visual state edge that may represent a data edge. While the preferred embodiment may include at least a single visual state edge within a visual edge, another embodiment may include a different visual state edge or a different number of visual state edges without disrupting the design and function of the method. Visual edge 1814 may include at least "Normal" state 1815 which is an example visual state node. "Normal" state 1815 may define three-dimensional model 1812 of a black line which represents an associated data edge.

Figure 19A:
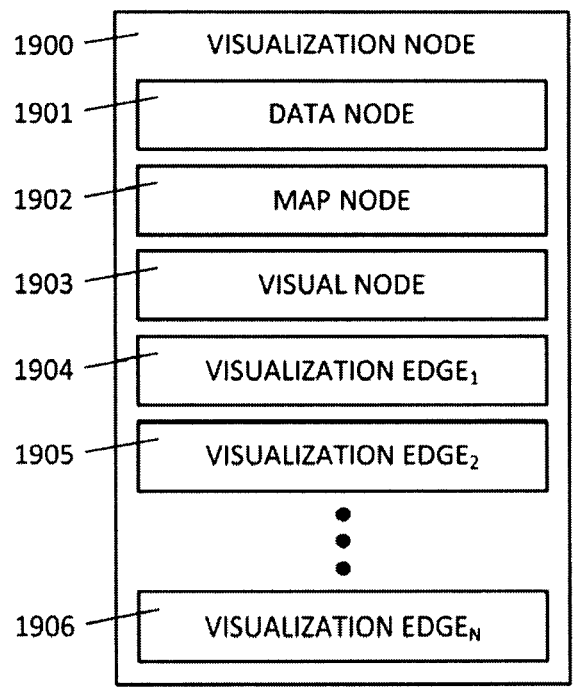
FIG. 19(A) is a block diagram illustrating an example visualization node which may include a data node, map node, visual node, and visualization edges.

FIG. 19(A) illustrates example visualization node 1900, a graph node and component of visualization layer 204, which may be loaded into random-access memory 103. The main purpose of visualization node 1900 is to associate data node 1901 with a three-dimensional model in visual node 1903. Visualization node 1900 may be created during association step 205 and may include at least data node 1901, map node 1902, visual node 1903, and an indefinite number of visualization edges represented by 1904, 1905, and 1906. Visualization Node 1900 is designed on the architectural "blue print" of map node 1902. Visual node 1903 is copied from visual node 1202 in map node 1902. And, by way of example, if map node 1902 is equivalent to map node 1200 (FIG. 12(A)), then visualization edges 1904, 1905, and 1906 are designed on map edges 1204, 1205, and 1206 respectively.

Figure 19B:
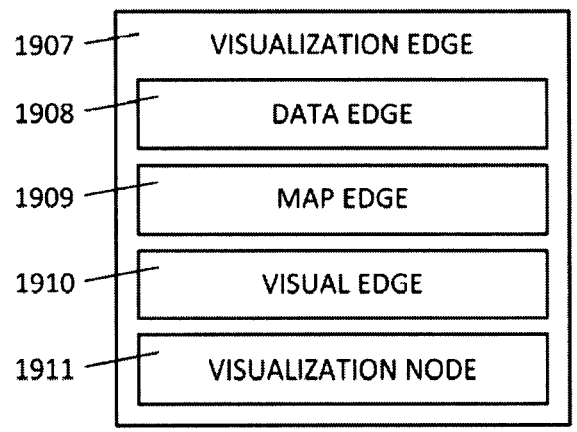
FIG. 19(B) is a block diagram illustrating an example visualization edge which may include a data edge, map edge, visual edge and visualization node.

FIG. 19(B) illustrates example visualization edge 1907, a graph edge and component of visualization layer 204, which may be loaded into random-access memory 103. The main purpose of visualization edge 1907 is to associate data edge 1908 with a three-dimensional model in visual edge 1910. Visual edge 1910 is copied from visual edge 1209 in map edge 1909. Visualization edge 1907 may be created during association step 205 and may include at least data edge 1908, map edge 1909, visual edge 1910, and visualization node 1911. The second node for a visualization edge is the outer visualization node which defines the visualization edge. For example, the second node for visualization edges 1904, 1905 and 1906 is visualization node 1900.

Figure 19C:
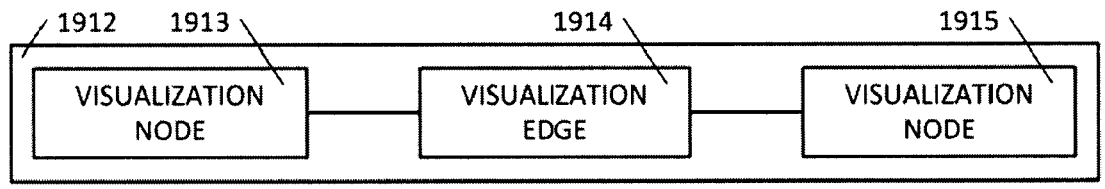
FIG. 19(C) is a block diagram illustrating an example minimum visualization graph which includes two visualization nodes connected by a visualization edge.

FIG. 19(C) illustrates example minimum visualization graph 1912 which may be loaded into random-access memory 103. Minimum visualization graph 1912 may include at least two visualization nodes 1913 and 1915 connected by visualization edge 1914.

Figure 20A:
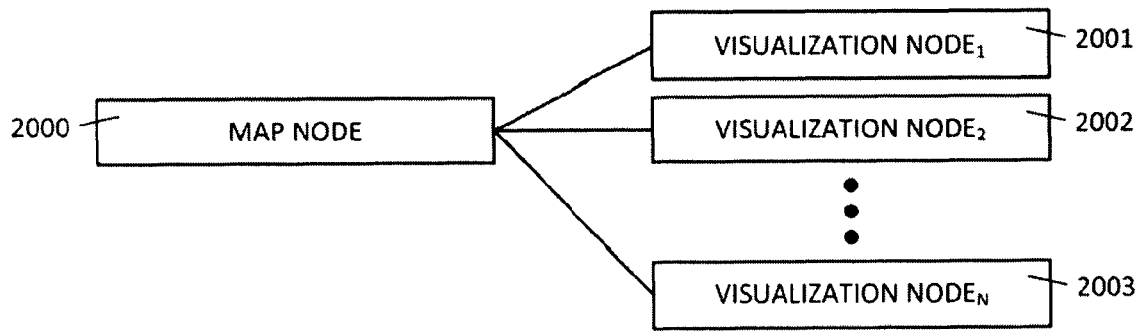
FIG. 20(A) is a block diagram of an example 1-to-many relation between a map node and visualization nodes.
Figure 20B:
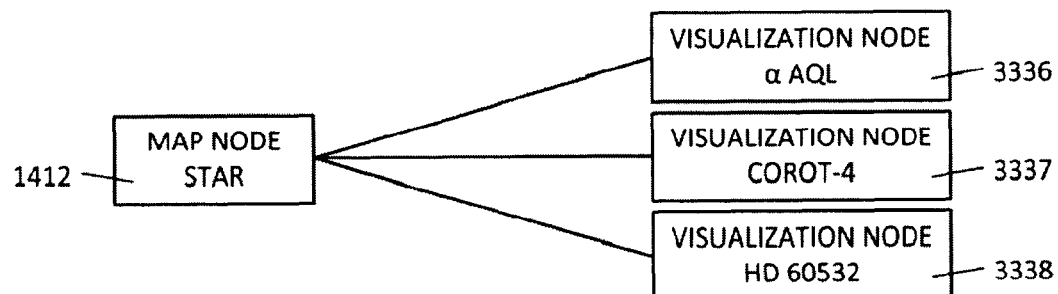
FIG. 20(B) is a block diagram of an example 1-to-many relation between a star map node and star visualization nodes.

A map node which forms the "blue print" for particular visualization nodes has a 1-to-many relationship to those visualization nodes as an architectural blueprint of a house may be related to many houses built from the blueprint. FIG. 20(A) illustrates an example 1-to-many relation between map node 2000 and an indefinite number of visualization nodes represented by 2001, 2002, and 2003. FIG. 20(B) illustrates a practical example of a 1-to-many relation between Star map node 1412 which forms the design "blue print" for Star visualization nodes "α AQL" 3336, "COROT-4" 3337 and "HD 60532" 3338. 1412, 3336, 3337, and 3338 may each be loaded into random-access memory 103.

Figure 21A:
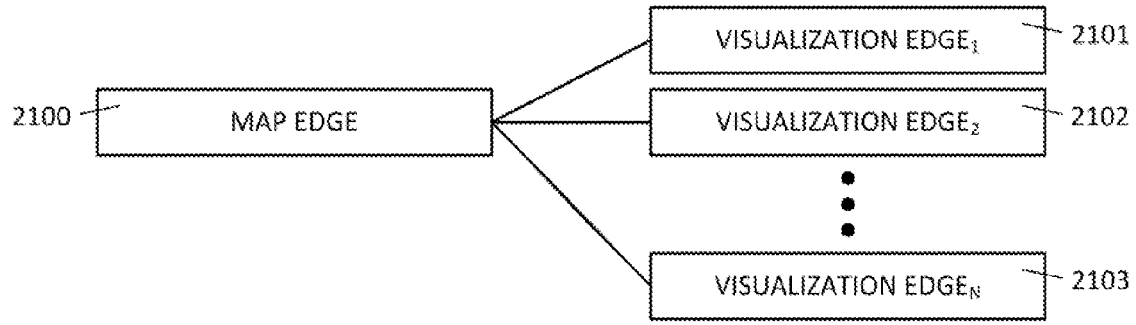
FIG. 21(A) is a block diagram of an example 1-to-many relation between a map edge and visualization edges.
Figure 21B:
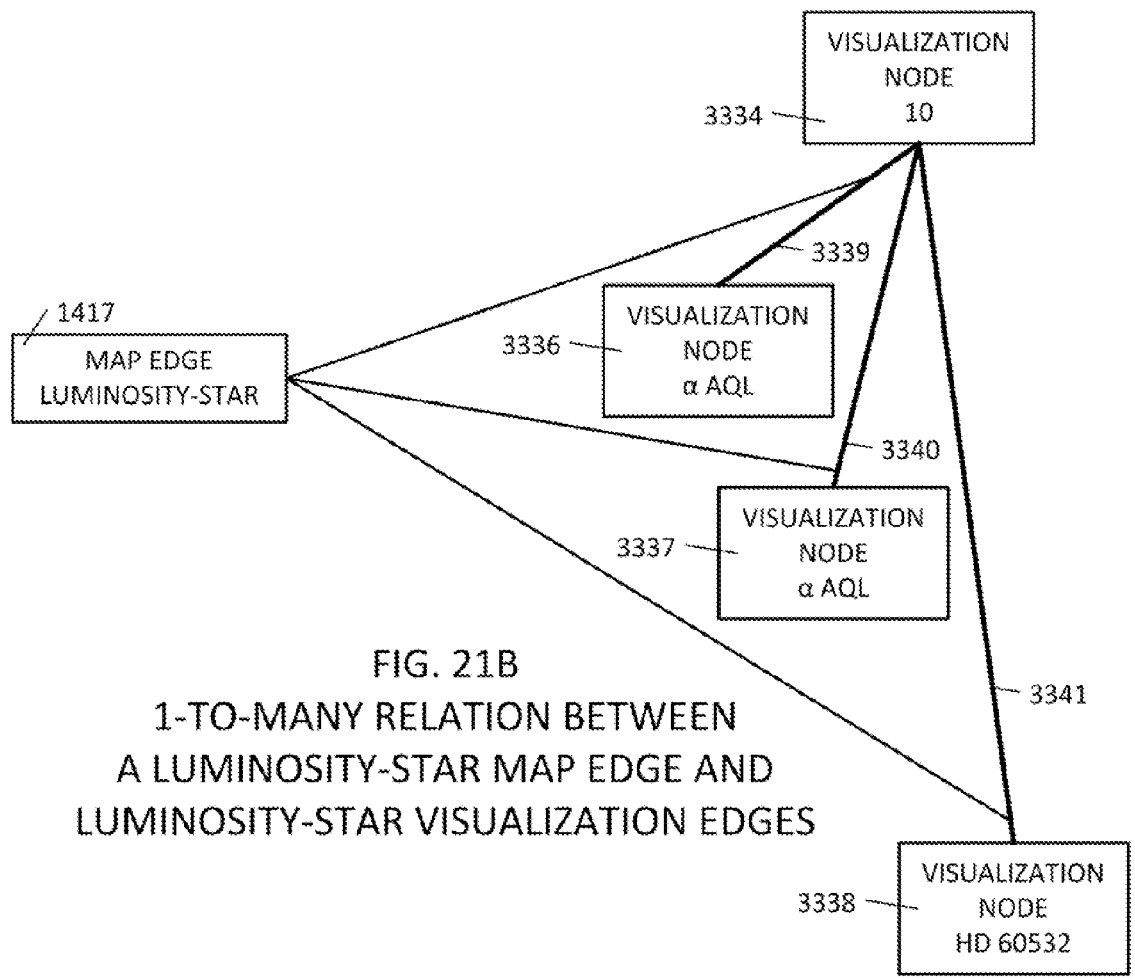
FIG. 21(B) is a block diagram of an example 1-to-many relation between a Luminosity-Star map edge and Luminosity-Star visualization edges.

A map edge which forms the "blue print" for particular visualization edges has a 1-to-many relationship to those visualization edges as an architectural blueprint of a house may be related to many houses built from the blueprint. FIG. 21(A) illustrates a practical example of a 1-to-many relation between map edge 2100 and an indefinite number of visualization edges represented by 2101, 2102, and 2103. FIG. 21(B) illustrates an example of a 1-to-many relation between Luminosity-Star map edge 1417 and at least Luminosity-Star visualization edges 3339, 3340 and 3341. 1417, 3339, 3340, and 3341 may each be loaded into random-access memory 103. Luminosity visualization node 3334 and Star visualization nodes 3336, 3337 and 3338 are illustrated to identify Luminosity-Star visualization edges 3339, 3340 and 3341.

FIG. 22 illustrates an example 1-to-1 relation of data nodes to visualization nodes and a 1-to 1 relation of data edges to visualization edges. The 1-to-1 relation of data nodes to visualization nodes and data edges to visualization edges illustrates a detailed view of an association between data layer 200 and visualization layer 204 at point 205. Nodes which are at the end of a single edge are referred to as "adjacent" to the originating node. The term "originating" and "end" are used to illustrate relative node relationships in the graph and diagram only. No directionality in the graph is implied or excluded.

Data node 2200 is associated 2207 to visualization node 2217. Adjacent data nodes 2204, 2205, and 2206 are respectively associated 2209, 2211, and 2213 to adjacent visualization nodes 2214, 2215, and 2216. Data edges 2201, 2202, and 2203 are respectively associated 2208, 2210, and 2212 to visualization edges 2218, 2219, and 2220.

Figure 23:
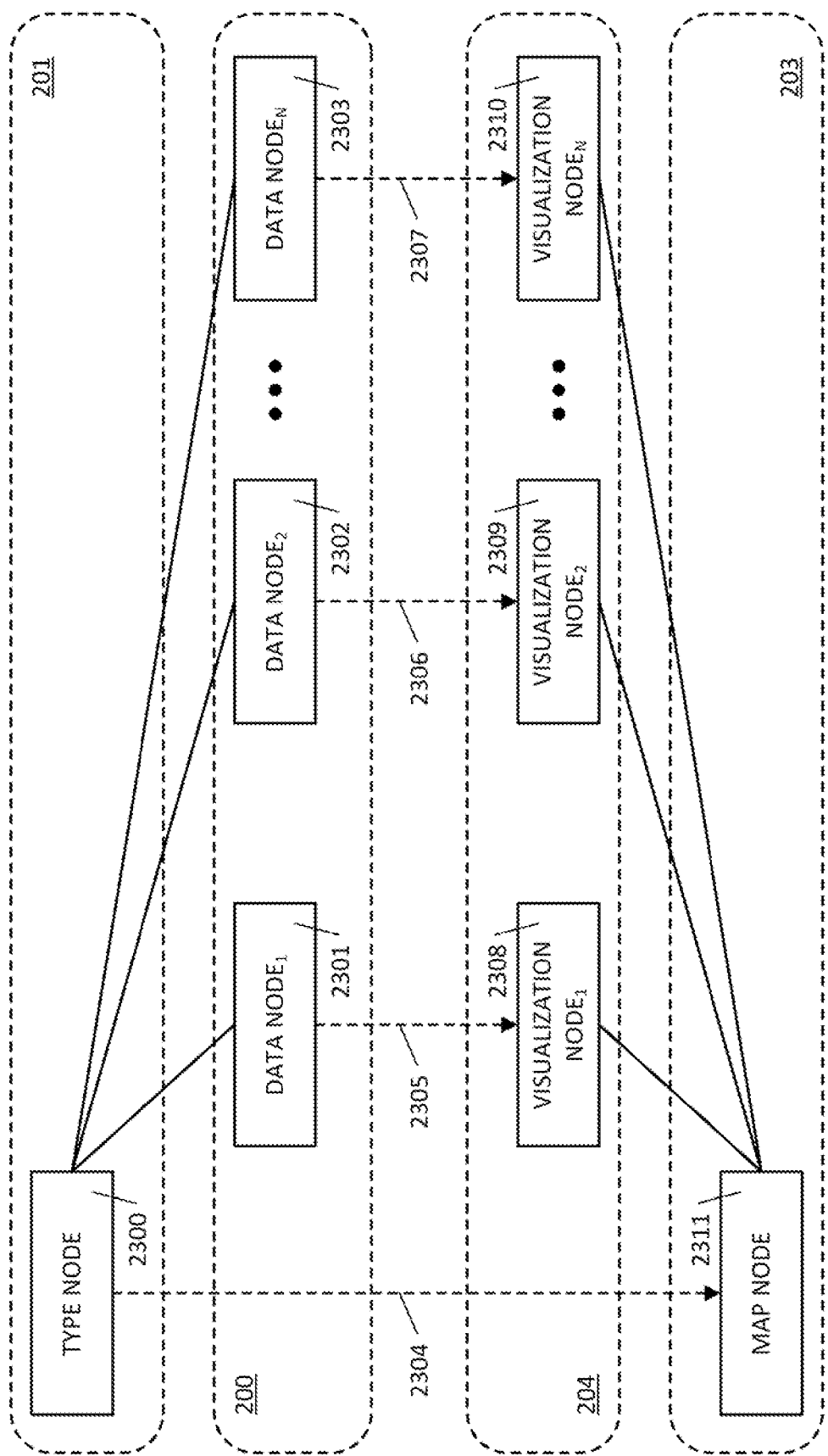
FIG. 23 is a block diagram of example associations between data nodes and visualization nodes in relation to a type node to map node association.
Figure 24:
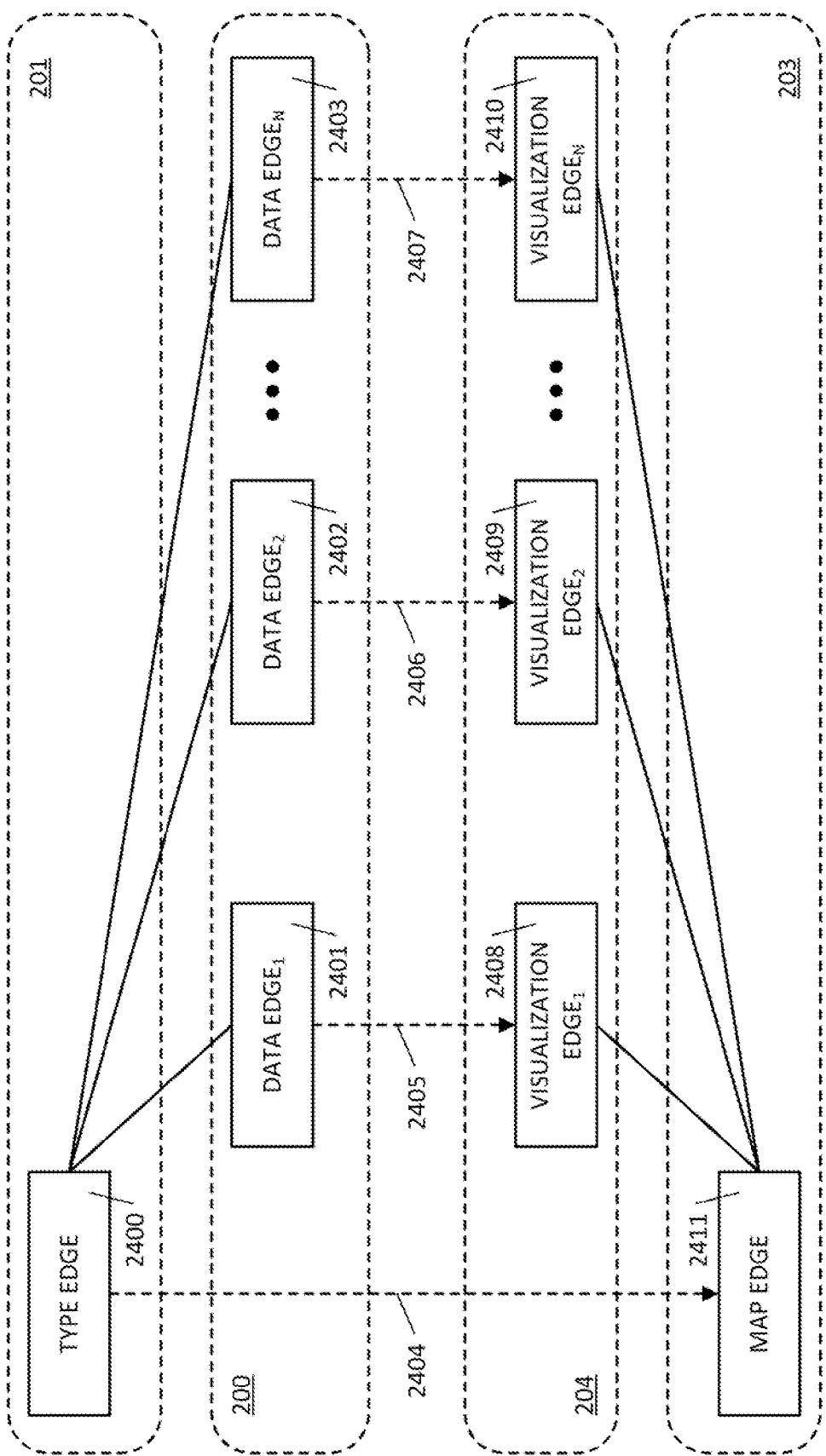
FIG. 24 is a block diagram of example associations between data edges and visualization edges in relation to a type edge to map edge association.

FIGS. 23-24 illustrate an example of node and edge associations occurring across layers 200, 201, 203, and 204. FIG. 23 illustrates an example 1-to-1 relation of type node 2300 through association 2304 to map node 2311 while simultaneously showing a 1-to-many relation of type node to data nodes and a 1-to-many relation of map node to visualization nodes. Type node 2300 has a 1-to-many relation to at least an indefinite number of data nodes represented by 2301, 2302, and 2303. Map node 2311 has a 1-to-many relation to at least an indefinite number of visualization nodes represented by 2308, 2309, and 2310.

FIG. 24 illustrates an example 1-to-1 relation of type edge 2400 through association 2404 to map edge 2411 while simultaneously showing a 1-to-many relation of a type edge to data edges and a 1-to-many relation of a map edge to visualization edges. Type edge 2400 has a 1-to-many relation to at least an indefinite number of data edges represented by 2401, 2402, and 2403. Map edge 2411 has a 1-to-many relation to at least an indefinite number of visualization edges represented by 2408, 2409, and 2410.

Figure 25:
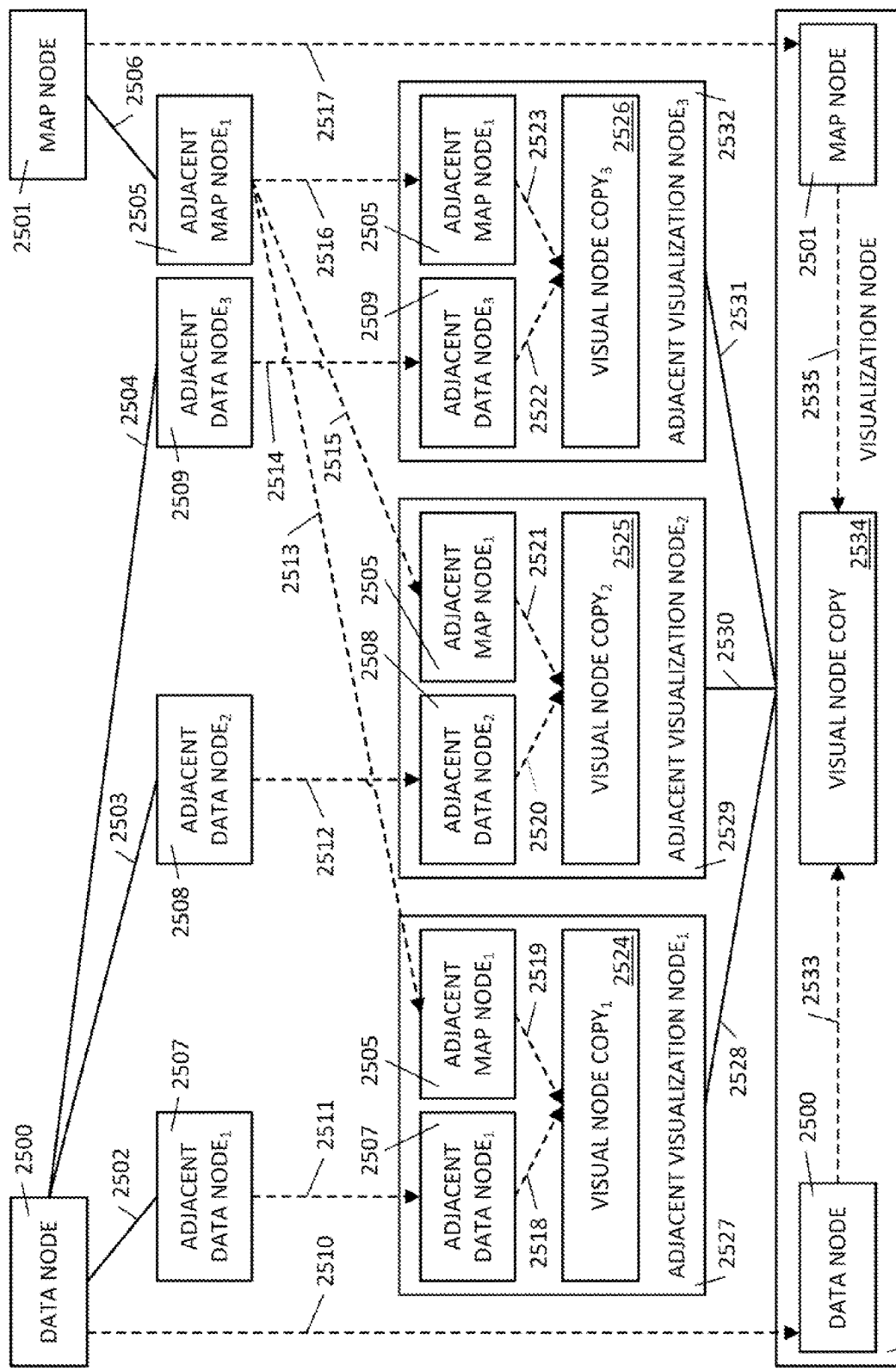
FIG. 25 is a block diagram illustrating an example method of visualization node construction.

FIG. 25 illustrates an example method of constructing a visualization node by combining a data node with a three-dimensional model through a chain of associated components using CPU 108 at step 205. The chain of associated components includes at least a data node, type node, map node, visual node, visual state node, and three-dimensional model.

Data node 2500 is inserted 2510 into visualization node 2536. Map node 2501 is inserted 2517 into visualization node 2536. The type node of data node 2500 is equivalent to the type node within map node 2501. Visual node 1202 within map node 2501 is copied 2535 to visual node copy 2534. All internal components of visual node copy 2534 are copied including a three-dimensional model. Using a user-selected visual state node from visual node copy 2534, data node 2500 is applied 2533 to a copy of three-dimensional model 1802 using the instructions within data template 1801. The process of applying a data node to a three-dimensional model via a data template may modify or replace three-dimensional model 1802 depending on how a user has defined the instructions within data template 1801.

The visualization node construction method described for visualization node 2536 is then repeated for adjacent visualization nodes 2527, 2529, and 2532. Adjacent data nodes 2507, 2508, and 2509 are respectively inserted 2511, 2512, and 2514 into visualization nodes 2527, 2529, and 2532. Adjacent map node 2505 is inserted 2513, 2515, and 2516 into respective visualization nodes 2527, 2529, and 2532. The type nodes of adjacent data nodes 2507, 2508, and 2509 are equivalent to the type node within adjacent map node 2505.

Within adjacent visualization nodes 2527, 2529, and 2532, visual node 1202 within adjacent map node 2505 is copied 2519, 2521, and 2523 into respective visual node copies 2524, 2525, and 2526. All internal components of visual node copies 2524, 2525, and 2526 are copied including three-dimensional models. Using a user-selected visual state node from visual node copies 2524, 2525, and 2526, data nodes 2507, 2508, and 2509 are respectively applied 2518, 2520, and 2522 to each respective copy of three-dimensional model 1802 using the instructions within each respective data template 1801. The process of applying a data node to a three-dimensional model via a data template may modify or replace each three-dimensional model 1802 depending on how a user has defined the instructions within data template 1801.

Data edges 2502, 2503, and 2504 are illustrated to identify respective adjacent data nodes 2507, 2508, and 2509. Map edge 2506 is illustrated to identify adjacent map node 2505. Visualization edges 2528, 2530, and 2531 are illustrated to identify adjacent visualization nodes 2527, 2529, and 2532.

Figure 26:
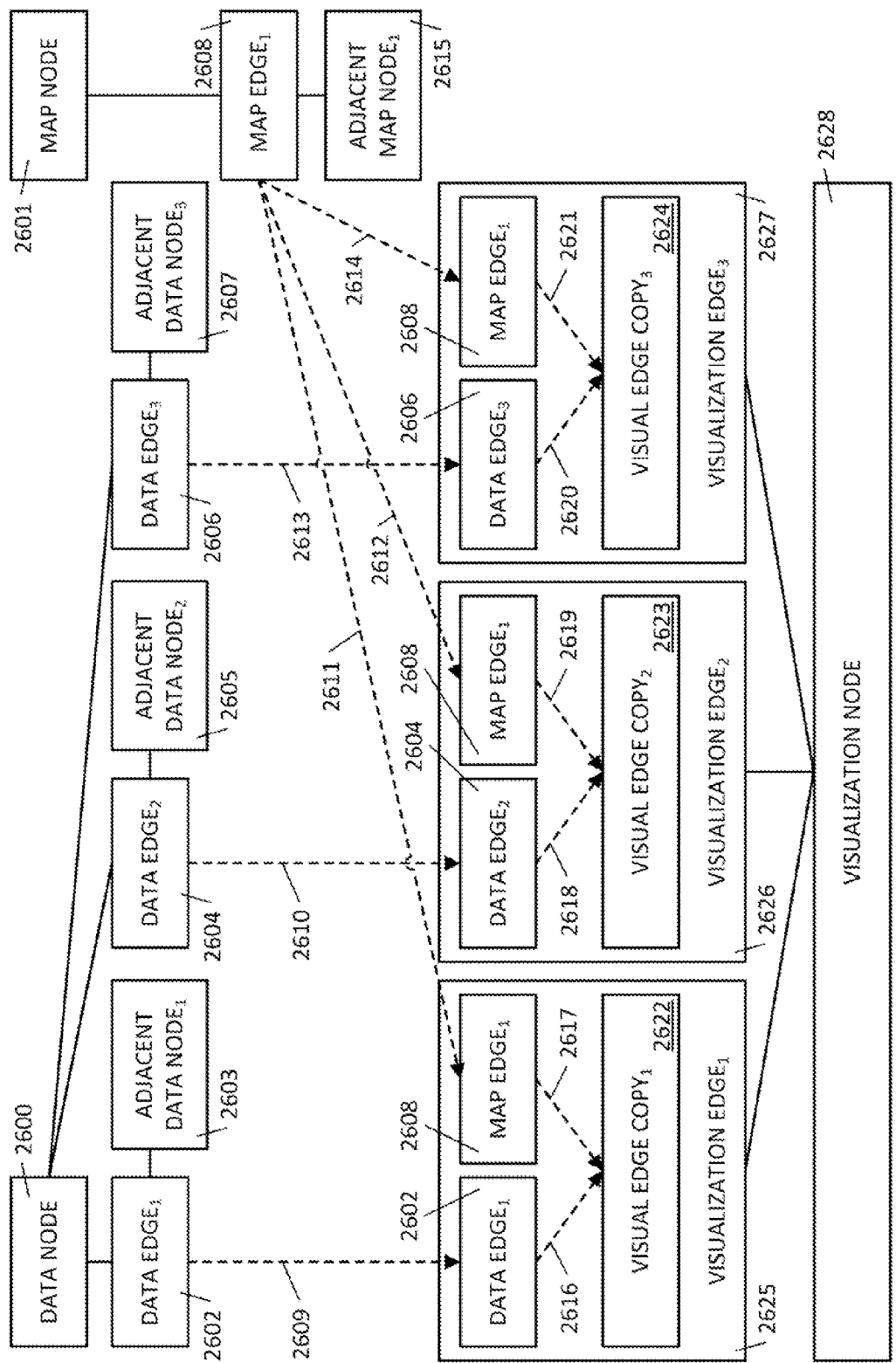
FIG. 26 is a block diagram illustrating an example method of visualization edge construction.

The method of visualization edge construction is similar to the method of visualization node construction. FIG. 26 illustrates an example method of constructing a visualization edge by combining a data edge with a three-dimensional model through a chain of associated components using CPU 108 at step 205. The chain of associated components includes at least a data edge, type edge, map edge, visual edge, visual state edge, and three-dimensional model.

Data edges 2602, 2604, and 2606 are inserted 2609, 2610, and 2613 into respective visualization edges 2625, 2626, and 2627. Map edge 2608 is inserted 2611, 2612, and 2614 into respective visualization edges 2625, 2626, and 2627. The type edges of data edges 2602, 2604, and 2606 are equivalent to the type edge within map edge 2608.

Within visualization edges 2625, 2626, and 2627, visual edge 1209 within map edge 2608 is copied 2617, 2619, and 2621 into respective visual edge copies 2622, 2623, and 2624. All internal components of visual edge copies 2622, 2623, and 2624 are copied including three-dimensional models. Using a user-selected visual state edge from visual edge copies 2622, 2623, and 2624, data edges 2602, 2604, and 2606 are respectively applied 2616, 2618, and 2620 to each respective copy of three-dimensional model 1812 using the instructions within each respective data template 1811. The process of applying a data edge to a three-dimensional model via a data template may modify or replace three-dimensional model 1812 depending on how a user has defined the instructions within data template 1811.

Data nodes 2600, 2603, 2605, and 2607 are illustrated to identify data edges 2602, 2604, and 2606. Map nodes 2601 and 2615 are illustrated to identify map edge 2608. Visualization node 2628 is illustrated to identify visualization edges 2625, 2626, and 2627.

FIGS. 27(A)-27(G) illustrates example association 2700 as a 1-to-1 relation between food data graph 1000 and food visualization graph 3200. Association 2700 illustrates the first of two practical data graph-to-visualization graph associations which may be performed by CPU 108.

Figure 27A:
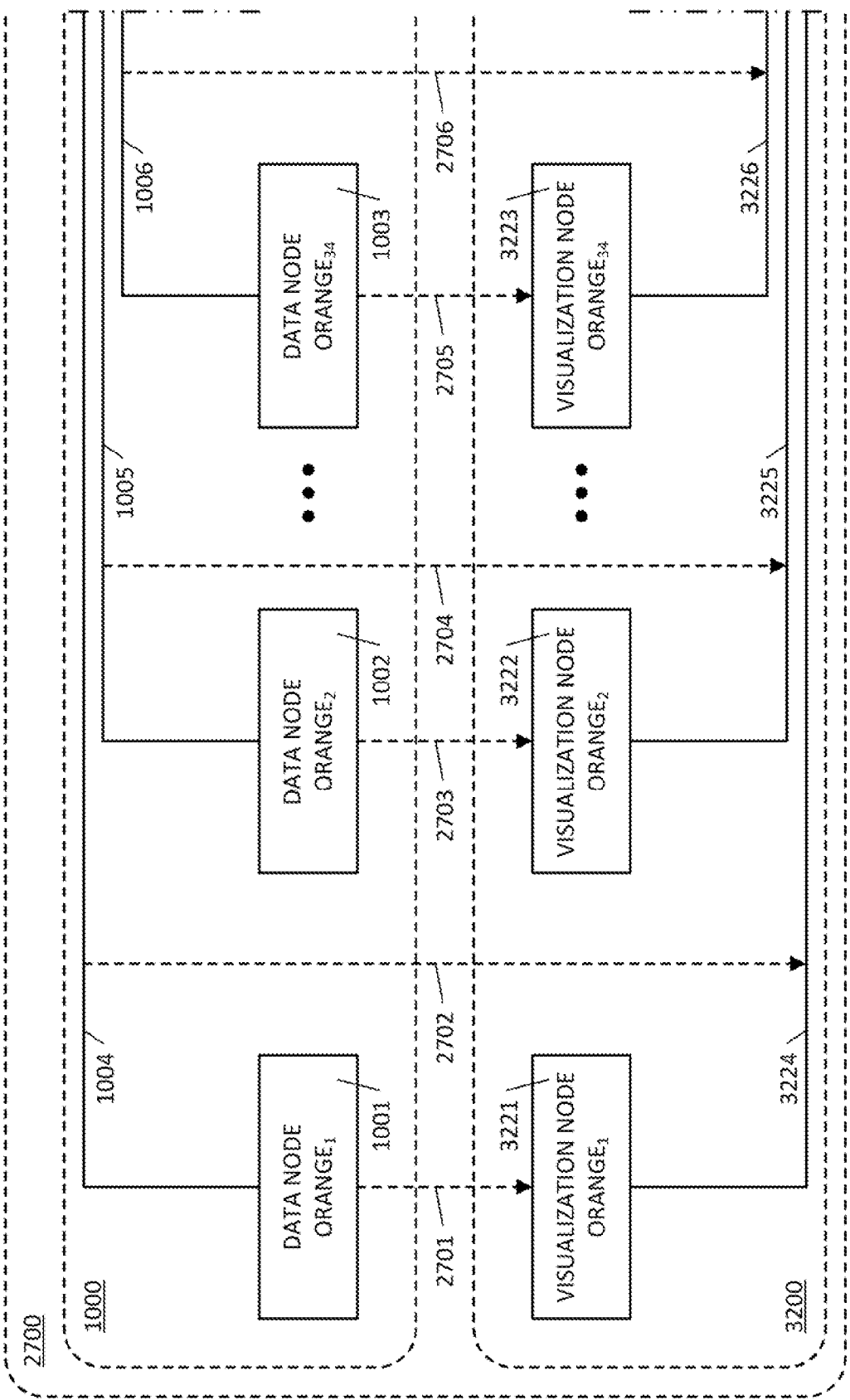
FIGS. 27(A)-27(G) is a block diagram illustrating example associations between a practical food data graph and practical food visualization graph.

FIG. 27(A) illustrates data nodes 1001, 1002 and 1003 respectively associated 2701, 2703, and 2705 to visualization nodes 3221, 3222, and 3223. Data edges 1004, 1005, and 1006 are respectively associated 2702, 2704, and 2706 to visualization edges 3224, 3225, and 3226.

Figure 27B:
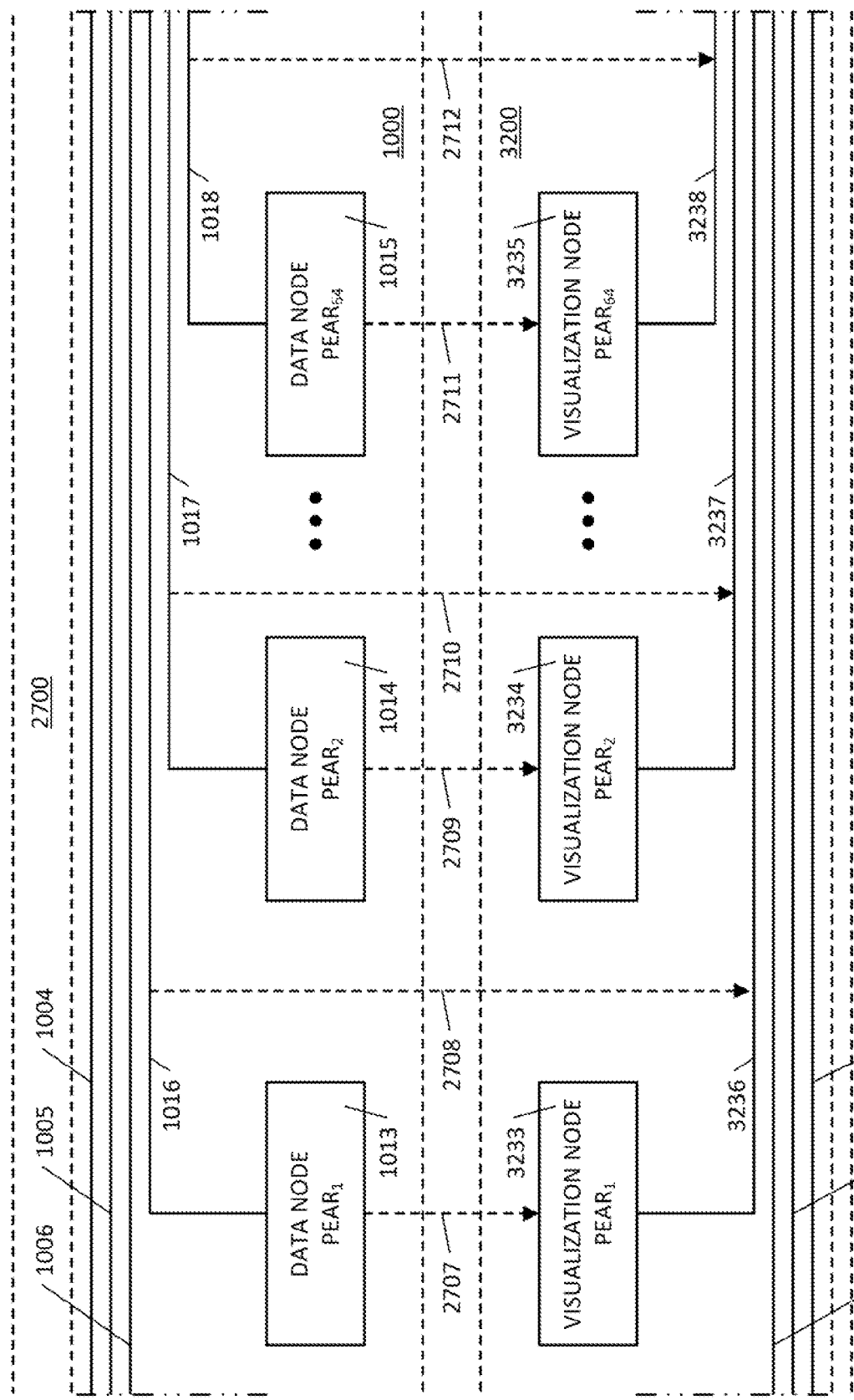

FIG. 27(B) illustrates data nodes 1013, 1014 and 1015 respectively associated 2707, 2709, and 2711 to visualization nodes 3233, 3234, and 3235. Data edges 1016, 1017, and 1018 are respectively associated 2708, 2710, and 2712 to visualization edges 3236, 3237, and 3238.

Figure 27C:
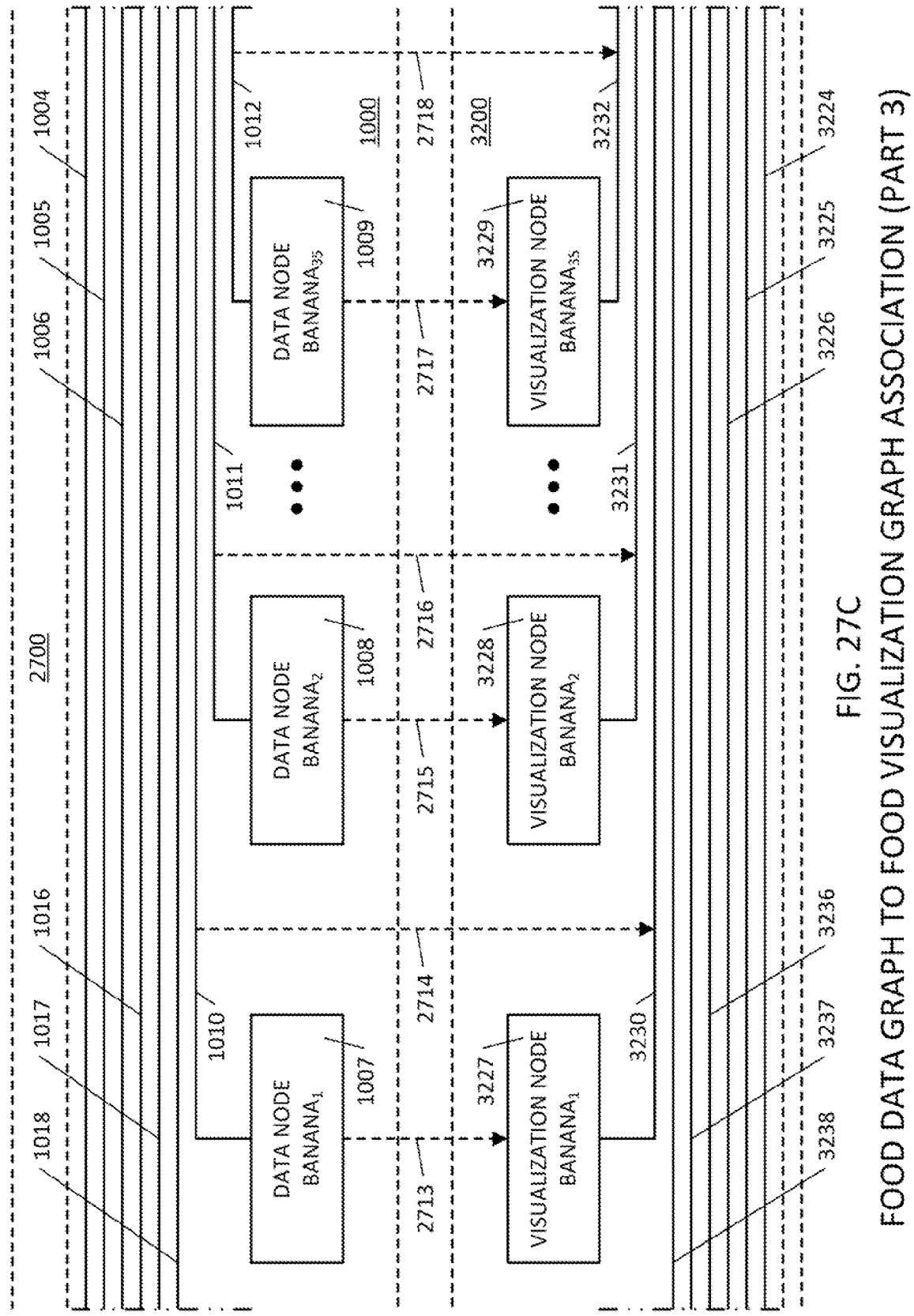

FIG. 27(C) illustrates data nodes 1007, 1008 and 1009 respectively associated 2713, 2715, and 2717 to visualization nodes 3227, 3228, and 3229. Data edges 1010, 1011, and 1012 are respectively associated 2714, 2716, and 2718 to visualization edges 3230, 3231, and 3232.

Figure 27D:
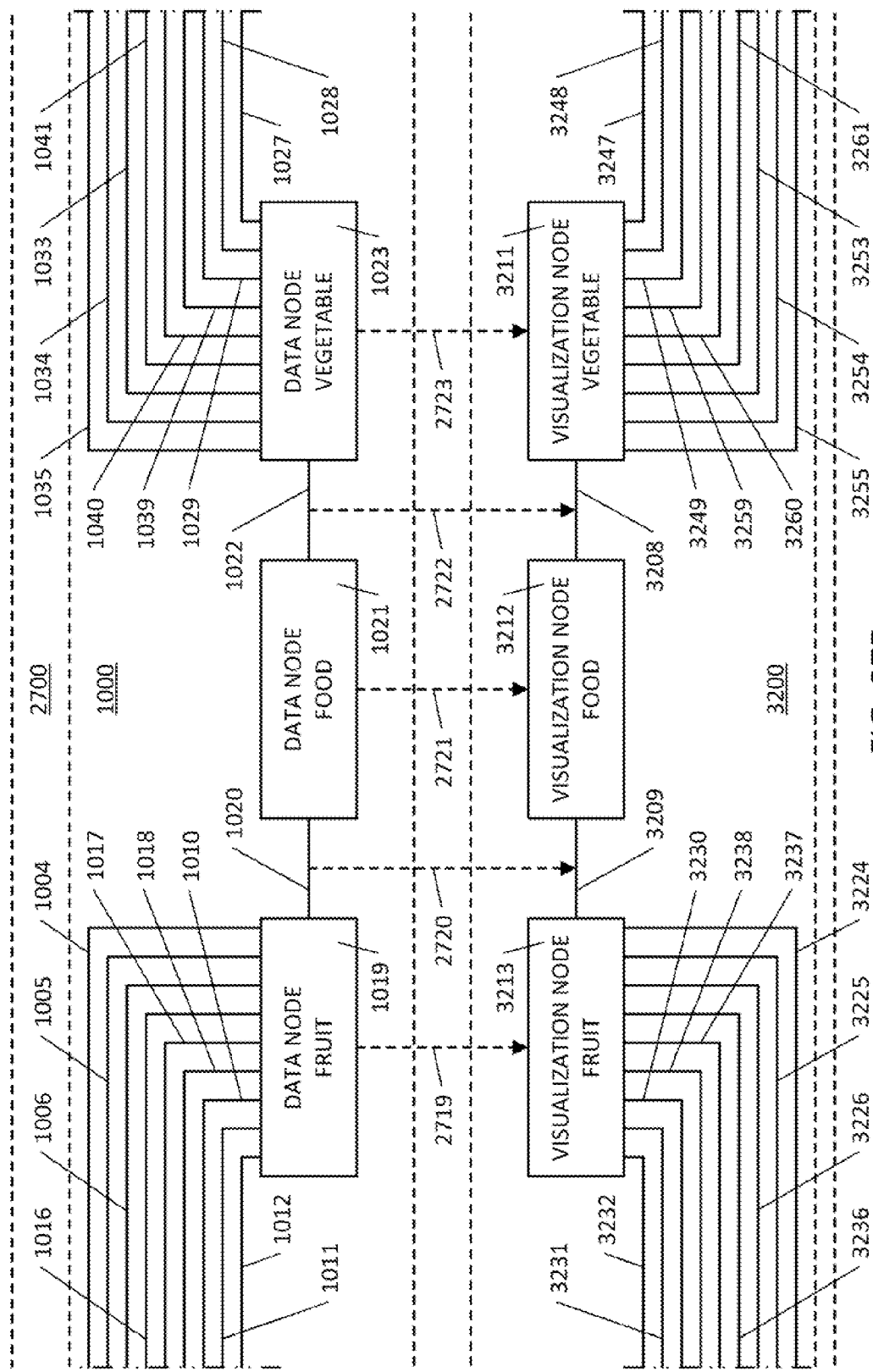

FIG. 27(D) illustrates data nodes 1019, 1021 and 1023 respectively associated 2719, 2721, and 2723 to visualization nodes 3213, 3212, and 3211. Data edges 1020 and 1022 are respectively associated 2720 and 2722 to visualization edges 3209 and 3208.

Figure 27E:
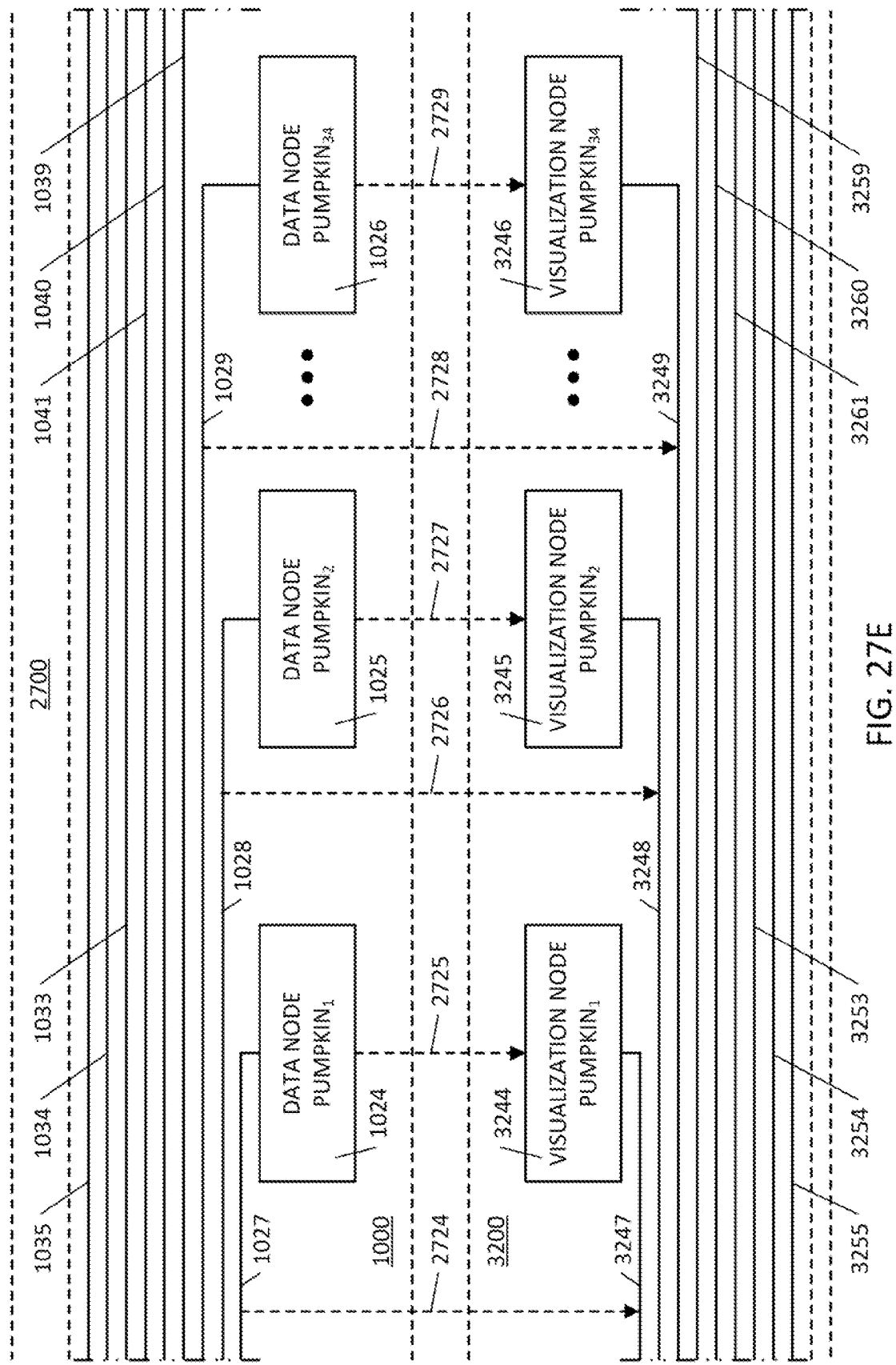

FIG. 27(E) illustrates data nodes 1024, 1025 and 1026 respectively associated 2725, 2727, and 2729 to visualization nodes 3244, 3245, and 3246. Data edges 1027, 1028, and 1029 are respectively associated 2724, 2726, and 2728 to visualization edges 3247, 3248, and 3249.

Figure 27F:
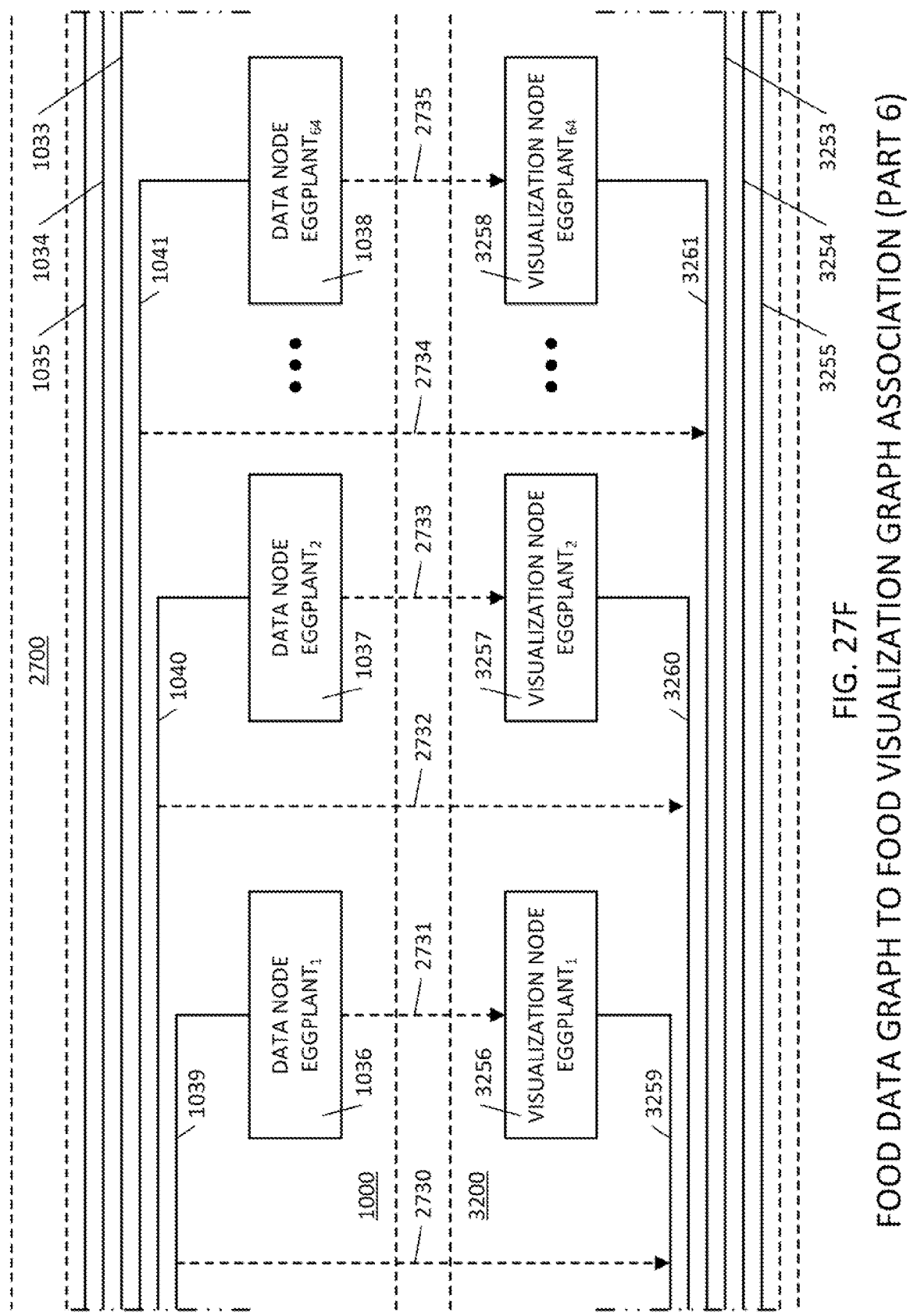

FIG. 27(F) illustrates data nodes 1036, 1037 and 1038 respectively associated 2731, 2733, and 2735 to visualization nodes 3256, 3257, and 3258. Data edges 1039, 1040, and 1035 are respectively associated 2730, 2732, and 2734 to visualization edges 3259, 3260, and 3261.

Figure 27G:
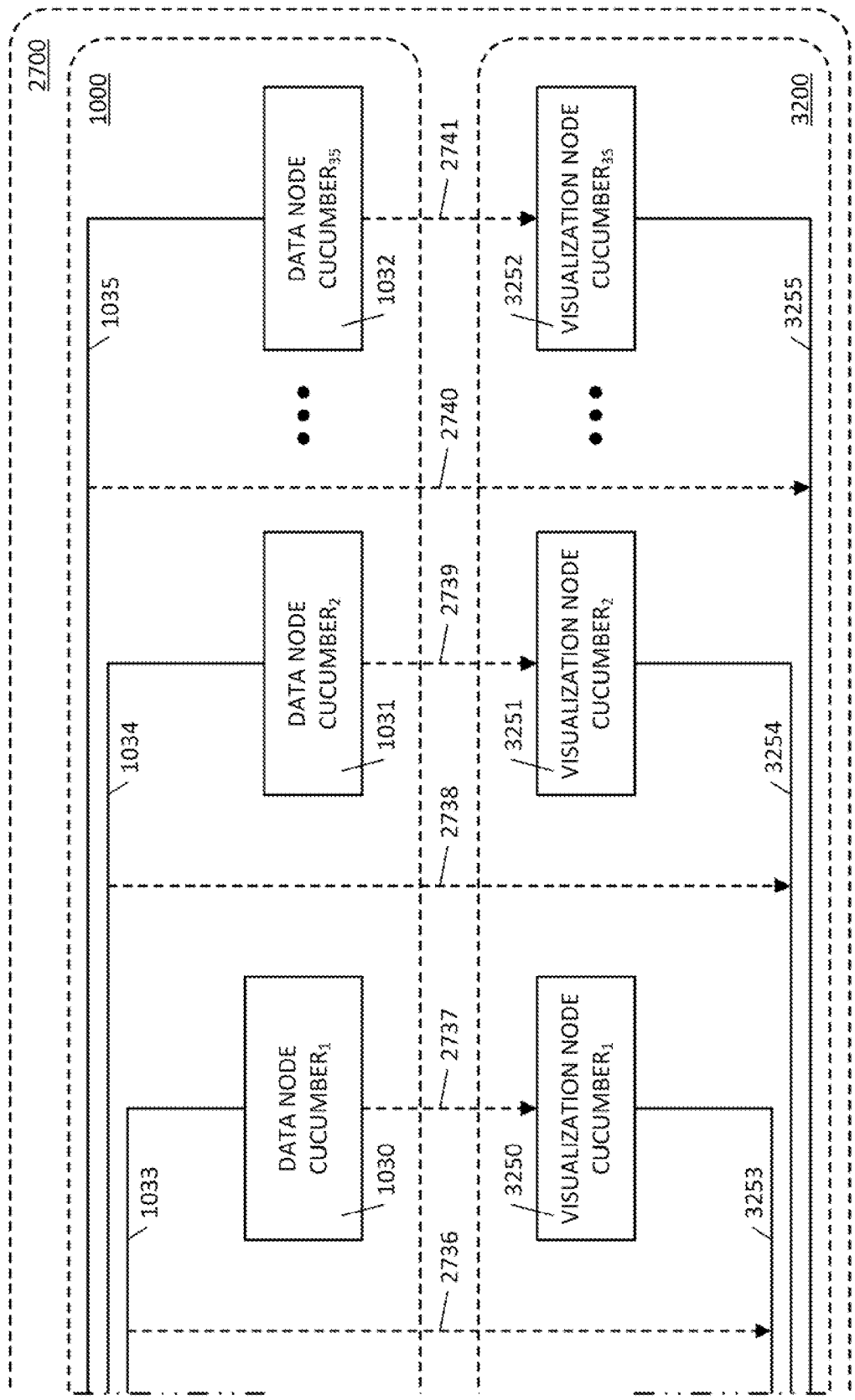

FIG. 27(G) illustrates data nodes 1030, 1031 and 1032 respectively associated 2737, 2739, and 2741 to visualization nodes 3250, 3251, and 3252. Data edges 1033, 1034, and 1035 are respectively associated 2736, 2738, and 2740 to visualization edges 3253, 3254, and 3255.

Figure 28A:
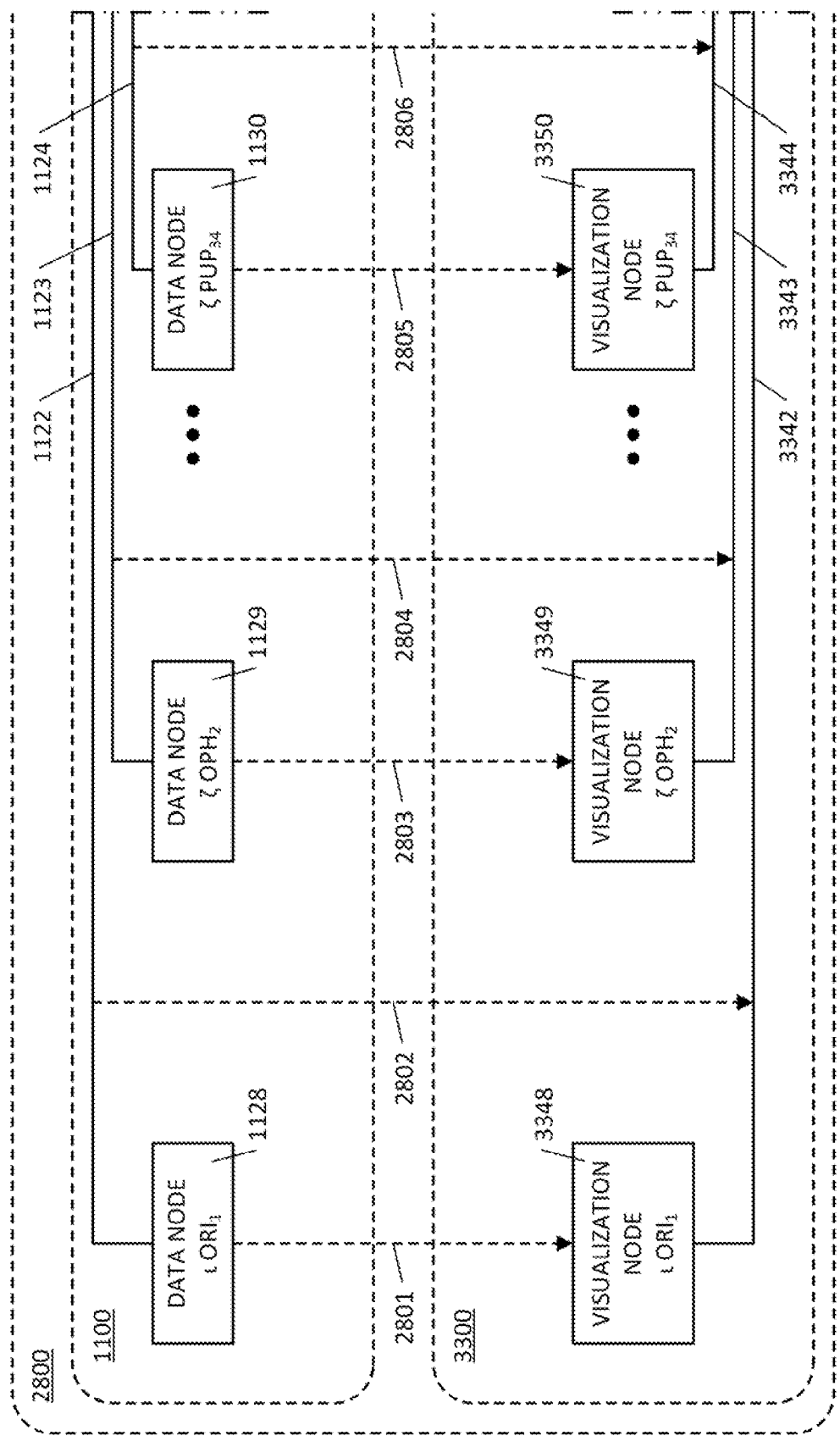

FIGS. 28(A)-27(F) illustrates example association 2800 as a 1-to-1 relation between astronomical data graph 1100 and astronomical visualization graph 3300. Association 2800 illustrates the second of two practical data graph-to-visualization graph associations which may be performed by CPU 108.

FIG. 28(A) illustrates data nodes 1128, 1129 and 1130 respectively associated 2801, 2803, and 2805 to visualization nodes 3348, 3349, and 3350. Data edges 1122, 1123, and 1124 are respectively associated 2802, 2804, and 2806 to visualization edges 3342, 3343, and 3344.

Figure 28B:
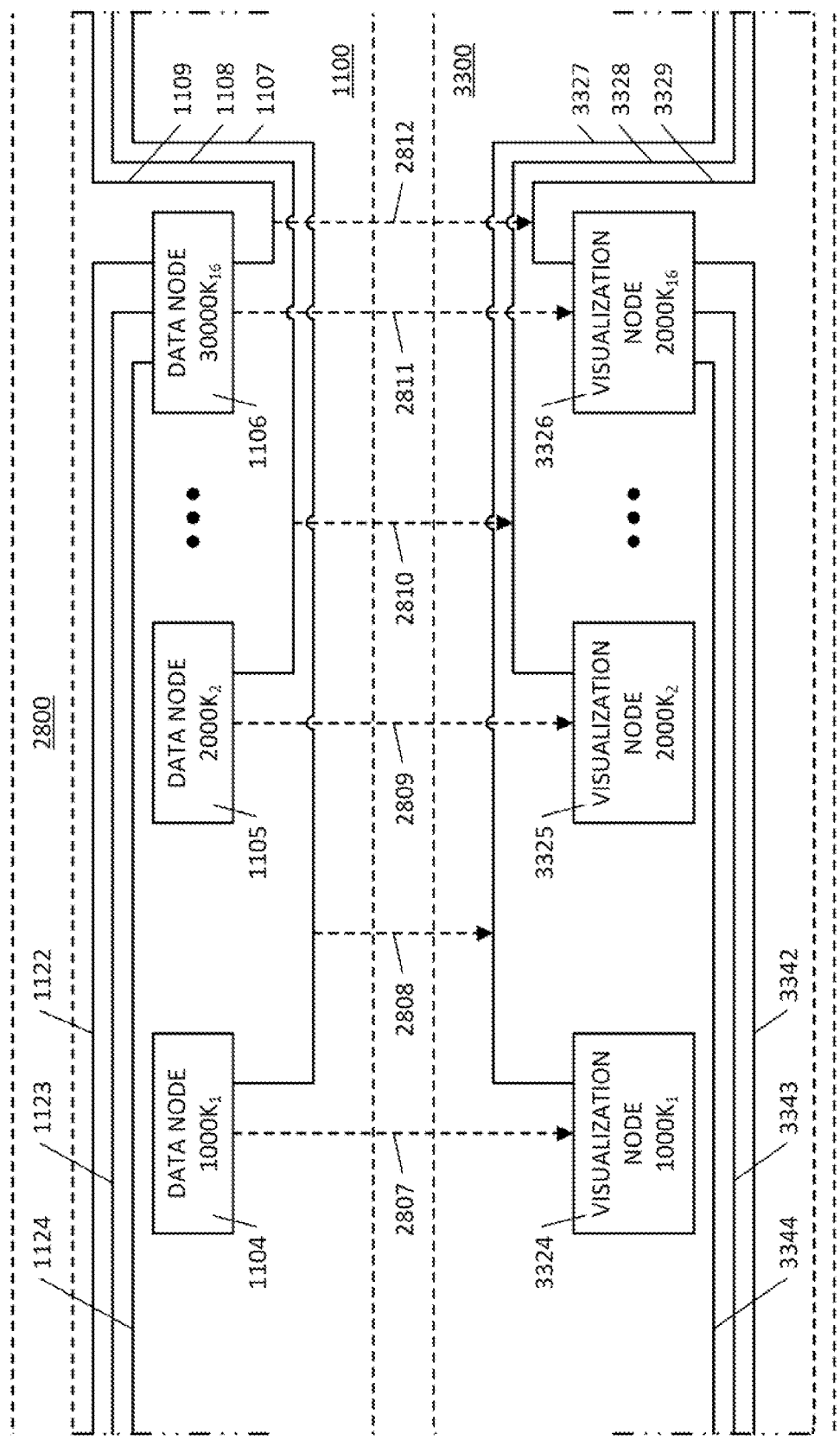

FIG. 28(B) illustrates data nodes 1104, 1105 and 1106 respectively associated 2807, 2809, and 2811 to visualization nodes 3324, 3325, and 3326. Data edges 1107, 1108, and 1109 are respectively associated 2808, 2810, and 2812 to visualization edges 3327, 3328, and 3329.

Figure 28C:
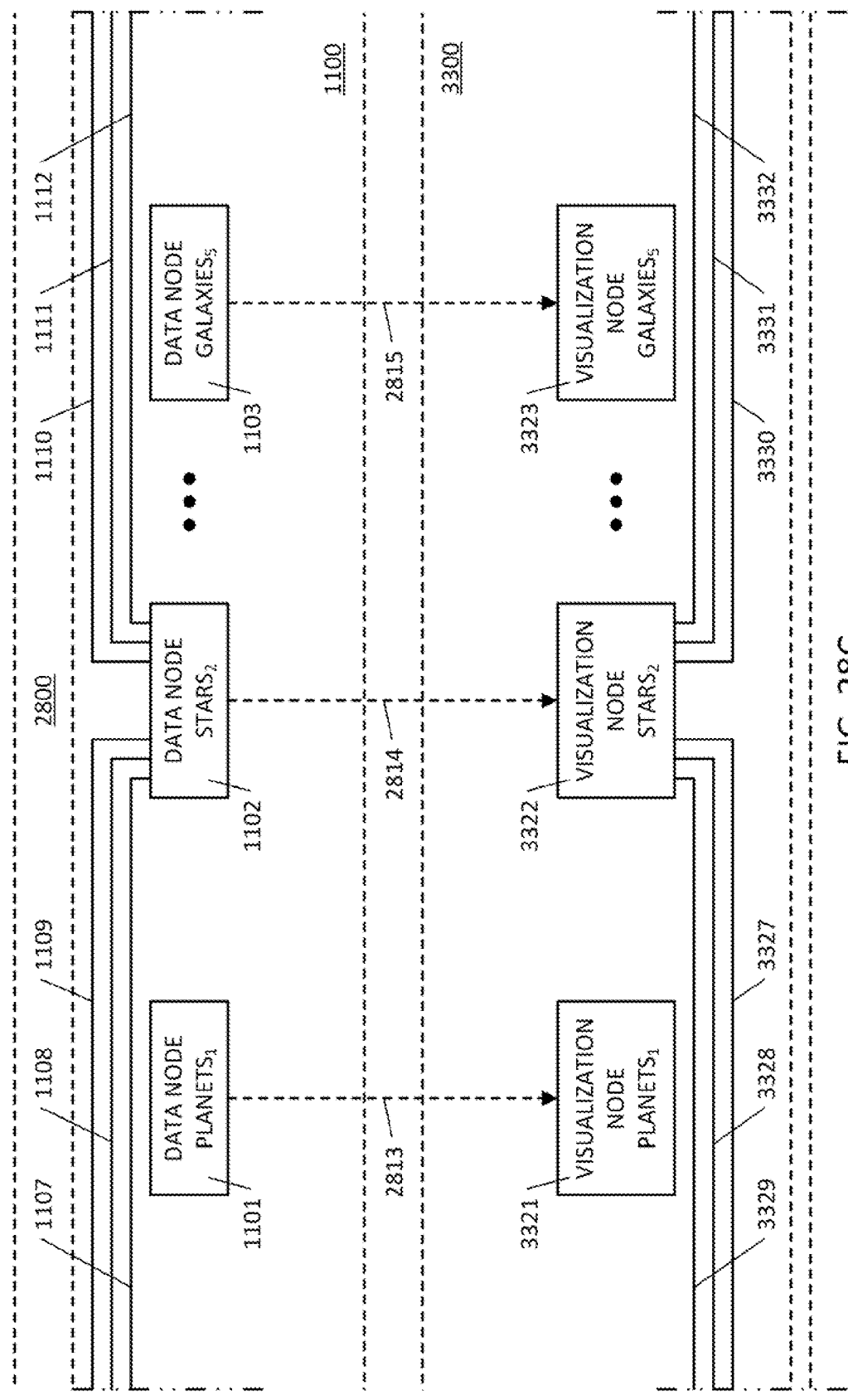

FIG. 28(C) illustrates data nodes 1101, 1102 and 1103 respectively associated 2813, 2814, and 2815 to visualization nodes 3321, 3322, and 3323.

Figure 28D:
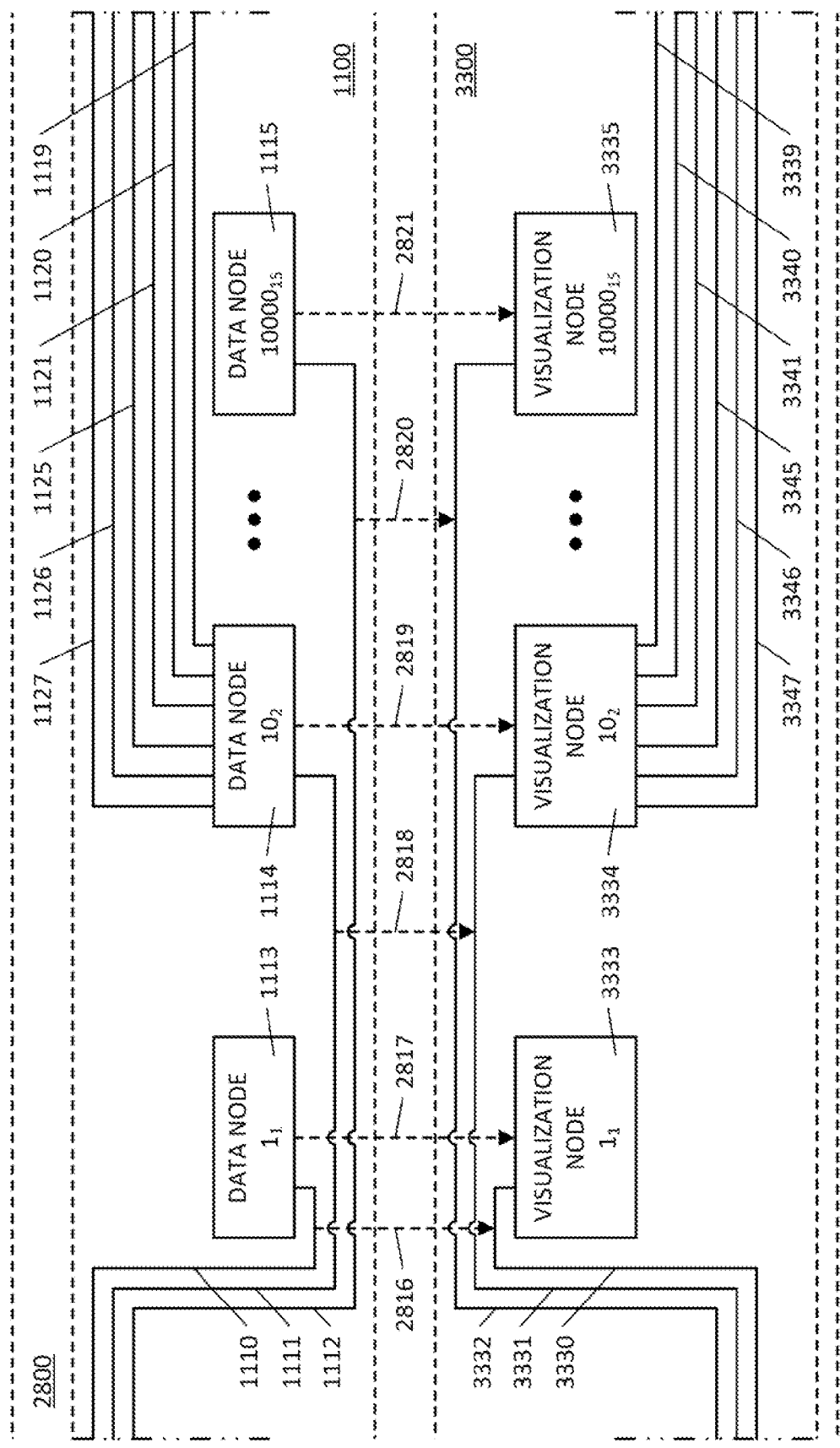

FIG. 28(D) illustrates data nodes 1113, 1114 and 1115 respectively associated 2817, 2819, and 2821 to visualization nodes 3333, 3334, and 3335. Data edges 1110, 1111, and 1112 are respectively associated 2816, 2818, and 2820 to visualization edges 3330, 3331, and 3332.

Figure 28E:
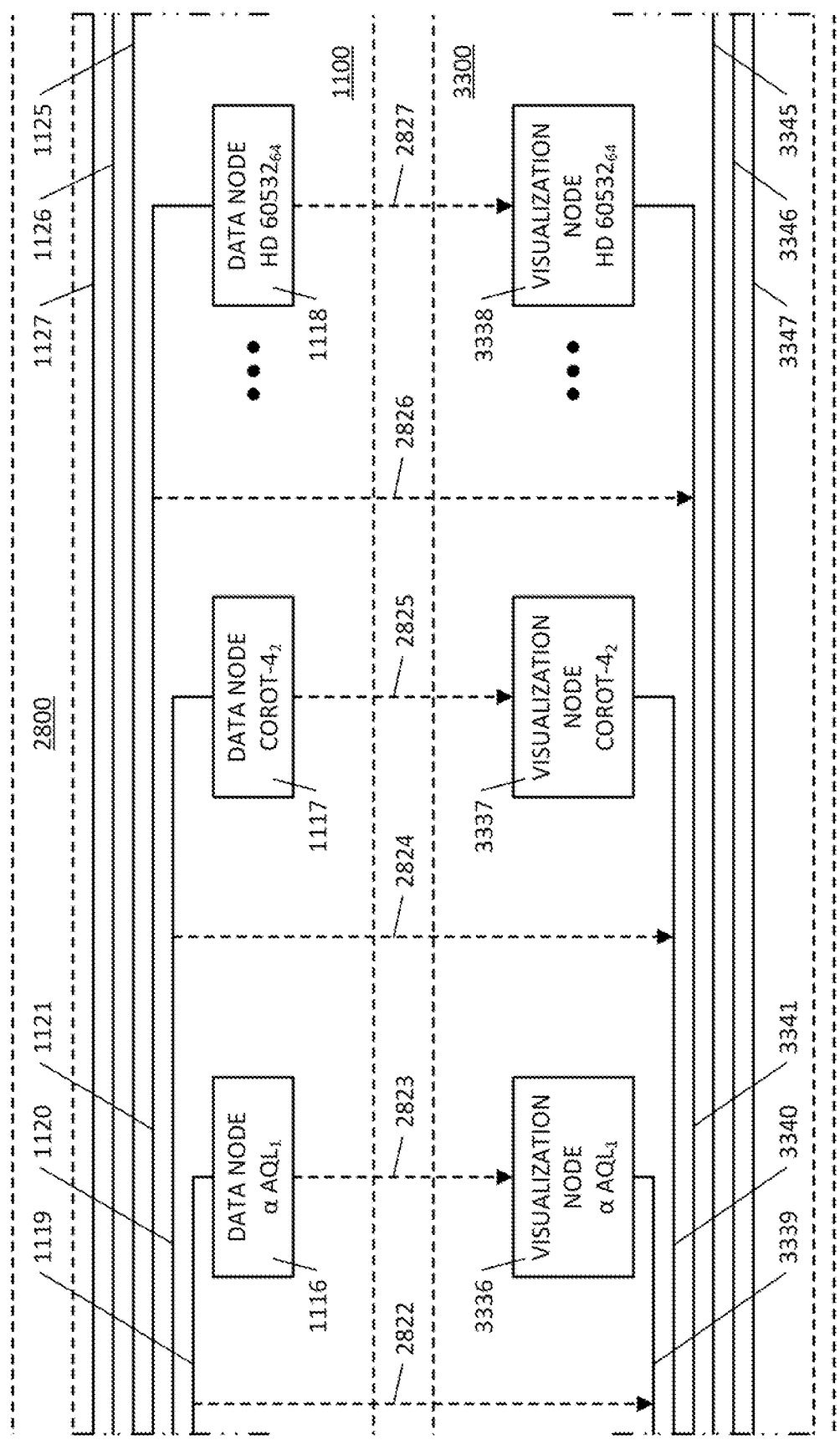

FIG. 28(E) illustrates data nodes 1116, 1117 and 1118 respectively associated 2823, 2825, and 2827 to visualization nodes 3336, 3337, and 3338. Data edges 1119, 1120, and 1121 are respectively associated 2822, 2824, and 2826 to visualization edges 3339, 3340, and 3341.

FIG. 28(F) illustrates data nodes 1131, 1132 and 1133 respectively associated 2829, 2831, and 2833 to visualization nodes 3351, 3352, and 3353. Data edges 1125, 1126, and 1127 are respectively associated 2828, 2830, and 2832 to visualization edges 3345, 3346, and 3347.

Figure 29A:
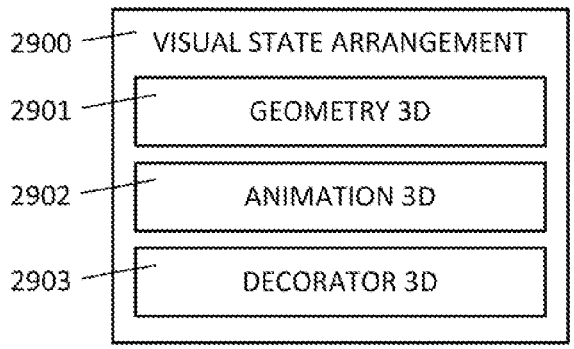
FIG. 29(A) is a block diagram illustrating an example visual state arrangement which includes a three-dimensional geometry and may be a component of a visual arrangement.
Figure 30A:
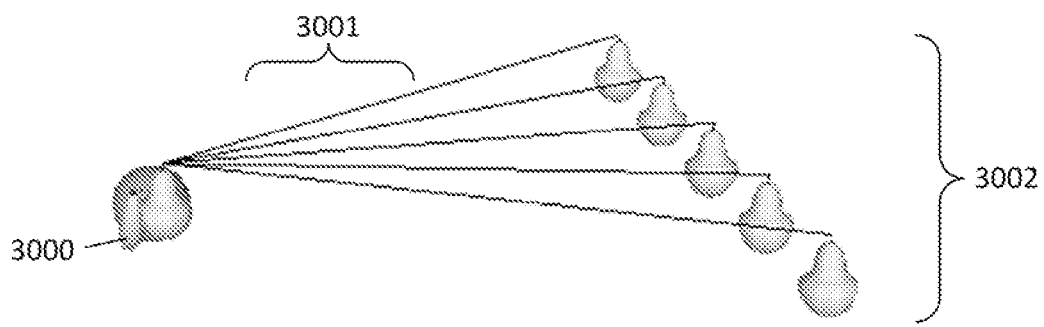
FIGS. 30(A)-30(C) are pictorial diagrams of example pear visualization arrangements.
Figure 30B:
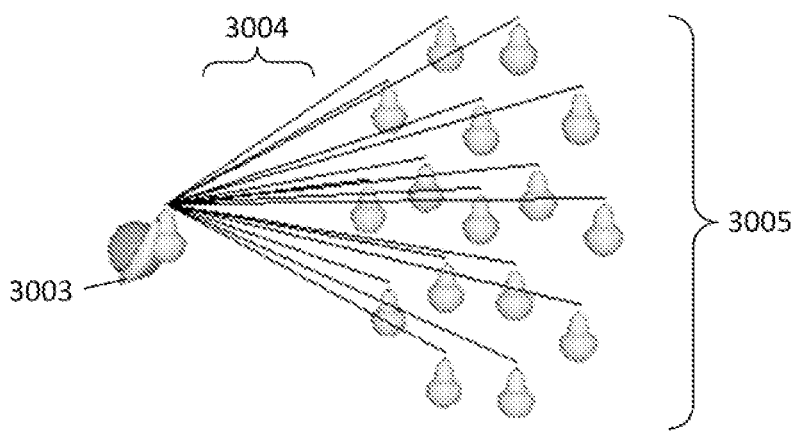
Figure 30C:
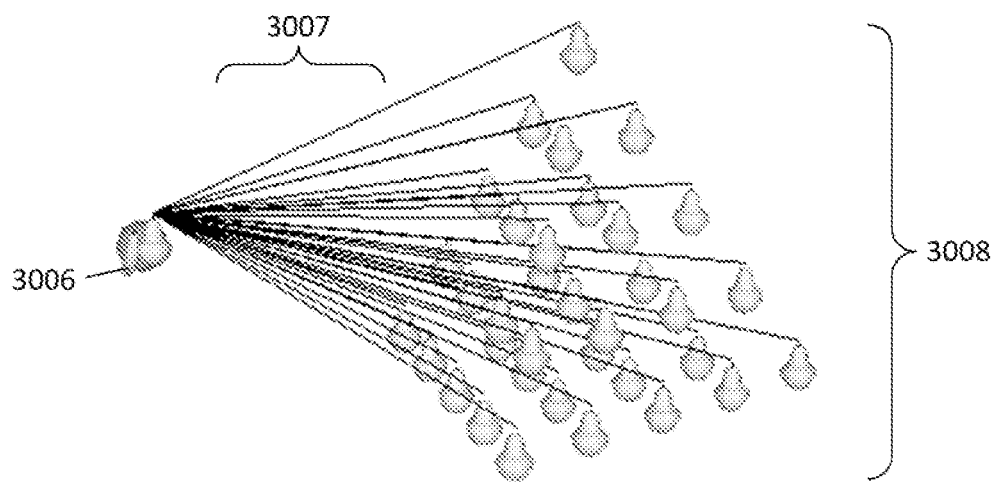

FIG. 29(A) illustrates example visual state arrangement 2900, an example component of visual layer 202, whose main purpose is to provide a three-dimensional geometry for the arrangement of three-dimensional models. Visual state arrangement 2900 represents a single visual state in which a visualization arrangement may occupy at any particular time. Visual state arrangement 2900 may be loaded into random-access memory 103 and may include at least three-dimensional geometry 2901, three-dimensional animation 2902, and three-dimensional decorator 2903. Three-dimensional geometry 2901 provides the shape in which one or more three-dimensional models may be arranged. Three-dimensional animation 2902 provides animation information which may be performed by three-dimensional geometry 2901. Three-dimensional decorator 2903 may provide ancillary three-dimensional models which may adorn three-dimensional geometry 2901 such as a three-dimensional model of a picture frame.

Figure 29C:
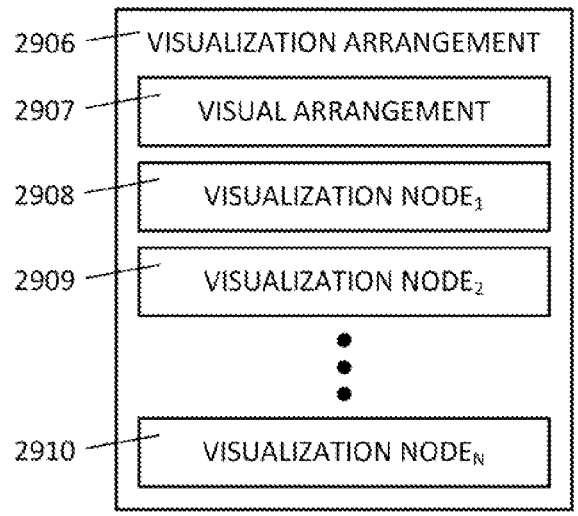
FIG. 29(C) is a block diagram illustrating an example visualization arrangement which includes a visual arrangement and visualization nodes.
Figure 29B:
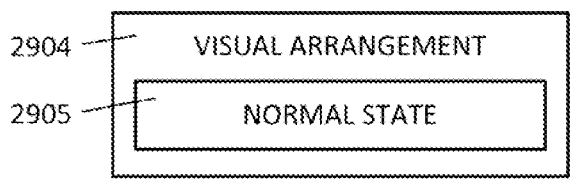
FIG. 29(B) is a block diagram illustrating an example visual arrangement which includes a visual state arrangement and may be a component of a visualization arrangement.

FIG. 29(B) illustrates example visual arrangement 2904, a component of visual layer 202, whose main purpose is to include a more visual state arrangement. In the preferred embodiment, one visual state arrangement is "Normal" state 2905. Visual arrangement 2904 may be loaded into random-access memory 103. Map node 1200 includes visual arrangement 1203 in FIG. 12(A). FIGS. 13(A)-13(C) includes visual arrangements 1303, 1306, 1309, 1312, 1317, and 1323. FIGS. 14(A)-14(B) may include visual arrangements 1403, 1408, 1303, 1416, 1306, and 1309.

FIG. 29(C) illustrates example visualization arrangement 2906, a component of visualization layer 204, whose main purpose is to associate a three-dimensional arrangement geometry within a visual arrangement to visualization nodes. Visualization arrangement 2906 may be loaded into random-access memory 103 and may include at least visual arrangement 2907, and an indefinite number of visualization nodes represented by 2908, 2909, and 2910.

Figure 29D:
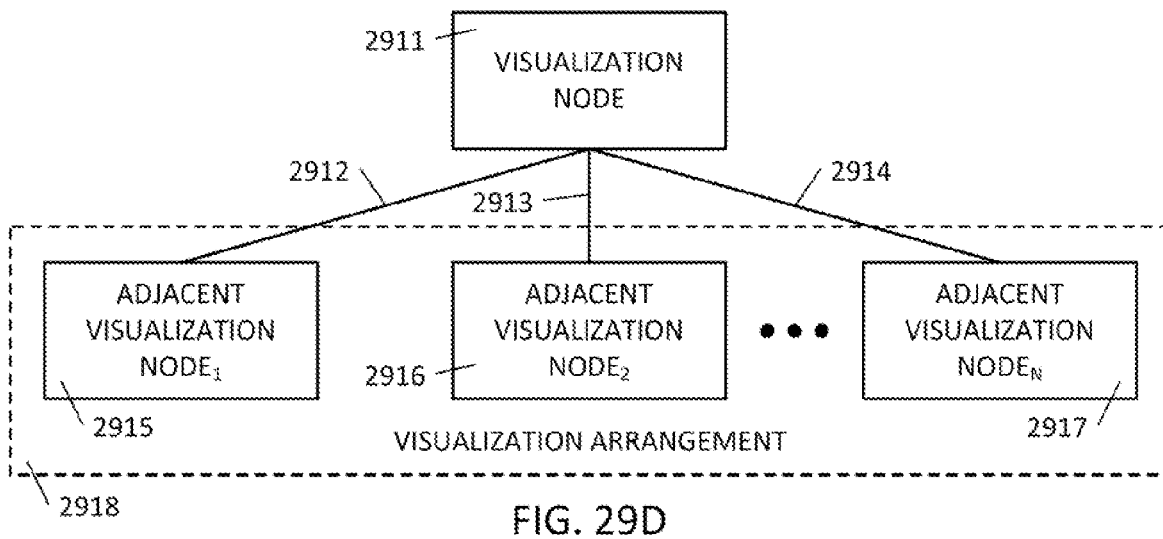
FIG. 29(D) is a block diagram illustrating an example relation of a visualization arrangement to adjacent visualization nodes.

FIG. 29(D) illustrates an example relation of visualization arrangement 2918 to an indefinite number of adjacent visualization nodes represented by 2915, 1916, and 1917. Adjacent visualization nodes 2915, 1916, and 1917 are connected to a shared visualization node 2911 by visualization edges 2912, 2913, and 2914 respectively. The three-dimensional geometry within visualization arrangement 2918 may arrange the three-dimensional models within visualization nodes 2915, 2916, and 2917. The three-dimensional models within visualization edges 2912, 2913, and 2914 are indirectly arranged due to their association to visualization nodes 2915, 2916, and 2917.

FIGS. 30(A)-30(C) illustrates example three-dimensional arrangements of pear visualizations. FIGS. 30(A)-30(C) demonstrates three practical geometrical arrangements of three-dimensional models wherein each three-dimensional model is associated to adjacent data nodes or a shared data node from food type graph 500. Note that while different geometrical arrangements are illustrated, it is the relation of the shared data node to adjacent data nodes which are associated to three-dimensional models that enables the visualization to occur.

FIG. 30(A) illustrates an example line arrangement of pear visualizations which may be loaded into random-access memory 103 and/or graphics memory 110. Fruit visualization 3000 illustrates a three-dimensional model associated to a fruit data node designed on Fruit type node 521. Fruit visualization 3000 is connected by 5 visualization edges 3001 to 5 adjacent pear visualization nodes 3002. Adjacent visualization nodes 3002 represent 5 three-dimensional models which each represent a pear data node designed on Pear type node 506. Visualization edges 3001 represent 5 data edges designed on type edge 515.

FIG. 30(B) illustrates an example circle arrangement of pear visualizations which may be loaded into random-access memory 103 and/or graphics memory 110. Fruit visualization 3003 illustrates a three-dimensional model associated to a fruit data node designed on Fruit type node 521. Fruit visualization 3003 is connected by 16 visualization edges 3004 to 16 adjacent pear visualization nodes 3005. Adjacent visualization nodes 3005 represent 16 three-dimensional models which each represent a pear data node designed on Pear type node 506. Visualization edges 3004 represent 16 data edges designed on type edge 515.

FIG. 30(C) illustrates an example tetrahedron arrangement of pear visualizations which may be loaded into random-access memory 103 and/or graphics memory 110. Fruit visualization 3006 illustrates a three-dimensional model associated to a fruit data node designed on Fruit type node 521. Fruit visualization 3006 is connected by 35 visualization edges 3007 to 35 adjacent pear visualization nodes 3008. Adjacent visualization nodes 3008 represent 35 three-dimensional models which each represent a pear data node designed on Pear type node 506. Visualization edges 3007 represent 35 data edges designed on type edge 515.

Figure 31A:
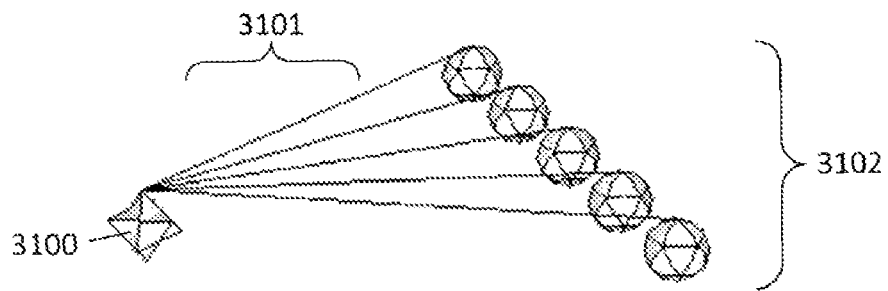
FIGS. 31(A)-31(C) are pictorial diagrams of example star visualization arrangements.
Figure 31B:
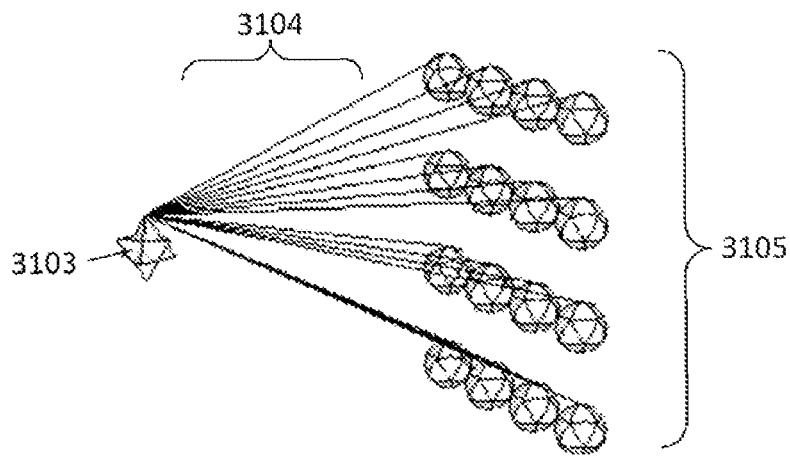
Figure 31C:
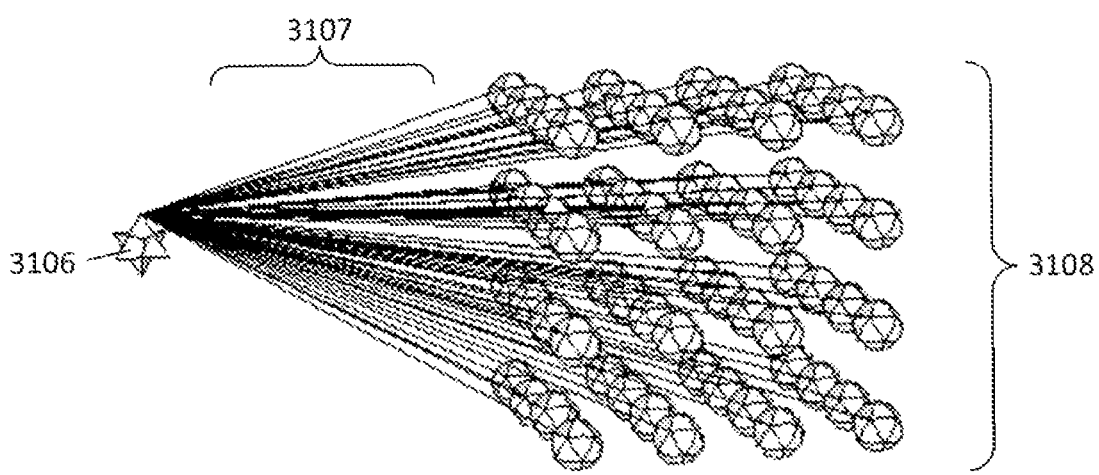

FIGS. 31(A)-31(C) illustrates example three-dimensional arrangements of star visualizations. FIGS. 31(A)-31(C) demonstrates three practical geometrical arrangements of three-dimensional models wherein each three-dimensional model is associated to adjacent data nodes or a shared data node from astronomical type graph 600. Note that while different geometrical arrangements are illustrated, it is the relation of the shared data node to adjacent data nodes which are associated to three-dimensional models that enables the visualization to occur.

FIG. 31(A) illustrates an example line arrangement of star visualizations which may be loaded into random-access memory 103 and/or graphics memory 110. Luminosity visualization 3100 illustrates a three-dimensional model associated to a luminosity data node designed on Luminosity type node 621. Luminosity visualization 3100 is connected by 5 visualization edges 3101 to 5 adjacent star visualization nodes 3102. Adjacent visualization nodes 3102 represent 5 three-dimensional models which each represent a star data node designed on Star type node 617. Visualization edges 3101 represent 5 data edges designed on type edge 625.

FIG. 31(B) illustrates an example rectangle arrangement of star visualizations which may be loaded into random-access memory 103 and/or graphics memory 110. Luminosity visualization 3103 illustrates a three-dimensional model associated to a luminosity data node designed on Luminosity type node 621. Luminosity visualization 3103 is connected by 16 visualization edges 3104 to 16 adjacent star visualization nodes 3105. Adjacent visualization nodes 3105 represent 16 three-dimensional models which each represent a star data node designed on Star type node 617. Visualization edges 3104 represent 16 data edges designed on type edge 625.

FIG. 31(C) illustrates an example cube arrangement of star visualizations which may be loaded into random-access memory 103 and/or graphics memory 110. Luminosity visualization 3106 illustrates a three-dimensional model associated to a luminosity data node designed on Luminosity type node 621. Luminosity visualization 3106 is connected by 64 visualization edges 3107 to 64 adjacent star visualization nodes 3108. Adjacent visualization nodes 3108 represent 64 three-dimensional models which each represent a star data node designed on Star type node 617. Visualization edges 3107 represent 64 data edges designed on type edge 625.

Figure 32:
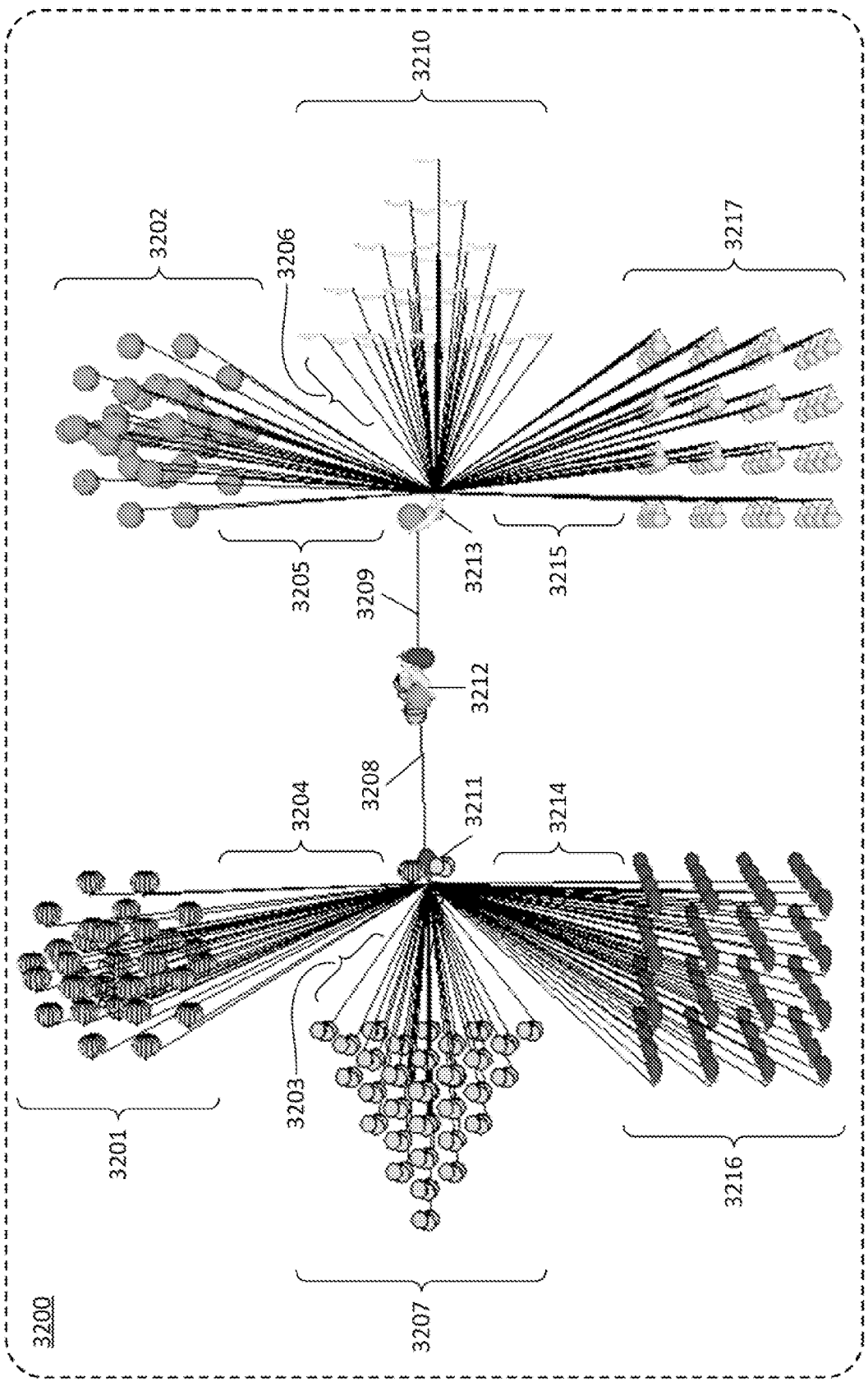
FIG. 32 is a pictorial diagram of an example practical food visualization graph created from a food data graph and food map graph.

FIG. 32 illustrates example food visualization graph 3200, an example of visualization layer 204 which may be loaded into random-access memory 103 and/or graphics memory 110 and presented on display 125. Food visualization graph 3200 represents food data graph 1000 (FIG. 10) and is an example of the invention's main purpose of visualizing a data graph in three dimensions. Food visualization graph 3200 is illustrated based on visual nodes and visual arrangements specified in food map graph 1300 (FIGS. 13(A)-13(C)) where each visualization node and visualization edge represents a particular data node or data edge within food data graph 1000 (FIGS. 27(A)-27(G)).

Food visualization graph 3200 may include 34 pumpkin visualization nodes 3201, 34 orange visualization nodes 3202, 35 vegetable-cucumber visualization edges 3203, 34 vegetable-pumpkin visualization edges 3204, 34 fruit-orange visualization edges 3205, 35 fruit-banana visualization edges 3206, 35 cucumber visualization nodes 3207, 1 food-vegetable visualization edge 3208, 1 food-fruit visualization edge 3209, 35 banana visualization nodes 3210, 1 vegetable visualization node 3211, 1 food visualization node 3212, 1 fruit visualization node 3213, 64 vegetable-eggplant visualization edges 3214, 64 fruit-pear visualization edges 3215, 64 eggplant visualization nodes 3216, and 64 pear visualization nodes 3217.

Pumpkin visualization nodes 3201 illustrates data nodes 1024, 1025, and 1026 with pumpkin-like three-dimensional models specified in visual node 1328 and arranged into a three-dimensional sphere specified in visual arrangement 1303. Orange visualization nodes 3202 illustrates data nodes 1001, 1002, and 1003 with orange-like three-dimensional models specified in visual node 1302 and arranged into a three-dimensional sphere specified in visual arrangement 1303. Vegetable-cucumber visualization edges 3203 illustrates data edges 1033, 1034, and 1035 with three-dimensional lines specified within a visual edge in map edge 1326. Vegetable-pumpkin visualization edges 3204 illustrates data edges 1027, 1028, and 1029 with three-dimensional lines specified within a visual edge in map edge 1324. Fruit-orange visualization edges 3205 illustrates data edges 1004, 1005, and 1006 with three-dimensional lines specified within a visual edge in map edge 1318. Fruit-banana visualization edges 3206 illustrates data edges 1010, 1011, and 1012 with three-dimensional lines specified within a visual edge in map edge 1320. Cucumber visualization nodes 3207 illustrates data nodes 1030, 1031, and 1032 with cucumber slice three-dimensional models specified in visual node 1332 and arranged into a three-dimensional tetrahedron specified in visual arrangement 1309. Food-vegetable visualization edge 3208 illustrates data edge 1022 with three-dimensional line specified within a visual edge in map edge 1314. Food-fruit visualization edge 3209 illustrates data edge 1020 with three-dimensional line specified within a visual edge in map edge 1313. Banana visualization nodes 3210 illustrates data nodes 1007, 1008, and 1009 with banana-like three-dimensional models specified in visual node 1308 and arranged into a three-dimensional tetrahedron specified in visual arrangement 1309. Vegetable-eggplant visualization edges 3214 illustrates data edges 1039, 1040, and 1041 with three-dimensional lines specified within a visual edge in map edge 1325.

Fruit-pear visualization edges 3215 illustrates data edges 1016, 1017, and 1018 with three-dimensional lines specified within a visual edge in map edge 1319. Eggplant visualization nodes 3216 illustrates data nodes 1036, 1037, and 1038 with eggplant-like three-dimensional models specified in visual node 1330 and arranged into a three-dimensional cube specified in visual arrangement 1306. Pear visualization nodes 3217 illustrates data nodes 1013, 1014, and 1015 with pear-like three-dimensional models specified in visual node 1305 and arranged into a three-dimensional cube specified in visual arrangement 1306. Notice that a three-dimensional model associated with a visualization edge is arranged based on the position of the two three-dimensional models in visualizations nodes associated to the visualization edge.

Figure 33:
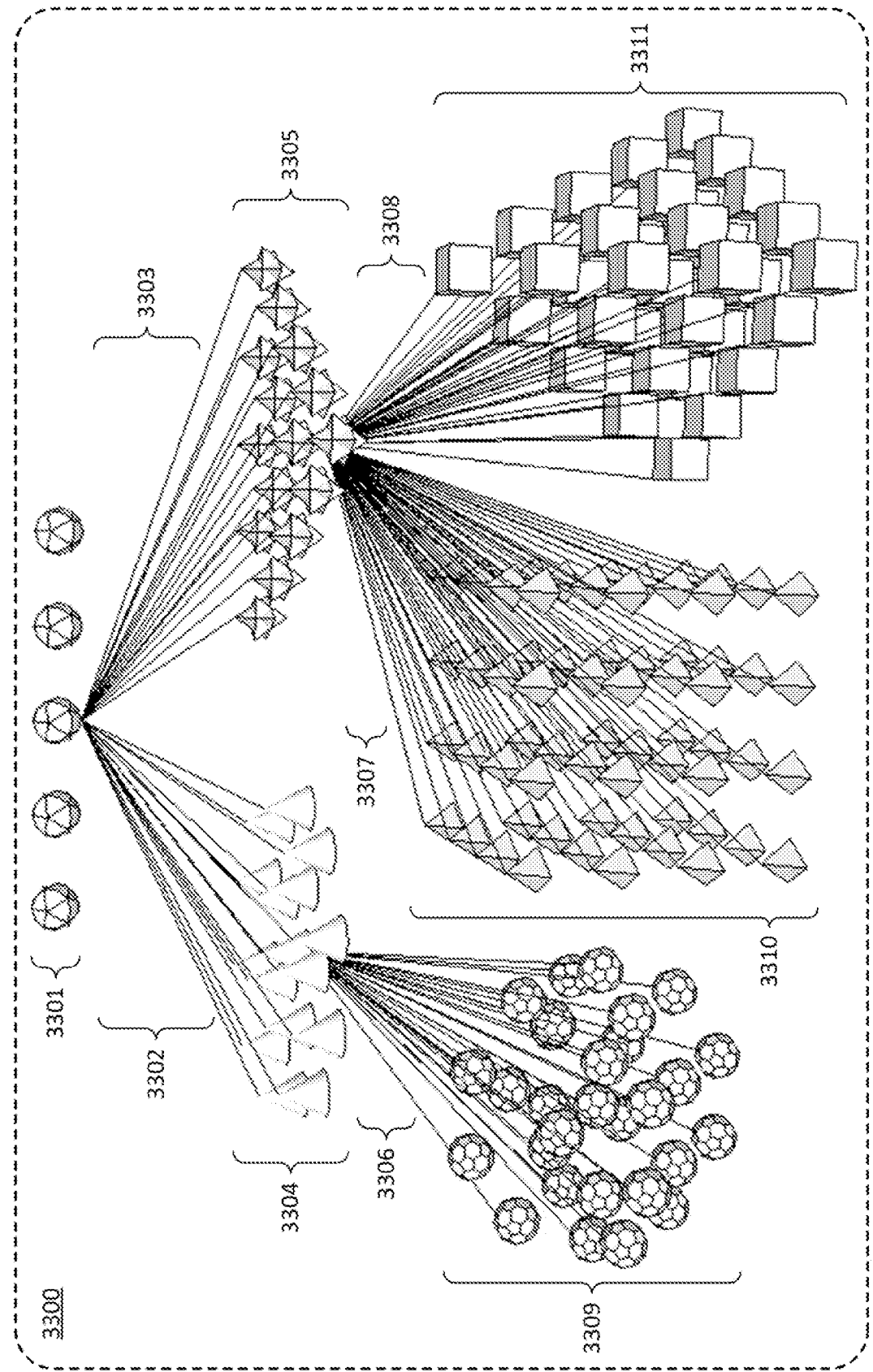
FIG. 33 is a pictorial diagram of an example practical astronomical visualization graph created from an astronomical data graph and astronomical map graph.

FIG. 33 illustrates example astronomical visualization graph 3300, an example of visualization layer 204 which may be loaded into random-access memory 103 and/or graphics memory 110 and presented on display 125. Astronomical visualization graph 3300 represents astronomical data graph 1100 (FIG. 11) and is an example of the invention's main purpose of visualizing a data graph in three dimensions. Astronomical visualization graph 3300 is illustrated based on visual nodes and visual arrangements specified in astronomical map graph 1400 (FIGS. 14(A)-14(B)) where each visualization node and visualization edge represents a particular data node or data edge within astronomical data graph 1100 (FIGS. 28(A)-28(F)).

Astronomical visualization graph 3300 may include 5 category visualization nodes 3301, 16 category-temperature visualization edges 3302, 15 category-luminosity visualization edges 3303, 16 temperature visualization nodes 3304, 15 luminosity visualization nodes 3305, 34 temperature-star visualization edges 3306, 64 "MainSequence" luminosity-star visualization edges 3307, 35 "SubGiant" luminosity-star visualization edges 3308, 34 star visualization nodes 3309, 64 star visualization nodes 3310, and 35 star visualization nodes 3311. Category visualization nodes 3301 illustrates data nodes 1101, 1102, and 1103 with spherical three-dimensional models specified in visual node 1402 and arranged into a three-dimensional line specified in visual arrangement 1403. Category-temperature visualization edges 3302 illustrates data edges 1107, 1108, and 1109 with three-dimensional lines which are specified within a visual edge in map edge 1405. Category-luminosity visualization edges 3303 illustrates data edges 1110, 1111, and 1112 with three-dimensional lines which are specified within a visual edge in map edge 1404. Temperature visualization nodes 3304 illustrates data nodes 1104, 1105, and 1106 with conical three-dimensional models specified in visual node 1407 and arranged into a three-dimensional circle specified in visual arrangement 1408. Luminosity visualization nodes 3305 illustrates data nodes 1113, 1114, and 1115 with star-tetrahedral three-dimensional models specified in visual node 1415 and arranged into a three-dimensional triangle specified in visual arrangement 1416. Temperature-star visualization edges 3306 illustrates data edges 1122, 1123, and 1124 with three-dimensional lines specified within a visual edge in map edge 1409. "MainSequence" luminosity-star visualization edges 3307 illustrates data edges 1119, 1120, and 1121 with three-dimensional lines specified within a visual edge in map edge 1417. "SubGiant" luminosity-star visualization edges 3308 illustrates data edges 1125, 1126, and 1127 with three-dimensional lines specified within a visual edge in map edge 1418. Star visualization nodes 3309 illustrates data nodes 1128, 1129, 1130 with buckyball three-dimensional models specified in visual node 1411 and arranged into a three-dimensional sphere specified in visual arrangement 1303. Star visualization nodes 3310 illustrates data nodes 1116, 1117, 1118 with tetrahedral three-dimensional models specified in visual node 1413 and arranged into a three-dimensional cube specified in visual arrangement 1306. Star visualization nodes 3311 illustrates data nodes 1131, 1132, and 1133 with cube three-dimensional models specified in visual node 1420 and arranged into a three-dimensional tetrahedron specified in visual arrangement 1309. Notice that a three-dimensional model associated with a visualization edge is arranged based on the position of the two three-dimensional models in visualizations nodes associated to the visualization edge.

Comparing two-dimensional astronomical data graph 1100 (FIG. 11) side-by-side to astronomical visualization graph 3300 (FIG. 33) shows how inter-connected three-dimensional visualization of a data graph in 3300 improves the recognition of conceptual differences in data graph 1100 and enables large quantities of data to be easily viewed in a compact form.

3304, a group of temperatures from 1100, and 3305, a group of luminosities from 1100, are quickly recognized as different through the association of a circular arrangement of cones to temperatures and through the association of a triangular arrangements of star-tetrahedrons to luminosities. We see that the stars represented in 3309 are represented by a different three-dimensional model than the stars represented in 3310. We also see the stars in 3309 are connected by lines 3306 to a three-dimensional model in 3304 that is differently shaped than the three-dimensional model in 3305 which connects lines 3308 to stars represented in 3310. The different three-dimensional representations of temperatures 3304, luminosities 3305, and stars 3309 and 3310 imply a difference in associated data graph 1100.

Viewing stars 1128, 1129, 1130, 1131, 1132, and 1133 in data graph 1100 we see a two-dimensional equivalent of the stars illustrated in 3309 and 3310. It is not immediately evident in data graph 1100 that the stars represented by 1128, 1129, and 1130 are of a different kind and quantity than the stars represented by 1131, 1132, and 1133. Due to the limited space of two dimensions, ellipses and subscript must be used to convey that 1128, 1129, and 1130 represent 34 stars and 1131, 1132, and 1133 represents 35 stars. Data edges 1119, 1120, and 1121 convey that stars 1116, 1117, and 1118 are classified as main sequence stars on the Hertzsprung-Russell diagram. This qualitative difference, while present in two-dimensional FIG. 11, is more evident in three-dimensional FIG. 33.

Figure 34A:
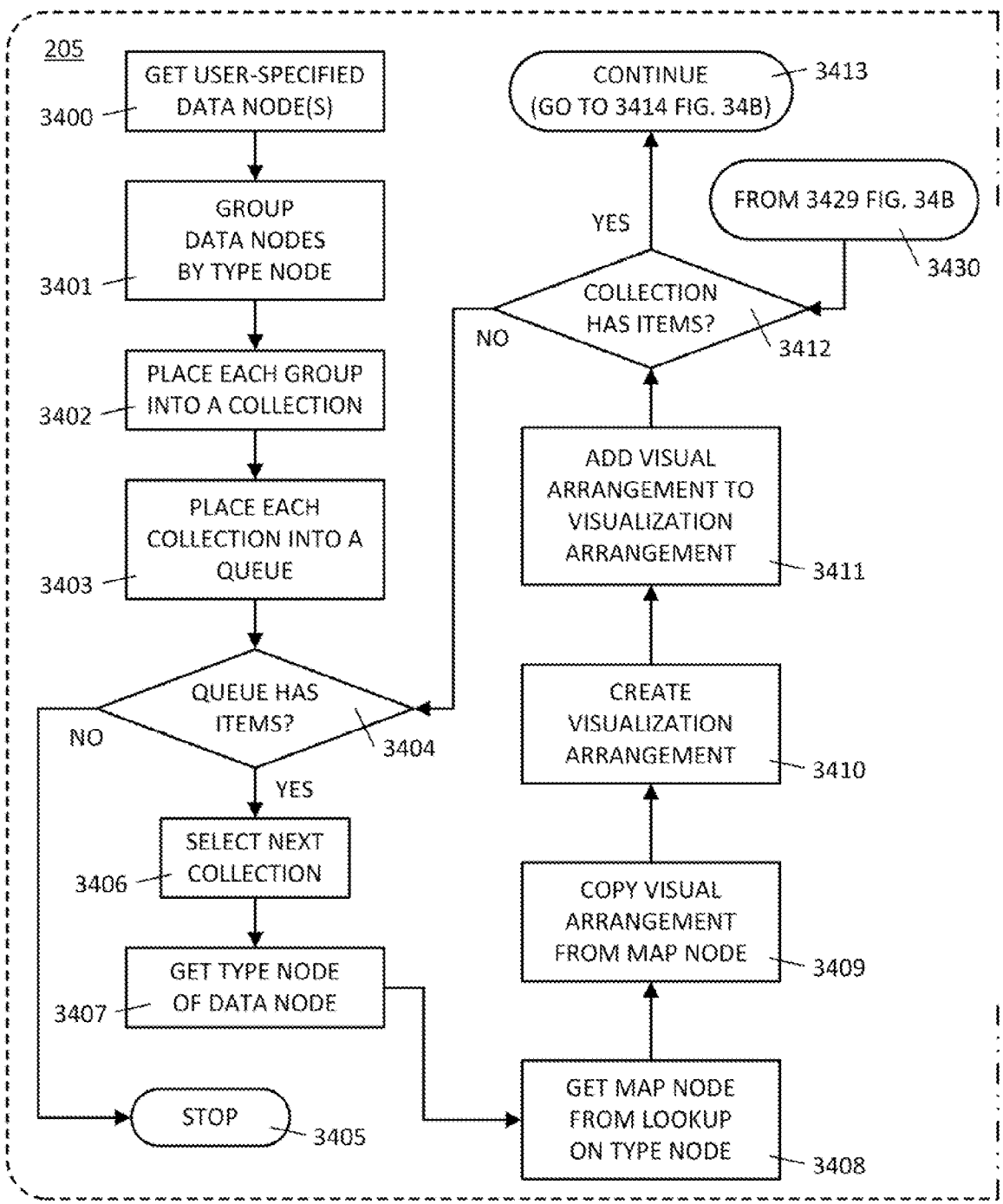
FIGS. 34(A)-34(C) are example flow diagrams of an example method of implementing a visualization graph.
Figure 34B:
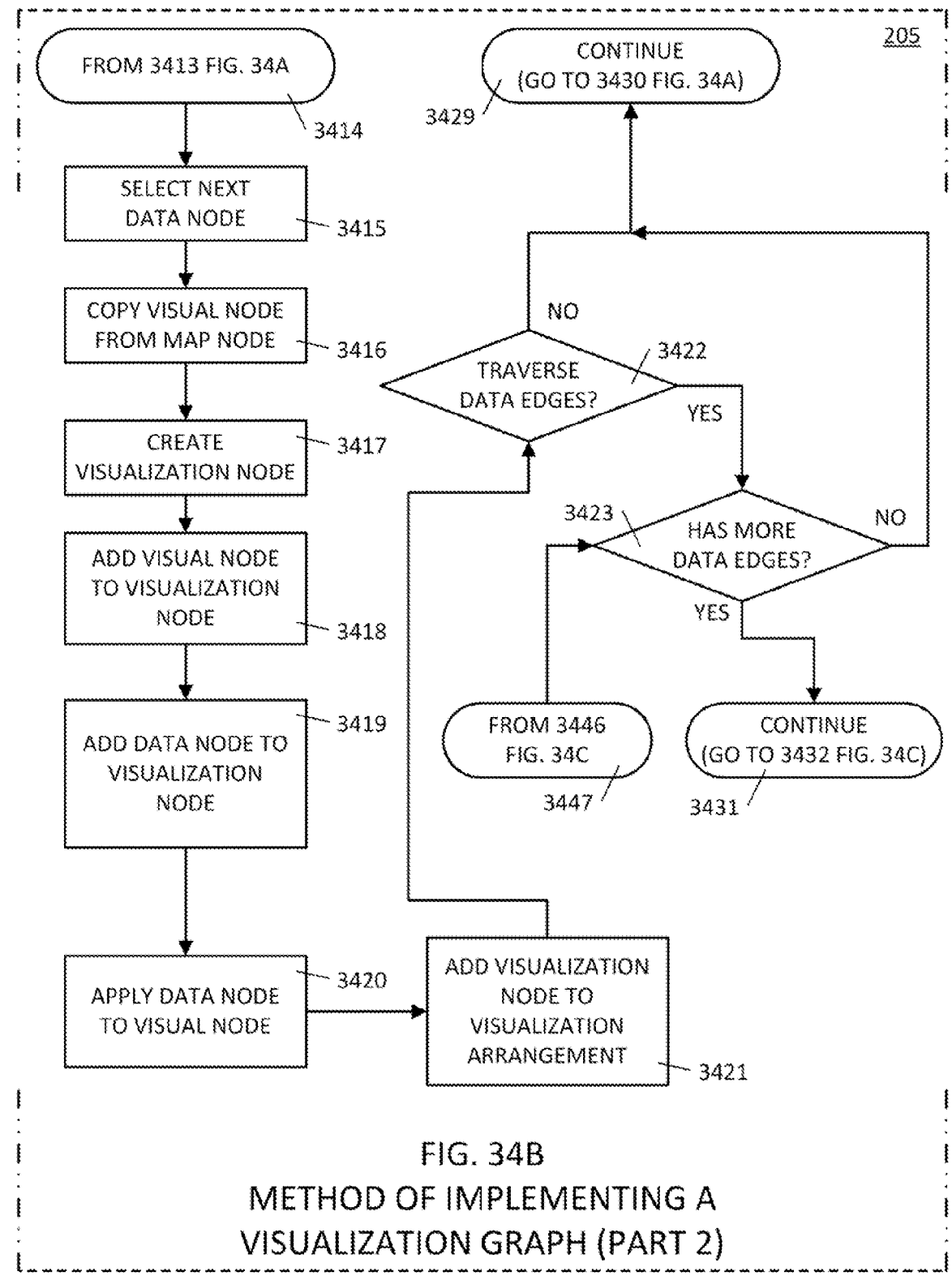
Figure 34C:
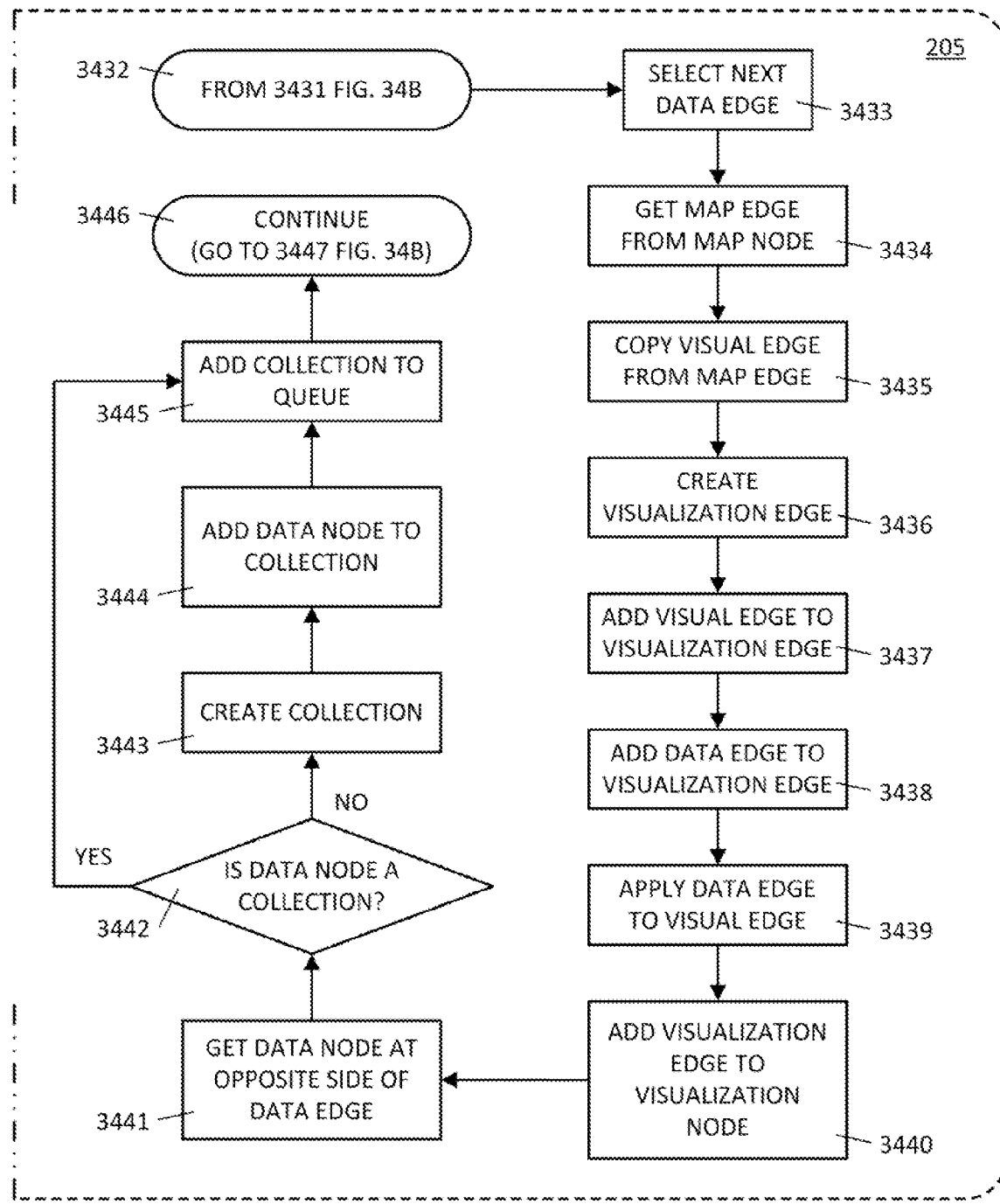

FIGS. 34(A)-34(C) illustrates an example flow diagram of a method of implementing a visualization graph that may be performed by CPU 108. The method discussed for FIGS. 34(A)-34(C) is a detailed illustration of step 205 which receives a data node or data nodes and a map graph from a user to produce a visualization graph for presentation on display 125. A data graph and type graph are determined from the user-specified data node(s) and instruction execution environment. Data nodes and data edges from a data graph are combined with map nodes and map edges from a map graph to produce the visualization graph.

FIG. 34(A) begins at block 3400 in which a user-specified data node or data nodes are acquired. The data node(s) are then grouped by equivalent type node at block 3401 and each group of data nodes is placed into a distinct collection at block 3402. At block 3403, each collection is inserted into a queue for later retrieval. At block 3404 a check is made as to whether there are any collections remaining within the queue. If there aren't any collections remaining (the "no" branch from block 3404), the entire method of 205 is halted at step 3405 and the implementation of a visualization graph is complete.

If there is at least one remaining collection within the queue (the "yes" branch from block 3404), processing continues to block 3406 where the next collection is selected from the queue. The equivalent type node of the data nodes in the currently selected collection is determined at block 3407. Since the data nodes in the collection were previously grouped by type node at block 3401, we can expect that the data nodes have a single equivalent type. At block 3408 a map node is acquired using a lookup on the type node determined in block 3407. The visual arrangement from the acquired map node is copied at block 3409. Processing at block 3410 creates a new visualization arrangement and the copied visual arrangement is add to the visualization arrangement at block 3411. Block 3412 determines if the currently selected collection contains any data nodes. If the collection doesn't contain any data nodes (the "no" branch from block 3412), processing returns to block 3404. If the collection does contain at least one data node, (the "yes" branch from block 3412) processing continues to block 3413 which redirects the flow diagram to block 3414 in FIG. 34(B).

FIG. 34(B) begins at block 3414 and continues to block 3415 where creation of a visualization node begins. At block 3415, the next data node within the current collection is selected. Continuing to block 3416, the visual node is copied from the currently acquired map node. Processing at block 3417 creates a new visualization node and has the copied visual node added to the visualization node at block 3418. The selected data node is then added to the visualization node at block 3419. Processing at block 3420 applies the selected data node to the copied visual node which is described in greater detail for FIG. 25. The visualization node is then added to the visualization arrangement at block 3421. Processing at block 3422 determines whether the selected data node has any non-filtered data edges to traverse. In the preferred embodiment, the user may specify to filter and prevent the traversal of specific data edges. If the selected data node does not have any non-filtered data edges to traverse (the "no" branch from block 3422), processing continues to block 3429, then to block 3430, and back to block 3412 on FIG. 34(A). If the currently selected data node has traversable data edges (the "yes" branch from block 3422), processing continues to block 3423 where it is determined whether there is at least one unprocessed data edge in the current data node. If all data edges have been processed (the "no" branch from block 3423), processing continues to block 3429. If there is at least one unprocessed data edge in the current data node (the "yes" branch from block 3423), processing continues to block 3431 and to block 3432 on FIG. 34(C).

FIG. 34(C) begins at block 3432 and selects the next unprocessed data edge from the current data node at block 3433. A map edge is acquired from a lookup on the type edge of the current data edge and the current map node at block 3434. At block 3435 the visual edge from the acquired map edge is copied. At block 3436 a new visualization edge is created. The copied visual edge is added to the visualization edge at block 3437 and the current data edge is added to the visualization edge at block 3438. Processing at block 3439 applies the selected data edge to the coped visual edge which is described in greater detail for FIG. 26. At block 3440 the new visualization edge is added to the current visualization node. Processing at block 3441 acquires the data node at the opposing end of the data edge and determines if the acquired data node is associated to a collection type node at block 3442. If the data node is not associated to a collection type node (the "no" branch from block 3442), a collection is created at block 3443 and the data node is added to the new collection at block 3444. The new collection is then added to the queue of collections at block 3445. If the data node is associated to a collection type node (the "yes" branch from block 3442), the data node is added to the queue of collections at block 3445. Processing then continues to block 3446 and to block 3447 in FIG. 34(B). Processing continues from 3447 back to block 3423.

Figure 35:
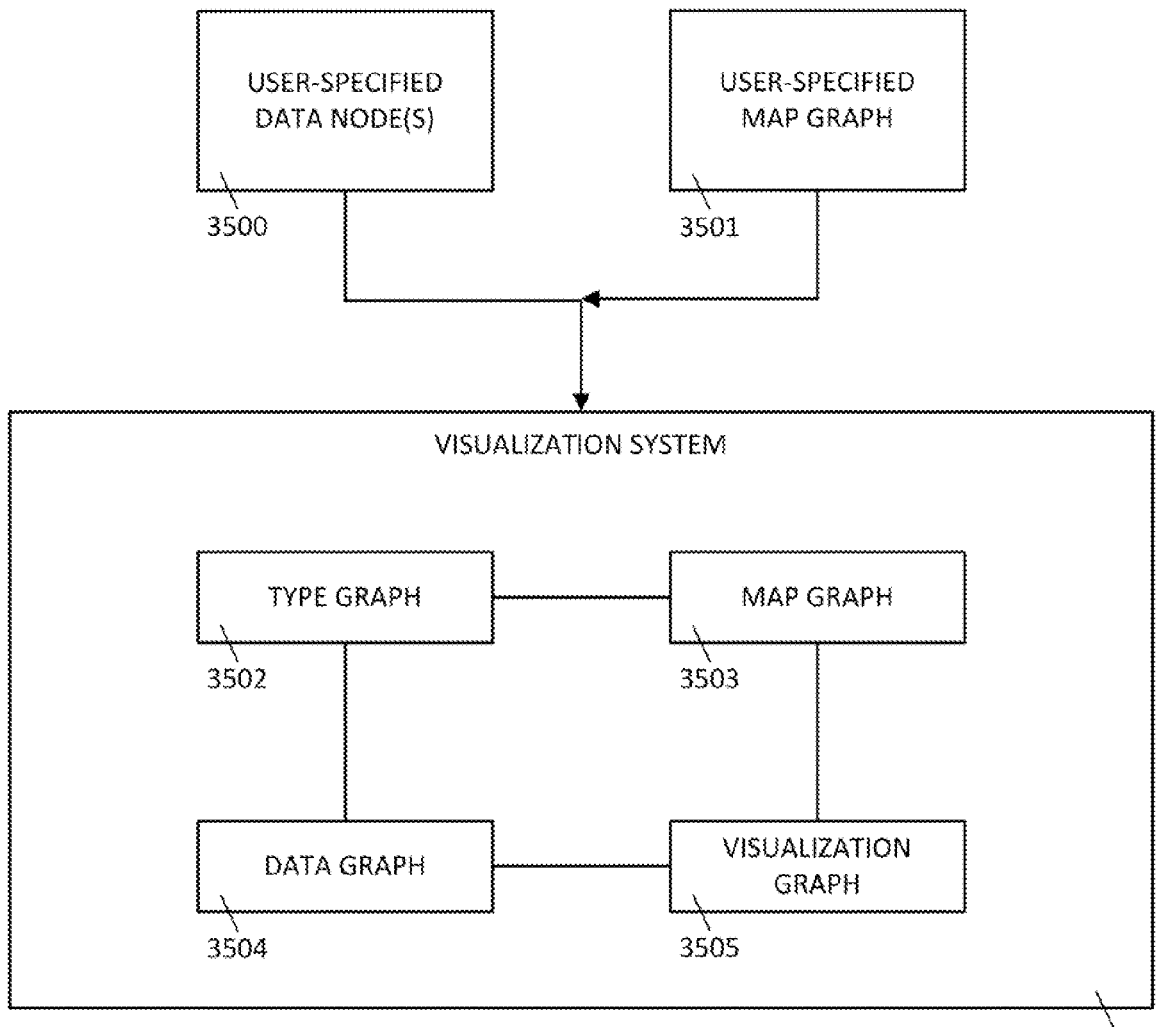
FIG. 35 is a block diagram of an example visualization system which may be used to create three-dimensional visualizations of a non-graphical data graph.

FIG. 35 illustrates an example flow diagram of a data graph visualization system which may use computer device 100 to present arranged three-dimensional models on display 125. Visualization system 3506 receives a data node or data nodes 3500 and an optional map graph 3501 as input from a user. Visualization system 3506, which may be loaded into random-access memory 103, may include at least type graph 3502, map graph 3503, data graph 3504, and visualization graph 3505. A broad overview of the visualization system is recited for FIG. 2(D). Type graph 3502 is a "blue print" to data graph 3504 where both type graph 3502 and data graph 3504 are determined from data node(s) 3500. Map graph 3503 is the "blue print" for visualization graph 3505.

Type graphs and components of type graphs are discussed in detail for FIGS. 4(A)-4(C), 5(A)-5(C), and 6(A)-6(B). Data graphs and components of data graphs are discussed in detail for FIGS. 7(A)-7(C), FIG. 10, and FIG. 11. Map graphs and components of map graphs are discussed in detail for FIGS. 12(A)-12(C), 13(A)-13(C), and 14(A)-14(B). Visualization graphs and components of visualization graphs are discussed in detail for FIGS. 19(A)-19(C), FIG. 32, and FIG. 33.

Each embodiment disclosed herein may be used or otherwise combined with any of the other embodiments disclosed. Any element of any embodiment may be used in any embodiment. Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention. For example, although an embodiment of a typed data graph visualization system in three dimensions is described in language specific to structural features and/or methods, it is to be understood that the subject of the appended claims is not necessarily limited to the specific features or methods described. The specific features and methods are disclosed as an example of an implementation of a typed data graph visualization system in three dimensions.

I claim:

1. A machine-implemented method comprising:
a processor unit associating a data graph to a visualization graph through a map graph, wherein the data graph includes at least two or more data nodes and one or more data edges, wherein the map graph includes at least two or more map nodes and one or more map edges, wherein the visualization graph includes at least two or more visualization nodes and one or more visualization edges;
the processor unit arranging one or more visualization node three-dimensional models from a visualization graph into one or more three-dimensional geometries, wherein visualization nodes are grouped by the associated data node relations to an adjacent and shared data node;
the processor unit generating a visualization graph from a data graph through a map graph, wherein the data graph includes at least two or more data nodes and one or more data edges, wherein the map graph includes at least two or more map nodes and one or more map edges, wherein the visualization graph includes at least two or more visualization nodes and one or more visualization edges; and displaying the visualization graph on a display.

2. The machine implemented method of claim 1, further comprising:

the processor unit associating a map graph to a type graph, wherein each map node of the map graph includes at least a three-dimensional model, a three-dimensional arrangement geometry, and a type node; and the processor unit generating a map graph from a type graph, wherein the data graph is designed from the type graph, wherein the type graph includes at least two or more type nodes and one or more type edges, wherein the map graph includes at least two or more map nodes and one or more map edges, wherein each map node includes at least a three-dimensional model, a three-dimensional arrangement geometry, and a type node.

3. The machine implemented method of claim 1, further comprising:

the processor unit generating a visualization arrangement from at least one or more visualization nodes and a visual arrangement, wherein the visual arrangement is copied from a map node, wherein the visual arrangement includes at least a three-dimensional geometry, wherein the map node is associated to at least a visual arrangement and type node, wherein a type node is associated to a visualization node through a data node, wherein each type node associated to a visualization node through a data node is equivalent to the type node associated to the map node; and the processor unit generating a visualization node from at least a data node and a visual node, wherein the visual node is copied from a map node, wherein the visual node includes at least a three-dimensional model, wherein the map node is associated to at least a visual node and type node, wherein the data node is associated to at least a type node, wherein the type node associated to the data node and the type node associated to the map node are equivalent; and the processor unit generating a visualization edge from at least a data edge and a visual edge, wherein the visual edge is copied from a map edge, wherein the visual edge includes at least a three-dimensional model, wherein the map edge is associated to at least a visual edge and type edge, wherein the data edge is associated to at least a type edge, wherein the type edge associated to the data edge and the type edge associated to the map edge are equivalent.

4. A machine-implemented method comprising:

a processor unit associating one or more data nodes to one or more visualization nodes through a map node, wherein each data node includes at least equivalent type nodes, wherein each visualization node includes at least a three-dimensional model, wherein the map node includes at least a type node equivalent to type nodes included in the data nodes; and the processor unit arranging one or more visualization node three-dimensional models in a three-dimensional geometry, wherein each visualization node is associated with a particular data node, wherein each data node is adjacent to a shared data node;

wherein the visualization nodes are grouped by the associated data node relations to the shared data node.

5. The machine-implemented method of claim 4, further comprising:

the processor unit associating one or more map nodes to one or more type nodes, wherein each data node is designed from a type node being associated, wherein each map node includes at least a three-dimensional model, a three-dimensional arrangement geometry, and a type node.

6. A machine-implemented method comprising:

a processor unit accessing one or more data edges, and one or more data nodes, each data node being associated with an adjacent shared data node, via data edge;

the processor unit associating the one or more data edges to one or more visualization edges through a map edge, wherein each visualization edge includes at least a three-dimensional model, each visualization edge being associated with at least two visualization edges of a plurality of visualization nodes;

wherein the plurality of visualization nodes include the one or more visualization nodes that are grouped by the associated data node relations to an adjacent and shared data node.

7. The machine-implemented method of claim 6, further comprising:

the processor unit associating one or more map edges to one or more type edges, wherein each data edge is designed from a type edge being associated, wherein each map edge includes at least a three-dimensional model.

* * * * *